(12) United States Patent
Shekel et al.

(10) Patent No.: US 6,886,994 B2
(45) Date of Patent: May 3, 2005

(54) OPTICAL ASSEMBLY AND METHOD FOR MANUFACTURE THEREOF

(75) Inventors: Eyal Shekel, Jerusalem (IL); Levy Jeffrey, Tel Aviv (IL); Michael Rodman, Jerusalem (IL)

(73) Assignee: Chiaro Networks Ltd., Jerusalem (IL)

( * ) Notice: Subject to any disclaimer, the term of this patent is extended or adjusted under 35 U.S.C. 154(b) by 22 days.

(21) Appl. No.: 10/199,556

(22) Filed: Jul. 18, 2002

(65) Prior Publication Data

US 2004/0013371 A1 Jan. 22, 2004

(51) Int. Cl.$^7$ .............................. G02B 6/00; G02B 6/36
(52) U.S. Cl. ......................... 385/88; 385/52; 156/314; 156/272.8
(58) Field of Search ............................. 385/80, 92–94, 385/52–55, 88–90, 16–24, 147–149; 156/64, 314, 272.8, 273.3, 275.5, 275.3, 273.5

(56) References Cited

U.S. PATENT DOCUMENTS

| | | |
|---|---|---|
| 4,892,374 A | 1/1990 | Ackerman et al. |
| 5,082,342 A | 1/1992 | Wight et al. |
| 5,177,348 A | 1/1993 | Laor |
| 5,195,154 A | 3/1993 | Uchida .......................... 385/88 |
| 5,210,800 A | 5/1993 | Asai et al. ..................... 385/12 |
| 5,261,156 A | * 11/1993 | Mase et al. ..................... 29/832 |
| 5,358,896 A | 10/1994 | Komatsu et al. |
| 5,377,286 A | 12/1994 | Iida |
| 5,394,498 A | 2/1995 | Hinterlong |
| 5,446,815 A | 8/1995 | Ota |
| 5,482,585 A | 1/1996 | Ota et al. ..................... 156/158 |
| 5,485,538 A | 1/1996 | Bowen et al. ................. 385/92 |
| 5,487,124 A | 1/1996 | Bowen et al. ................. 385/93 |
| 5,559,915 A | 9/1996 | Deveau ......................... 385/49 |
| 5,570,442 A | 10/1996 | Arii et al. ...................... 385/46 |
| 5,579,424 A | 11/1996 | Schneider ..................... 385/49 |
| 5,600,741 A | 2/1997 | Hauer et al. .................. 385/35 |
| 5,600,745 A | 2/1997 | Wuu et al. ..................... 385/49 |

(Continued)

FOREIGN PATENT DOCUMENTS

| | | |
|---|---|---|
| WO | WO-98/57230 A1 | 12/1998 |
| WO | WO-98/59276 A1 | 12/1998 |

*Primary Examiner*—Nimeshkumar D. Patel
*Assistant Examiner*—Dalei Dong
(74) *Attorney, Agent, or Firm*—Darby & Darby

(57) ABSTRACT

A method for accurately mounting an optical element in an optical assembly including precisely positioning the optical element in a desired position with respect to a reference surface, employing a non-metallic adhesive for initially fixing the optical element in the desired position and thereafter employing a metallic adhesive for permanently fixing the optical element in the desired position.

59 Claims, 33 Drawing Sheets

U.S. PATENT DOCUMENTS

| | | | | |
|---|---|---|---|---|
| 5,611,014 | A | 3/1997 | Basavanhally | 385/90 |
| 5,625,726 | A | 4/1997 | Ichigi | 385/14 |
| 5,656,120 | A | 8/1997 | Ota et al. | 156/293 |
| 5,677,973 | A | 10/1997 | Yuhara | |
| 5,703,973 | A | 12/1997 | Mettler et al. | 385/14 |
| 5,703,980 | A | 12/1997 | MacElwee et al. | 385/49 |
| 5,706,378 | A | 1/1998 | Suzuki et al. | 385/49 |
| 5,708,741 | A | 1/1998 | DeVeau | 385/49 |
| 5,712,937 | A | 1/1998 | Asawa et al. | 385/49 |
| 5,712,940 | A | 1/1998 | Van Roemburg et al. | 385/93 |
| 5,721,797 | A | 2/1998 | Basavanhally et al. | 385/49 |
| 5,732,173 | A | 3/1998 | Bylander et al. | 385/49 |
| 5,732,181 | A | 3/1998 | Engberg et al. | 385/139 |
| 5,737,138 | A | 4/1998 | Someno | 359/900 |
| 5,745,265 | A | 4/1998 | Hasegawa et al. | 359/15 |
| 5,761,178 | A | 6/1998 | Fukakusa et al. | 369/112 |
| 5,784,509 | A | 7/1998 | Yamane et al. | 385/49 |
| 5,793,914 | A | 8/1998 | Sasaki | 385/49 |
| 5,828,800 | A | 10/1998 | Henry et al. | 385/20 |
| 5,835,659 | A | 11/1998 | Ota et al. | 385/137 |
| 5,852,700 | A | 12/1998 | Caponi | |
| 5,854,867 | A | 12/1998 | Lee et al. | 385/49 |
| 5,854,868 | A | 12/1998 | Yoshimura et al. | 385/50 |
| 5,859,945 | A | 1/1999 | Kato et al. | 385/89 |
| 5,867,619 | A | 2/1999 | Jarek et al. | 385/52 |
| 5,872,880 | A * | 2/1999 | Maynard | 385/88 |
| 5,875,274 | A | 2/1999 | Stein | 385/49 |
| 5,881,190 | A | 3/1999 | Harpin et al. | 385/49 |
| 5,892,857 | A | 4/1999 | McCallion | 385/1 |
| 5,898,806 | A | 4/1999 | Nishimoto | 385/49 |
| 5,907,649 | A | 5/1999 | Acklin et al. | 385/49 |
| 5,926,594 | A | 7/1999 | Song | |
| 5,986,451 | A | 11/1999 | Kagan | 324/210 |
| 6,074,104 | A * | 6/2000 | Higashikawa | 385/94 |
| 6,081,499 | A | 6/2000 | Berger et al. | 369/112 |
| 6,157,012 | A * | 12/2000 | Tanaka et al. | 219/633 |
| 6,175,675 | B1 | 1/2001 | Lee | |
| 6,226,424 | B1 | 5/2001 | Ball et al. | 385/14 |
| 6,366,720 | B1 | 4/2002 | Shekel et al. | 385/33 |
| 6,370,302 | B2 | 4/2002 | Shekel et al. | 385/52 |
| 6,442,451 | B1 | 8/2002 | Lapham | |
| 6,480,651 | B1 | 11/2002 | Rabinski | |
| 6,556,285 | B1 | 4/2003 | Dickson | |
| 6,587,611 | B1 | 7/2003 | Hunt | |
| 6,589,376 | B1 * | 7/2003 | Davis et al. | 156/64 |
| 6,590,658 | B2 | 7/2003 | Case | |
| 6,611,635 | B1 | 8/2003 | Yoshimura et al. | |
| 6,654,523 | B1 | 11/2003 | Cole | |
| 6,654,524 | B2 * | 11/2003 | Shekel et al. | 385/52 |
| 2003/0053054 | A1 | 3/2003 | Li | |
| 2003/0063277 | A1 | 4/2003 | Kennedy | |

* cited by examiner

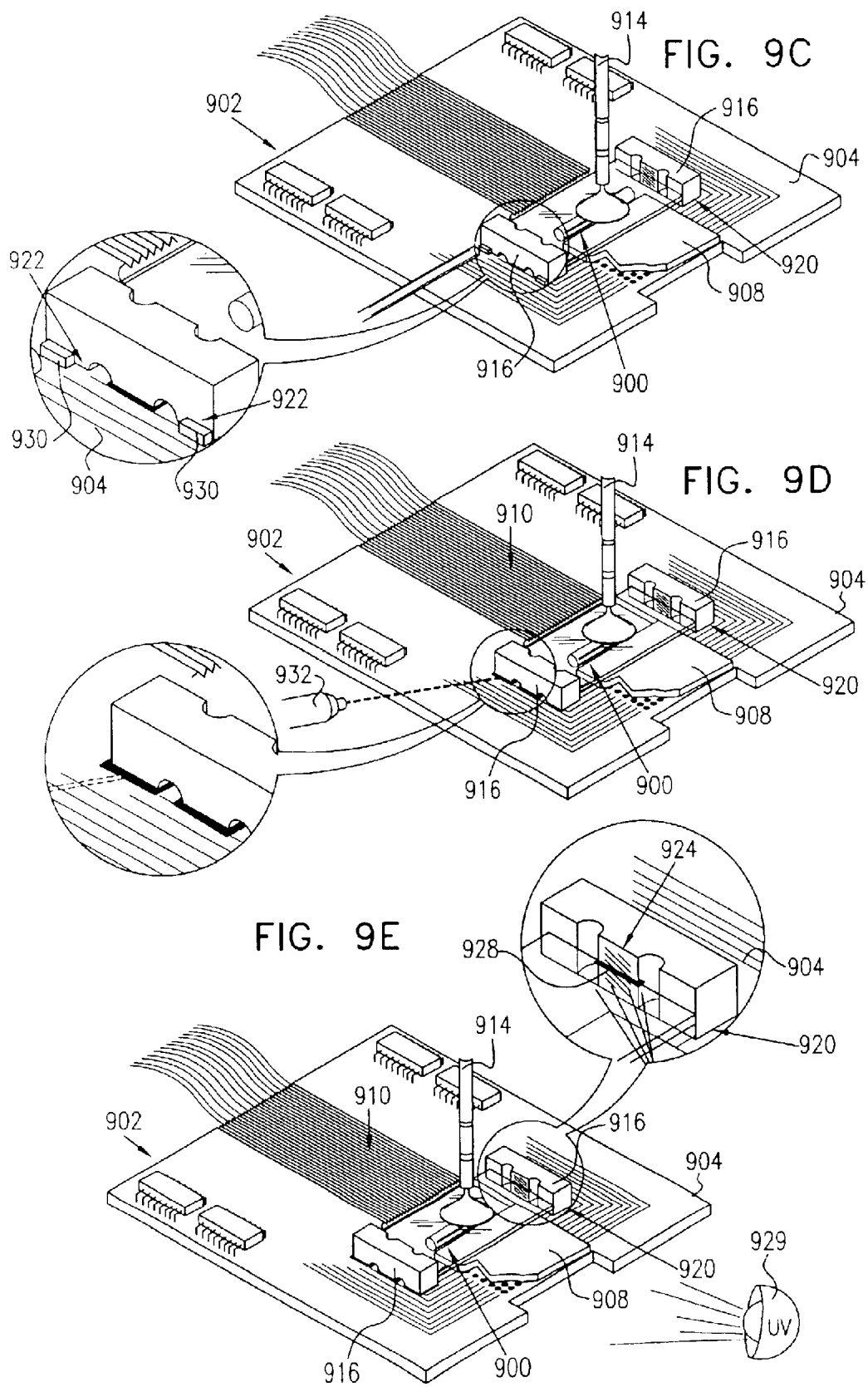

OPTICAL ASSEMBLY AND METHOD FOR MANUFACTURE THEREOF

FIELD OF THE INVENTION

The present invention relates to optical systems and manufacturing techniques therefor

BACKGROUND OF THE INVENTION

The following U S. Pat. Nos. are related to the field of the invention:

U.S. Pat. Nos. 5,195,154; 5,210,800; 5,482,585, 5,485, 538; 5,487,124; 5,559,915; 5,570,442; 5,579,424, 5,600, 741; 5,600,745; 5,611,014; 5,625,726, 5,656,120; 5,703, 973; 5703,980, 5,706,378; 5,708,741; 5,712,937; 5,712,940; 5,721,797; 5,732,173, 5,732,181, 5,737,138; 5,745,265; 5,761,178; 5,784,509; 5,828,800; 5,793,914; 5,835,659, 5,854,867; 5,854,868; 5,859,945; 5,867,619, 5,875,274; 5,881,190, 5,892,857; 5,898,806; 5,907,649; 5,986,451, 6,081,499; 6,226,424; 6,366,720 and 6,370,302.

SUMMARY OF THE INVENTION

The present invention seeks to provide improved optical systems and manufacturing techniques therefor and, in particular, to provide improved techniques and structures for mounting optical elements in extremely precise alignment which retains requisite alignment accuracy over an extended period of time.

There is thus provided in accordance with a preferred embodiment of the present invention a method for accurately mounting an optical element in an optical assembly including precisely positioning an optical element in a desired position with respect to a reference surface, employing a non-metallic adhesive for initially fixing the optical element in the desired position and thereafter employing a metallic adhesive for permanently fixing the optical element in the desired position.

There is also provided in accordance with another preferred embodiment of the present invention a method for accurately mounting an optical element in an optical assembly including precisely positioning the optical element in a desired position with respect to a reference surface, employing a relatively low temperature curing adhesive for initially fixing the optical element in the desired position and thereafter employing a relatively high temperature curing adhesive for permanently fixing the optical element in the desired position.

There is further provided in accordance with yet another preferred embodiment of the present invention a method for accurately mounting an optical element in an optical assembly including precisely positioning the optical element in a desired position with respect to a reference surface, employing a first curable adhesive for initially fixing the optical element in the desired position and thereafter employing a second curable adhesive for fixing the optical element in the desired position.

In accordance with a preferred embodiment the precisely positioning includes positioning the optical element in precise spaced relationship with respect to the reference surface.

Preferably, the employing a non-metallic adhesive and thereafter employing a metallic adhesive include employing at least one side mounting element including at least one first surface which engages an edge of the optical element and at least one second surface which engages the reference surface.

In accordance with another preferred embodiment at least one of the at least one first surface, the at least one second surface, the edge of the optical element and the reference surface includes separate metallic adhesive engagement and non-metallic adhesive engagement areas. Alternatively, each of the at least one first surface and the at least one second surface includes separate metallic adhesive engagement and non-metallic adhesive engagement areas Alternatively, the at least one first surface includes separate metallic adhesive engagement and non-metallic adhesive engagement areas Preferably, the separate metallic adhesive engagement and non-metallic adhesive engagement areas are separated by a groove.

In accordance with yet another preferred embodiment of the present invention the at least one second surface is permanently fixed to the reference surface by employing the metallic adhesive prior to employing the non-metallic adhesive for initially fixing the at least one first surface to the edge of the optical element.

Alternatively, the non-metallic adhesive is applied to at least one of the at least one first surface and the at least one second surface, the edge of the optical element being fixed to the reference surface prior to the precisely positioning of the optical element in the desired position with respect to the reference surface.

Additionally or alternatively, the metallic adhesive is applied to at least one of the at least one first surface and the at least one second surface, the edge of the optical element being fixed to the reference surface prior to the precisely positioning of the optical element in the desired position with respect to the reference surface.

In accordance with another preferred embodiment the employing a non-metallic adhesive and thereafter employing a metallic adhesive include mounting an edge of the optical element directly onto the reference surface Additionally, at least one of the edge of the optical element and the reference surface includes separate metallic adhesive engagement and non-metallic adhesive engagement areas. Alternatively, each of the edge of the optical element and the reference surface includes separate metallic adhesive engagement and non-metallic adhesive engagement areas. Alternatively, the reference surface includes separate metallic adhesive engagement and non-metallic adhesive engagement areas Preferably, the separate metallic adhesive engagement and non-metallic adhesive engagement areas are separated by a groove.

In accordance with still another preferred embodiment the non-metallic adhesive is applied to at least one of the edge of the optical element and the reference surface prior to the precisely positioning of the optical element in the desired position with respect to the reference surface. Additionally, the metallic adhesive is applied to at least one of the edge of the optical element and the reference surface prior to the precisely positioning of the optical element in the desired position with respect to the reference surface.

Preferably, the employing a low temperature adhesive and thereafter employing a high temperature adhesive include employing at least one side mounting element including at least one first surface which engages an edge of the optical element and at least one second surface which engages the reference surface.

In accordance with another preferred embodiment at least one of the at least one first surface, the at least one second surface, the edge of the optical element and the reference surface includes separate high temperature adhesive engagement and low temperature adhesive engagement areas.

Alternatively, each of the at least one first surface and the at least one second surface includes separate high temperature adhesive engagement and low temperature adhesive engagement areas. Alternatively, the at least one first surface includes separate high temperature adhesive engagement and low temperature adhesive engagement areas. Preferably, the separate high temperature adhesive engagement and low temperature adhesive engagement areas are separated by a groove.

In accordance with yet another preferred embodiment of the present invention the at least one second surface is permanently fixed to the reference surface by employing the high temperature adhesive prior to employing the low temperature adhesive for initially fixing the at least one first surface to the edge of the optical element.

Alternatively, the low temperature adhesive is applied to at least one of the at least one first surface and the at least one second surface, the edge of the optical element being fixed to the reference surface prior to the precisely positioning of the optical element in the desired position with respect to the reference surface.

Additionally or alternatively, the high temperature adhesive is applied to at least one of the at least one first surface and the at least one second surface, the edge of the optical element being fixed to the reference surface prior to the precisely positioning of the optical element in the desired position with respect to the reference surface.

In accordance with another preferred embodiment the employing a low temperature adhesive and thereafter employing a high temperature adhesive include mounting an edge of the optical element directly onto the reference surface Additionally, at least one of the edge of the optical element and the reference surface includes separate high temperature adhesive engagement and low temperature adhesive enlargement areas. Alternatively, each of the edge of the optical element and the reference surface includes separate high temperature adhesive engagement and low temperature adhesive engagement areas. Alternatively, the reference surface includes separate high temperature adhesive engagement and low temperature adhesive engagement areas. Preferably, the separate high temperature adhesive engagement and low temperature adhesive engagement areas are separated by a groove.

In accordance with still another preferred embodiment the low temperature adhesive is applied to at least one of the edge of the optical element and the reference surface prior to the precisely positioning of the optical element in the desired position with respect to the reference surface. Additionally, the high temperature adhesive is applied to at least one of the edge of the optical element and the reference surface prior to the precisely positioning of the optical element in the desired position with respect to the reference surface.

Preferably, the second adhesive is curable at a higher temperature than the first adhesive.

In accordance with another preferred embodiment, the curing process employed to cure the first adhesive applies less physical stress on the optical assembly than the curing process employed to cure the second adhesive. Alternatively, the curing process employed to cure the first adhesive applies no appreciable physical stress on the optical assembly.

Preferably, the second adhesive when cured provides a longer lasting bond than the first adhesive.

In accordance with a preferred embodiment of the present invention the first adhesive is a non-heat curable adhesive.

Additionally, the second adhesive is a heat curable adhesive. Additionally or alternatively, the first adhesive is a UV curable adhesive. Additionally or alternatively, the second adhesive is a non-UV curable adhesive.

Preferably, the employing a first adhesive and thereafter employing a second adhesive include employing at least one side mounting element including at least one first surface which engages an edge of the optical element and at least one second surface which engages the reference surface.

In accordance with another preferred embodiment at least one of the at least one first surface, the at least one second surface, the edge of the optical element and the reference surface includes separate first adhesive engagement and second adhesive engagement areas. Alternatively, each of the at least one first surface and the at least one second surface includes separate first adhesive engagement and second adhesive engagement areas. Alternatively, the at least one first surface includes separate first adhesive engagement and second adhesive engagement areas. Preferably, the separate first adhesive engagement and second adhesive engagement areas are separated by a groove.

In accordance with yet another preferred embodiment of the present invention the at least one second surface is pepermanently fixed to the reference surface by employing the second adhesive prior to employing the first adhesive for initially fixing the at least one first surface to the edge of the optical element.

Alternatively, the first adhesive is applied to at least one of the at least one first surface and the at least one second surface, the edge of the optical element being fixed to the reference surface prior to the precisely positioning of the optical element in the desired position with respect to the reference surface.

Additionally or alternatively, the second adhesive is applied to at least one of the at least one first surface and the at least one second surface, the edge of the optical element being fixed to the reference surface prior to the precisely positioning of the optical element in the desired position with respect to the reference surface.

In accordance with another preferred embodiment the employing a first adhesive and thereafter employing a second adhesive include mounting an edge of the optical element directly onto the reference surface. Additionally, at least one of the edge of the optical element and the reference surface includes separate first adhesive engagement and second adhesive engagement areas. Alternatively, each of the edge of the optical element and the reference surface includes separate first adhesive engagement and second adhesive engagement areas. Alternatively, the reference surface includes separate first adhesive engagement and second adhesive engagement areas. Preferably, the separate second adhesive engagement and first adhesive engagement areas are separated by a groove.

In accordance with still another preferred embodiment the first adhesive is applied to at least one of the edge of the optical element and the reference surface prior to the precisely positioning of the optical element in the desired position with respect to the reference surface. Additionally, the second adhesive is applied to at least one of the edge of the optical element and the reference surface prior to the precisely positioning of the optical element in the desired position with respect to the reference surface.

There is yet further provided in accordance with a preferred embodiment of the present invention a method for accurately mounting an optical element in an optical assembly including precisely positioning the optical element in a desired position with respect to a reference surface, employing an adhesive for fixing the optical element in the desired position including employing at least one side mounting element including at least one first surface which engages an edge of the optical element and at least one second surface which engages the reference surface, wherein the at least one second surface is fixed to the reference surface prior to fixing the at least one first surface to the edge of the optical element.

Preferably, the adhesive is applied to at least one of the at least one first surface and the at least one second surface, the edge of the optical element and the reference surface prior to the precisely positioning of the optical element in the desired position with respect to the reference surface.

BRIEF DESCRIPTION OF THE DRAWINGS

The present invention will be understood and appreciated more fully from the following detailed description in which:

FIGS. 9A, 9B, 9C, 9D, 9E, 9F and 9G illustrate a method and system for accurately mounting an optical element in an optical assembly in accordance with a preferred embodiment of the present invention;

DETAILED DESCRIPTION OF PREFERRED EMBODIMENTS

Figure 1A:
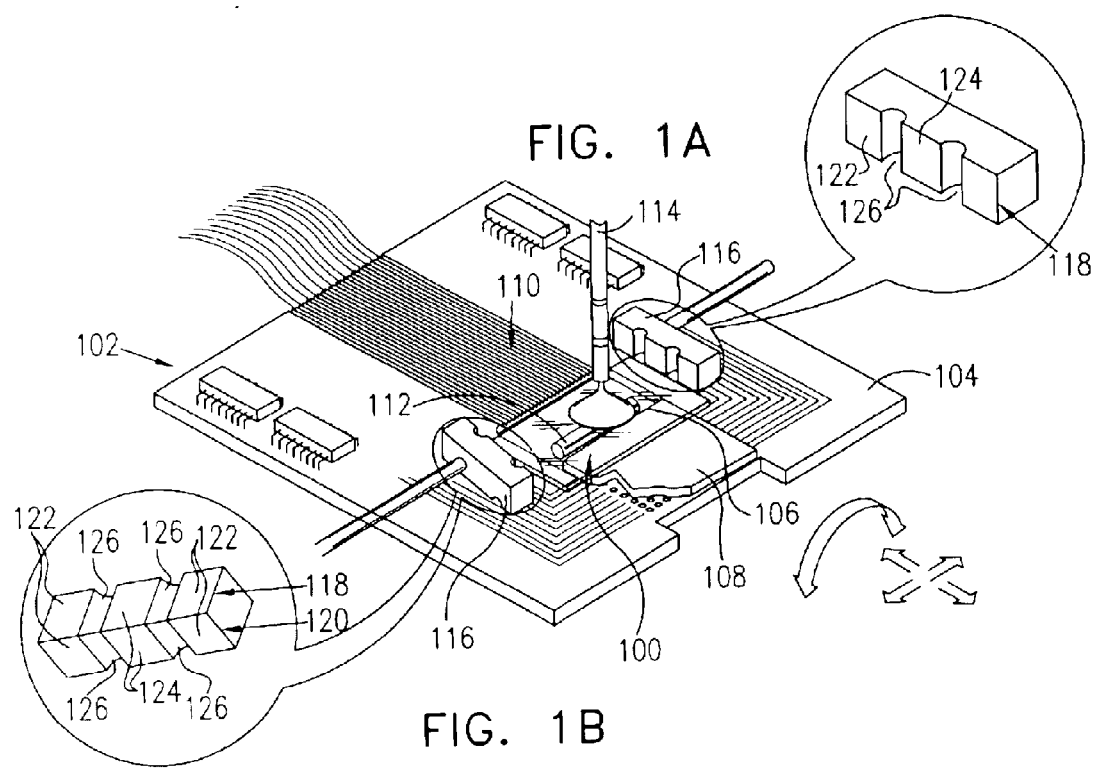
FIGS. 1A, 1B and 1C illustrate a method and system for accurately mounting an optical element in an optical assembly in accordance with a preferred embodiment of the present invention.
Figure 1B:
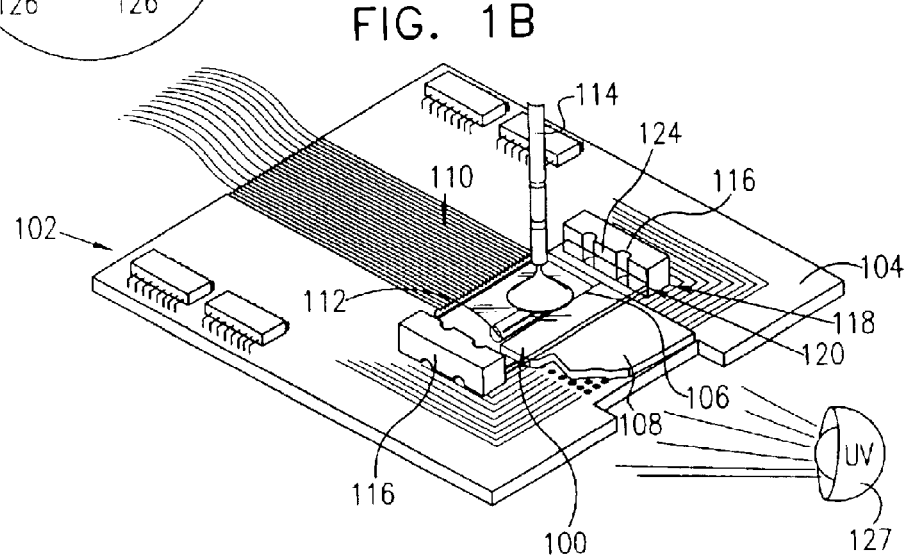
Figure 1C:
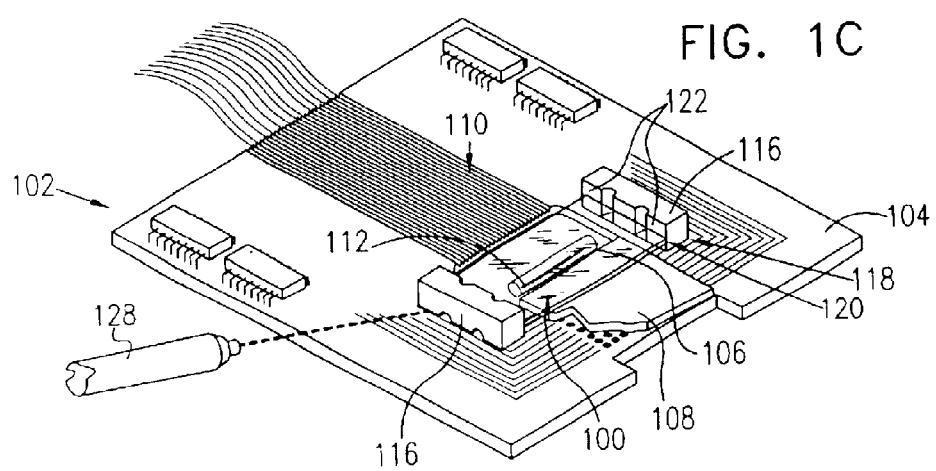

Reference is now made to FIGS. 1A, 1B and 1C which illustrate a method and system for accurately mounting an optical element in an optical assembly in accordance with a preferred embodiment of the present invention. As seen in FIGS. 1A, 1B and 1C, there is provided a method for accurately mounting an optical element in an optical assembly including precisely positioning an optical element in a desired position with respect to a reference surface, employing a non-metallic adhesive for initially fixing said optical element in said desired position and thereafter employing a metallic adhesive for permanently fixing said optical element in said desired position Turning to FIG. 1A, an optical element in the form of a lens module 100 is precisely positioned in an optical assembly, here a multiple beam deflecting subassembly 102 of an optical switch The lens module 100 is precisely positioned with respect to multiple reference surfaces, here including a substrate 104 and a facing edge 106 of an active integrated optics waveguide device 108.

The precise positioning of lens module 100 is carried out preferably with six degrees of freedom so as to achieve a high degree of accuracy in order to realize optimal optical coupling efficiency between fibers 110 fixed to substrate 104 and the waveguides formed in active integrated optics waveguide device 108. This degree of accuracy preferably reaches one tenth of a micron. A cylindrical lens 112, forming part of lens module 100, ensures that images of the centers of the ends of fibers 110 lie in the same plane as the centers of the waveguides of waveguide device 108.

This precise mounting is preferably achieved by using a positioner (not shown) and a vacuum engagement assembly 114 to manipulate the lens module 100 relative to substrate 104 such that the mode of each optical fiber 110 matches the mode of at least one corresponding waveguide of waveguide device 108 with relatively low light loss.

The lens module 100 is mounted in a desired relative position on the substrate 104 independently of the positioner by employing side mounting blocks 116 to fix the module 100 in position on substrate 104 upon precise mutual alignment of the lens module 100 and the waveguide device 108.

Preferably side mounting blocks 116 are carefully positioned alongside lens module 100 and are bonded thereto and to substrate 104.

In accordance with a preferred embodiment of the present invention side mounting blocks 116 are bonded to lens module 100 and to substrate 104 by employing a non-metallic adhesive for initially fixing the side mounting blocks to lens module 100 and to substrate 104 in a desired position and thereafter employing a metallic adhesive for permanently fixing the side mounting blocks 116 to the lens module 100 and to the substrate 104 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, each of the side mounting blocks 116 is formed with adjacent bonding surfaces 118 and 120 which are configured to define separate metallic adhesive engagement areas 122 and non-metallic adhesive engagement areas 124. Preferably engagement areas 122 and 124 are separated by grooves 126.

It may be appreciated that preferably, side mounting blocks 116 are identical. Notwithstanding the fact that the drawings typically show operations involving only one of the side mounting blocks 116, it is to be understood that typically similar or identical operations take place with both side mounting blocks 116.

Preferably, as seen in FIG. 1B, side mounting blocks 116 are carefully positioned alongside lens module 100 and are initially bonded to substrate 104 and to lens module 100 using a thin layer, preferably of thickness less than 10 microns, of a non-metallic adhesive, such as a UV curable adhesive, which engages engagement areas 124 on bonding surfaces 118 and 120 and is cured typically by use of a UV source 127.

Preferably thereafter, as seen in FIG. 1C, side mounting blocks are permanently bonded to substrate 104 and to lens module 100 using a metallic adhesive, preferably tin-gold, which is preferably thin but need not be as thin as the layer of non-metallic adhesive. The metallic adhesive engages engagement areas 122 on bonding surfaces 111 and 120 and is adhered preferably by application of energy thereto, preferably by means of a laser 128, which causes melting and reflow of the metallic adhesive. Alternatively, instead of using a laser, induced RF energy or heating may be employed to produce melting and reflow of the metallic adhesive.

Reference is now made to FIGS. 2A, 2B, 2C, 2D and 2E, which illustrate a method and system for accurately mounting an optical element in an optical assembly in accordance with a preferred embodiment of the present invention As seen in FIGS. 2A–2E, a lens module 200 is precisely positioned in an optical assembly, here a multiple beam deflecting subassembly 202 of an optical switch. The lens module 200 is precisely positioned with respect to multiple reference surfaces, here including a substrate 204 and a facing edge 206 of an active integrated optics waveguide device 208.

The precise positioning of lens module 200 is carried out preferably with six degrees of freedom so as to achieve a high degree of accuracy in order to realize optimal optical coupling efficiency between fibers 210 fixed to substrate 204 and the waveguides formed in active integrated optics waveguide device 208. This degree of accuracy preferably reaches one tenth of a micron. A cylindrical lens 212, forming part of lens module 200, ensures that images of the centers of the ends of fibers 210 lie in the same plane as the centers of the waveguides of waveguide device 208.

This precise mounting is preferably achieved by using a positioner (not shown) and a vacuum engagement assembly 214 to manipulate the lens module 200 relative to substrate 204 such that the mode of each optical fiber 210 matches the mode of at least one corresponding waveguide of waveguide device 208 with relatively low light loss.

The lens module 200 is mounted in a desired relative position on the substrate 204 independently of the positioner by employing side mounting blocks 216 to fix the module 200 in position on substrate 204 upon precise mutual alignment of the lens module 200 and the waveguide device 208.

Preferably side mounting blocks 216 are carefully positioned alongside lens module 200 and are bonded thereto and to substrate 204.

In accordance with a preferred embodiment of the present invention side mounting blocks 216 are bonded to lens module 200 and to substrate 204 by employing a non-metallic adhesive for initially fixing the side mounting blocks to lens module 200 and to substrate 204 in a desired position and thereafter employing a metallic adhesive for permanently fixing the side mounting blocks 216 to the lens module 200 and to the substrate 204 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include: UV curable organic adhesives and various types of epoxies. Other suitable non-metallic adhesives may be employed.

In accordance with a preferred embodiment of the present invention, each of the side mounting blocks 216 is formed with adjacent bonding surfaces 218 and 220 which are configured to define separate metallic adhesive engagement areas 222 and non-metallic adhesive engagement areas 224. Preferably engagement areas 222 and 224 are separated by grooves 226.

It may be appreciated that preferably, side mounting blocks 216 are identical. Notwithstanding the fact that the drawings typically show operations involving only one of the side mounting blocks 216, it is to be understood that typically similar or identical operations take place with both side mounting blocks 216.

Figure 2A:
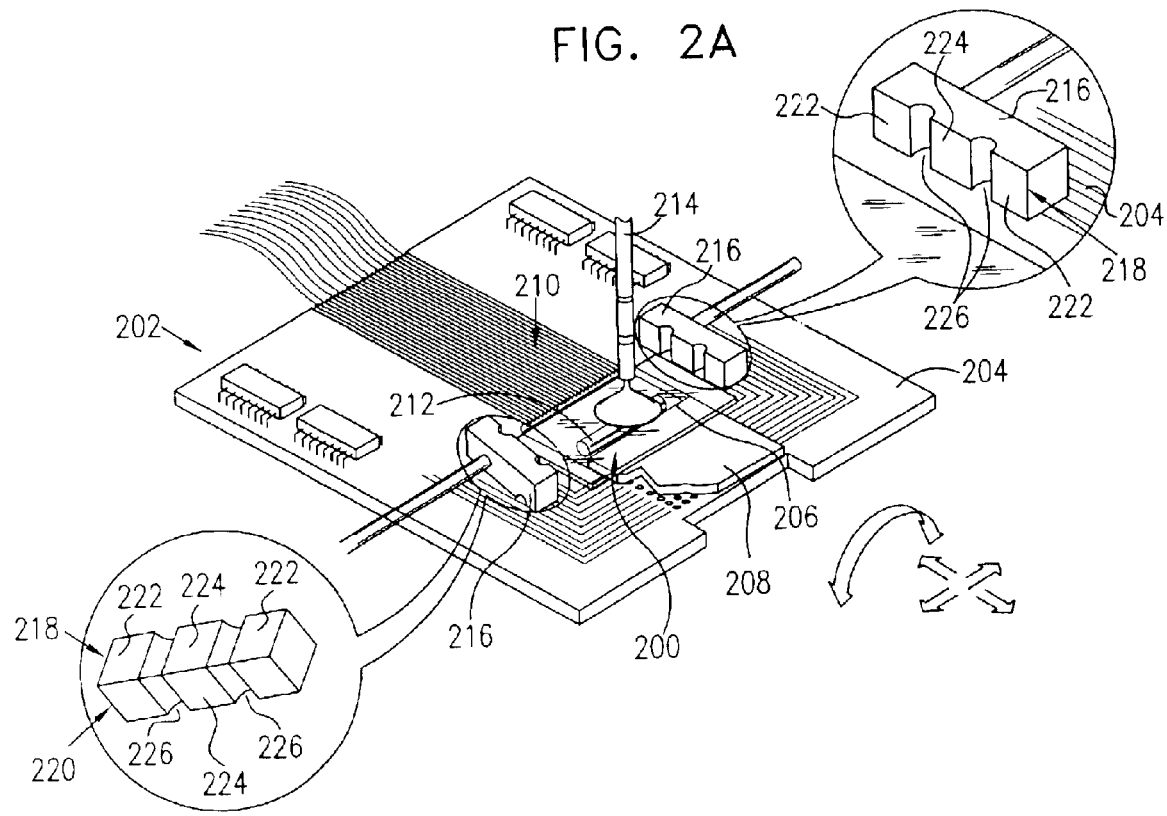
FIGS. 2A, 2B, 2C, 2D and 2E illustrate a method and system for accurately mounting an optical element in an optical assembly in accordance with a preferred embodiment of the present invention.
Figure 2B:
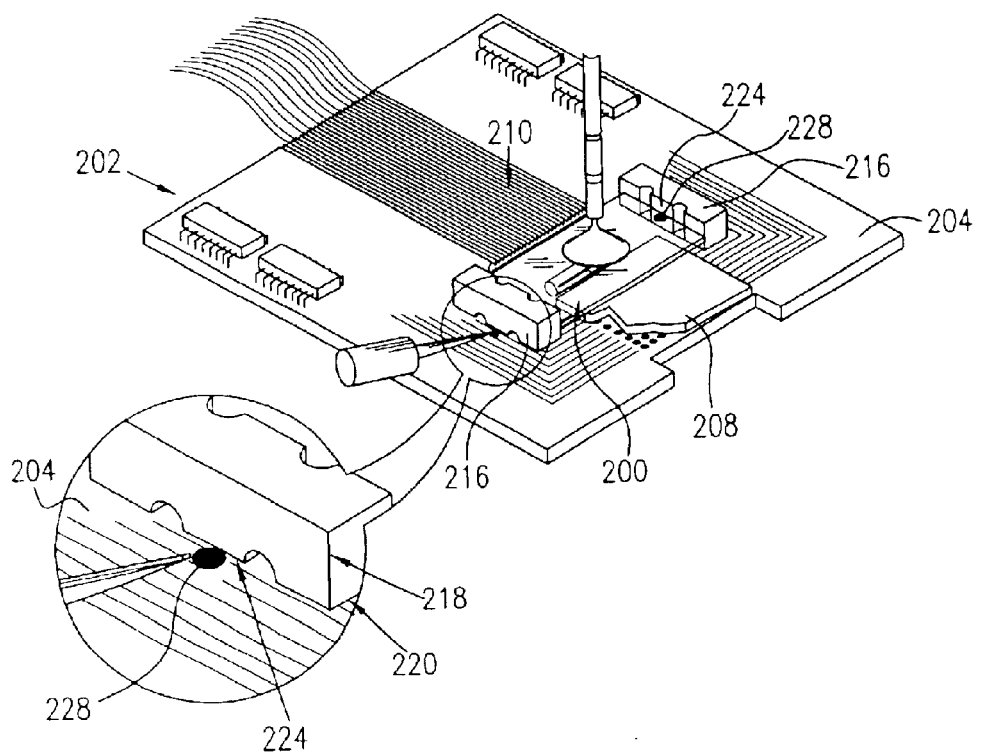
Figure 2C:
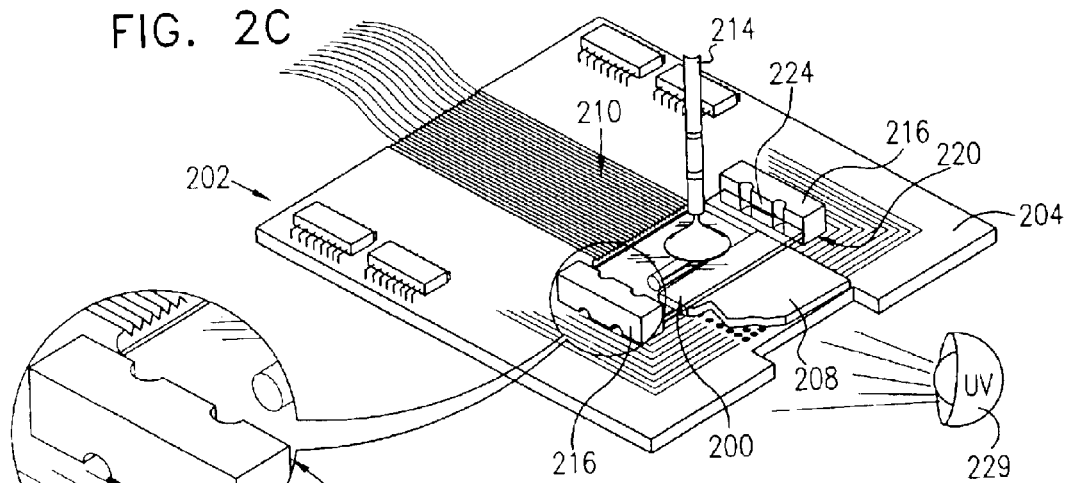

Preferably, as seen in FIG. 2B, side mounting blocks 216 are carefully positioned alongside lens module 200 and a small quantity 228 of non-metallic adhesive is deposited alongside the junction of engagement areas 224 of surfaces 220 and substrate 204 and the junction of engagement areas 224 of surfaces 218 and an edge of the lens module 200. The non-metallic adhesive is then cured, as shown in FIG. 2C, as by UV curing employing a UV source 229, for initial bonding of the side mounting blocks 216 to substrate 204 and to lens module 200. A thin layer, preferably of thickness less than 10 microns, of the non-metallic adhesive, such as a UV curable adhesive, is preferably employed. Bonding of side mounting blocks 216 to substrate 204 preferably takes place prior to bonding of side mounting blocks 216 to lens module 200, however this need not necessarily be the case.

Figure 2D:
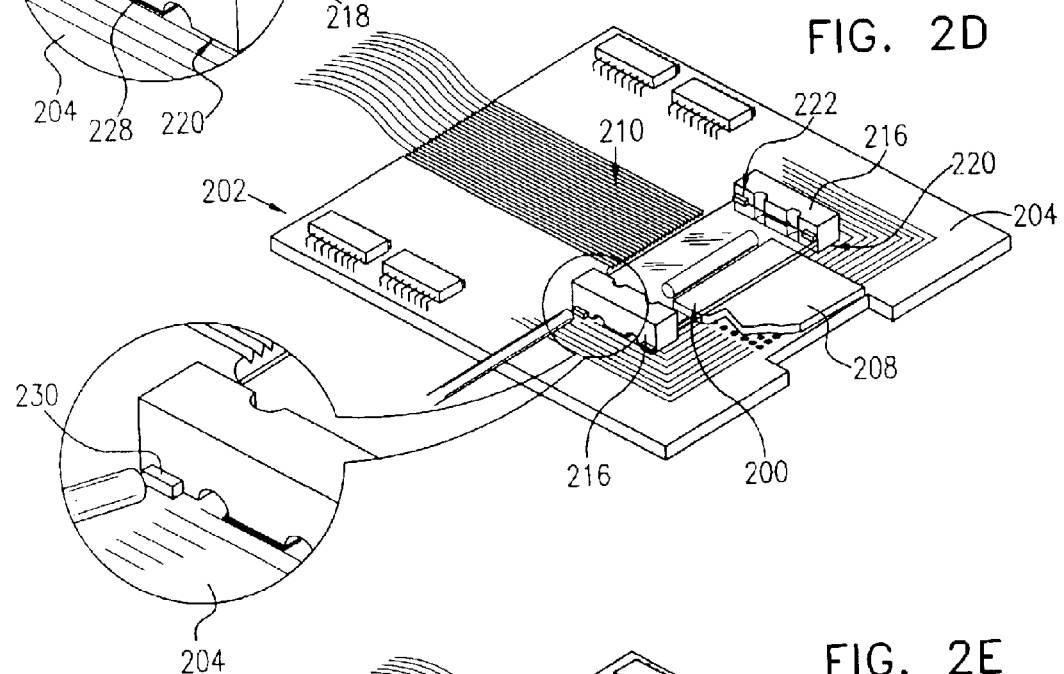
Figure 2E:
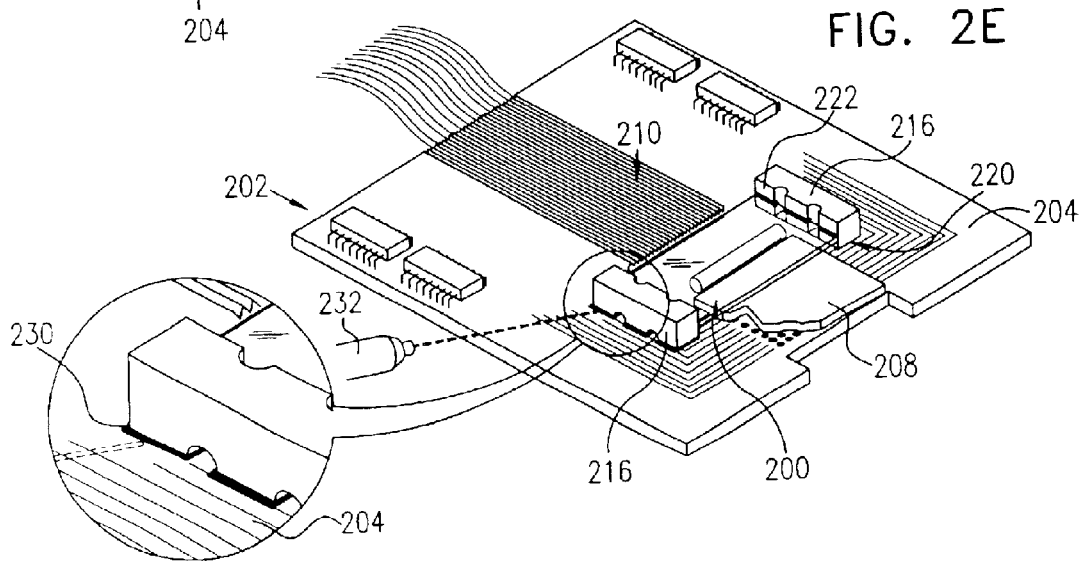

Preferably thereafter, as seen in FIG. 2D, a small quantity 230 of metallic adhesive is deposited alongside the junction of engagement areas 222 of surfaces 220 and substrate 204 and the junction of engagement areas 222 of surfaces 218 and an edge of the lens module 200. The metallic adhesive is then cured, as shown in FIG. 2E, preferably by application of energy thereto, preferably by means of a laser 232, which causes melting and reflow of the metallic adhesive. Alternatively, instead of using a laser, induced RF energy or heating may be employed to produce melting and reflow of the metallic adhesive.

Reference is now made to FIGS. 3A, 3B, 3C and 3D, which illustrate a method and system for accurately mounting an optical element in an optical assembly in accordance with a preferred embodiment of the present invention. As seen in FIGS. 3A–3D, a lens module 300 is precisely positioned in an optical assembly, here a multiple beam deflecting subassembly 302 of an optical switch. The lens module 300 is precisely positioned with respect to multiple reference surfaces, here including a substrate 304 and a facing edge 306 of an active integrated optics waveguide device 308.

The precise positioning of lens module 300 is carried out preferably with six degrees of freedom so as to achieve a high degree of accuracy in order to realize optimal optical coupling efficiency between fibers 310 fixed to substrate 304 and the waveguides formed in active integrated optics waveguide device 308. This degree of accuracy preferably reaches one tenth of a micron. A cylindrical lens 312, forming part of lens module 300, ensures that images of the centers of the ends of fibers 310 lie in the same plane as the centers of the waveguides of waveguide device 308.

This precise mounting is preferably achieved by using a positioner (not shown) and a vacuum engagement assembly 314 to manipulate the lens module 300 relative to substrate 304 such that the mode of each optical fiber 310 matches the mode of at least one corresponding waveguide of waveguide device 308 with relatively low light loss.

The lens module 300 is mounted in a desired relative position on the substrate 304 independently of the positioner by employing side mounting blocks 316 to fix the module 300 in position on substrate 304 upon precise mutual alignment of the lens module 300 and the waveguide device 308.

Preferably side mounting blocks 316 are carefully positioned alongside lens module 300 and are bonded thereto and to substrate 304.

In accordance with a preferred embodiment of the present invention side mounting, blocks 316 are bonded to lens module 300 and to substrate 304 by employing a non-metallic adhesive for initially fixing the side mounting blocks to lens module 300 and to substrate 304 in a desired position and thereafter employing a metallic adhesive for permanently fixing the side mounting blocks 316 to the lens module 300 and to the substrate 304 in the desired position.

Normally, the metallic adhesive cures at a temperature substantially higher than the curing temperature of the non-metallic adhesive. Examples of a suitable metallic adhesive include. tin, gold, indium and various combinations thereof. Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, each of the side mounting blocks 316 is formed with adjacent bonding surfaces 318 and 320 which are configured to define separate metallic adhesive engagement areas 322 and non-metallic adhesive engagement areas 324. Preferably engagement areas 322 and 324 are separated by grooves 326. In the illustrated embodiment a suitable metallic adhesive 327 is preferably applied to metallic adhesive engagement areas 322, but can be applied to each or any of engagement areas 322, lens module 300 and substrate 304.

It may be appreciated that preferably, side mounting blocks 316 are identical. Notwithstanding the fact that the drawings typically show operations involving only one of the side mounting blocks 316, it is to be understood that typically similar or identical operations take place with both side mounting blocks 316.

Figure 3A:
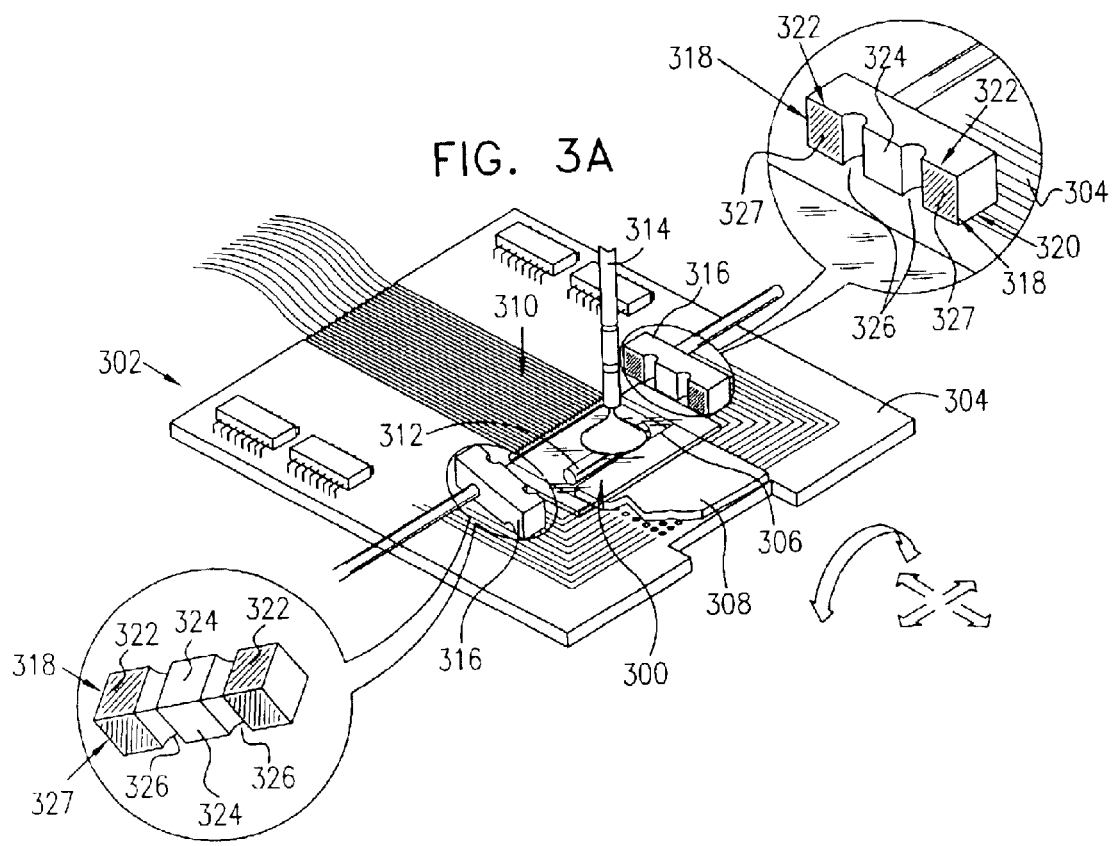
FIGS. 3A, 3B, 3C and 3D illustrate a method and system for accurately mounting an optical element in an optical assembly in accordance with a preferred embodiment of the present invention.
Figure 3B:
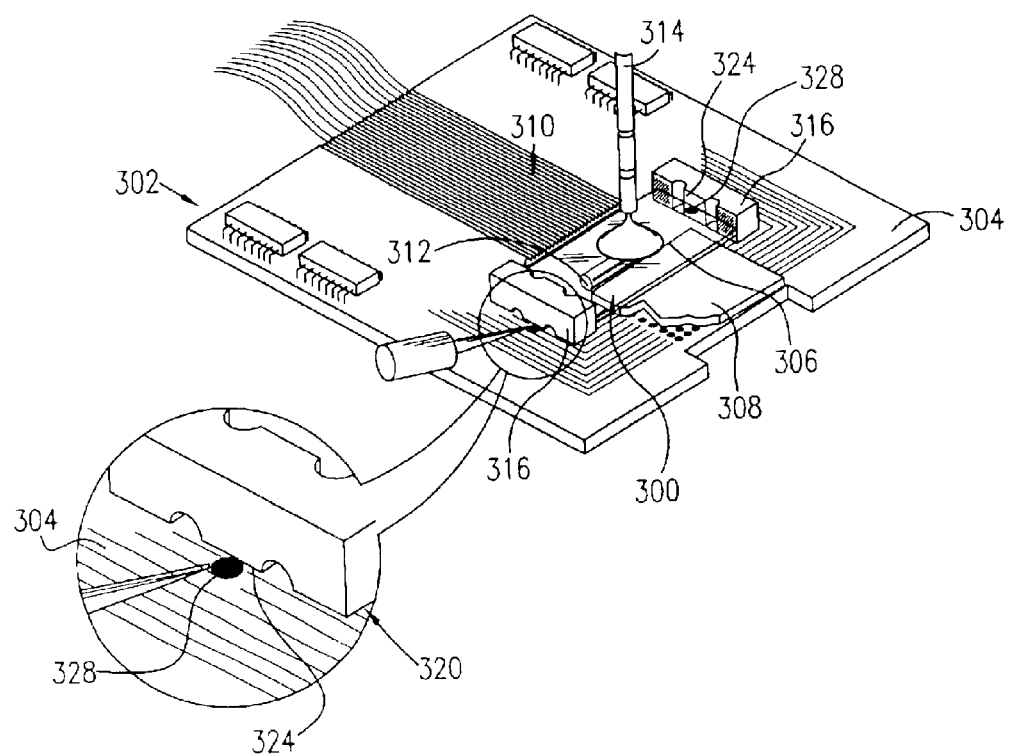
Figure 3C:
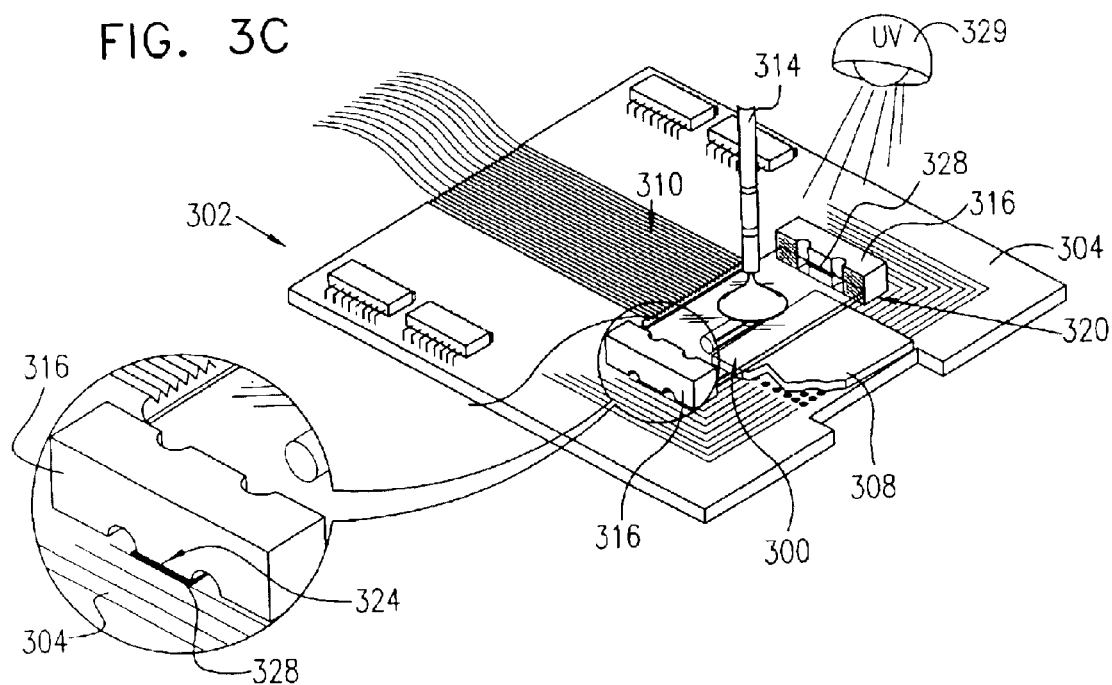

Preferably, as seen in FIG. 3B, side mounting blocks 316 are carefully positioned alongside lens module 300 and a small quantity 328 of non-metallic adhesive is deposited alongside the junction of engagement areas 324 of surfaces 320 and substrate 304 and the junction of engagement areas 324 of surfaces 318 and an edge of the lens module 300. The non-metallic adhesive is then cured as shown in FIG. 3C, as by UV curing employing a UV source 329, for initial bonding of the side mounting blocks 316 to substrate 304 and to lens module 300. A thin layer, preferably of thickness less than 10 microns, of the non-metallic adhesive, such as a UV curable adhesive, is preferably employed. Bonding of side mounting blocks 316 to substrate 304 preferably takes place prior to bonding of side mounting blocks 316 to lens module 300, however this need not necessarily be the case.

Figure 3D:
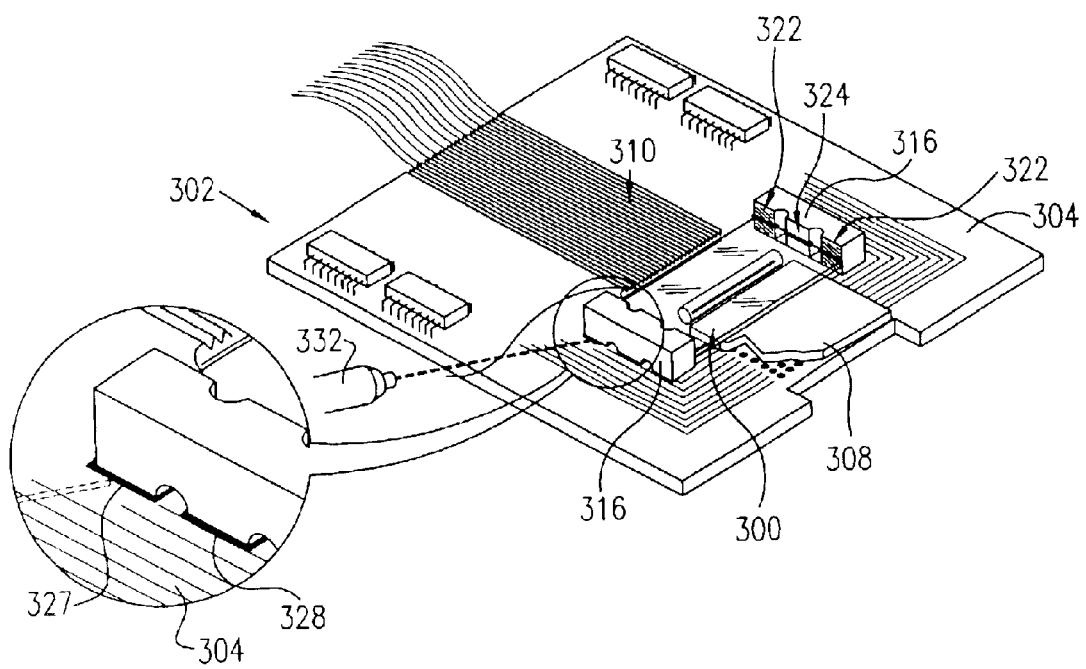

Preferably thereafter, as seen in FIG. 3D, the metallic adhesive 327 is then cured, preferably by application of energy thereto, preferably by means of a laser 332, which causes melting and reflow of the metallic adhesive. Alternatively, instead of using a laser, induced RF energy or heating may be employed to produce melting and reflow of the metallic adhesive.

Reference is now made to FIGS. 4A, 4B, 4C and 4D, which illustrate a method and system for accurately mounting an optical element in an optical assembly in accordance with a preferred embodiment of the present invention. As seen in FIGS. 4A–4D, a lens module 400 is precisely positioned in an optical assembly, here a multiple beam deflecting subassembly 402 of an optical switch. The lens module 400 is precisely positioned with respect to multiple reference surfaces, here including a substrate 404 and a facing edge 406 of an active integrated optics waveguide device 408.

The precise positioning of lens module 400 is carried out preferably with six degrees of freedom so as to achieve a high degree of accuracy in order to realize optimal optical coupling efficiency between fibers 410 fixed to substrate 404 and the waveguides formed in active integrated optics waveguide device 408. This degree of accuracy preferably reaches one tenth of a micron. A cylindrical lens 412, forming part of lens module 400, ensures that images of the centers of the ends of fibers 410 lie in the same plane as the centers of the waveguides of waveguide device 408.

This precise mounting is preferably achieved by using a positioner (not shown) and a vacuum engagement assembly 414 to manipulate the lens module 400 relative to substrate 404 such that the mode of each optical fiber 410 matches the mode of at least one corresponding waveguide of waveguide device 408 with relatively low light loss.

The lens module 400 is mounted in a desired relative position on the substrate 404 independently of the positioner by employing side mounting blocks 416 to fix the module 400 in position on substrate 404 upon precise mutual alignment of the lens module 400 and the waveguide device 408.

Preferably side mounting blocks 416 are carefully positioned alongside lens module 400 and are bonded thereto and to substrate 404.

In accordance with a preferred embodiment of the present invention side mounting blocks 416 are bonded to lens module 400 and to substrate 404 by employing a non-metallic adhesive for initially fixing the side mounting blocks to lens module 400 and to substrate 404 in a desired position and thereafter employing a metallic adhesive for permanently fixing the side mounting blocks 416 to the lens module 400 and to the substrate 404 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, each of the side mounting blocks 416 is formed with adjacent bonding surfaces 418 and 420 which are configured to define separate metallic adhesive engagement areas 422 and non-metallic adhesive engagement areas 424. Preferably engagement areas 422 and 424 are separated by grooves 426. In the illustrated embodiment a suitable non-metallic adhesive 428 is preferably applied to non-metallic adhesive engagement areas 424, but can be applied to each or any of engagement areas 424, lens module 400 and substrate 404. A thin layer, preferably of thickness less than 10 microns, of the non-metallic adhesive 428, such as a UV curable adhesive, is preferably employed.

It may be appreciated that preferably, side mounting blocks 416 are identical. Notwithstanding the fact that the drawings typically show operations involving only one of the side mounting blocks 416, it is to be understood that typically similar or identical operations take place with both side mounting blocks 416.

Figure 4A:
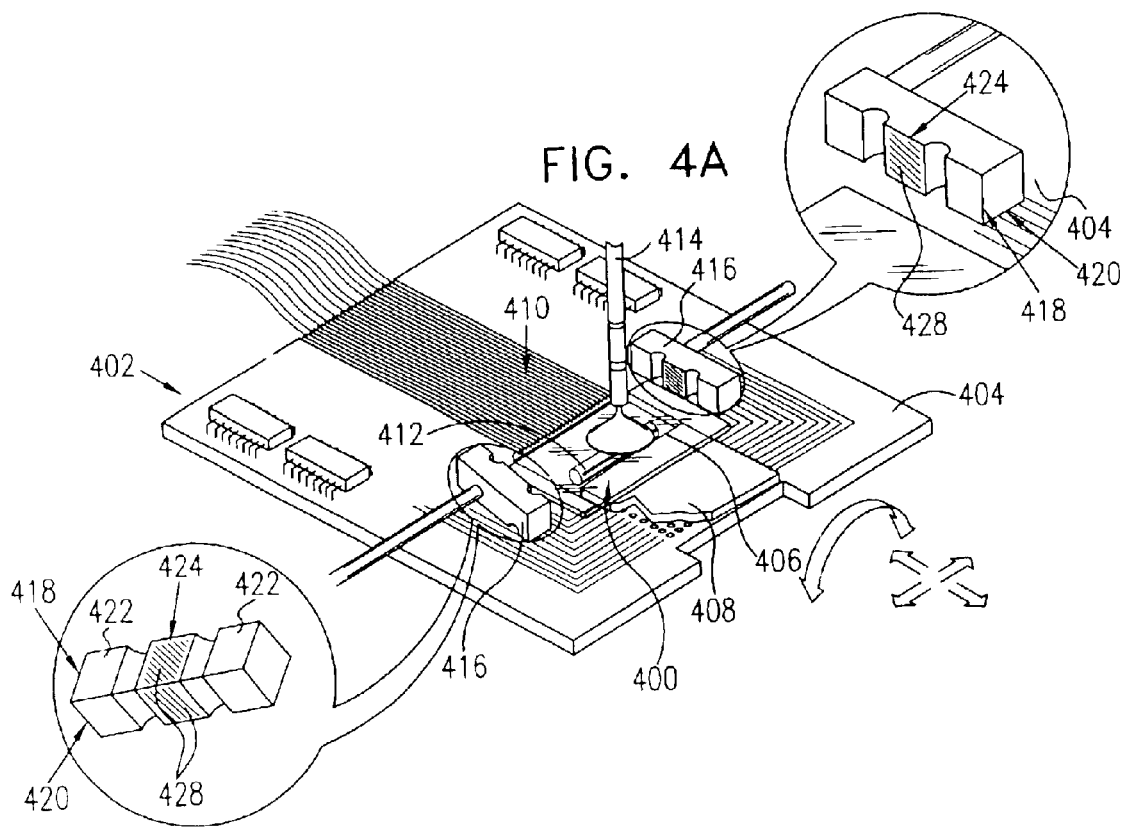
FIGS. 4A, 4B, 4C and 4D illustrate a method and system for accurately mounting an optical element in an optical assembly in accordance with a preferred embodiment of the present invention.
Figure 4B:
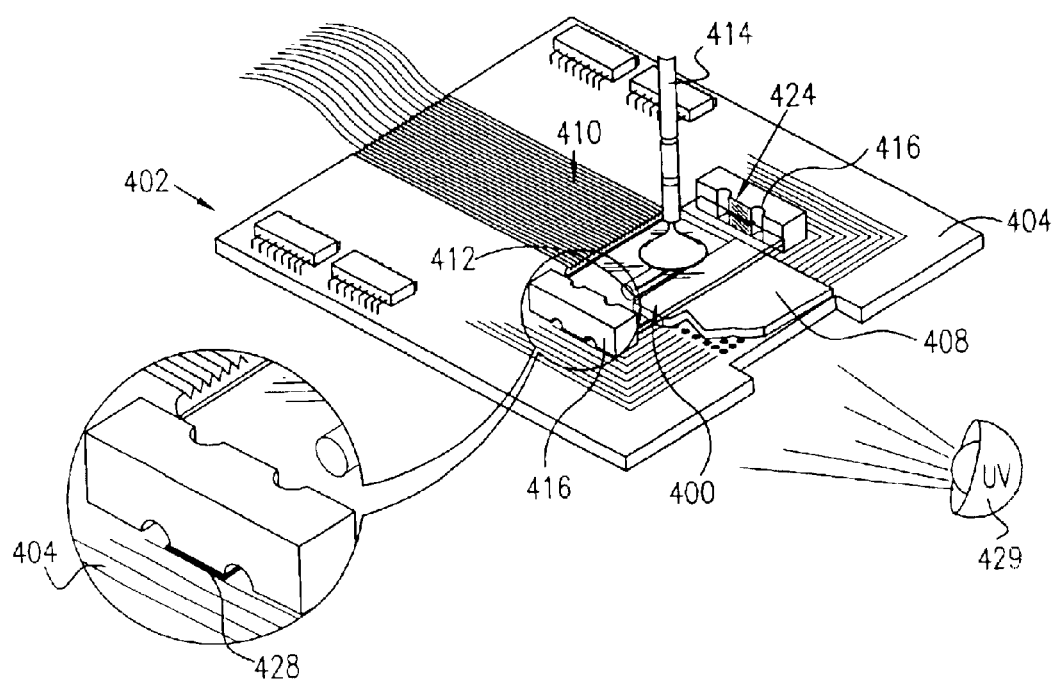

Preferably, as seen in FIG. 4B, side mounting blocks 416 are carefully positioned alongside lens module 400 and the non-metallic adhesive 428 is then cured, as by UV curing employing a UV source 429, for initial bonding of the side mounting blocks 416 to substrate 404 and to lens module 400. Bonding of side mounting blocks 416 to substrate 404 preferably takes place prior to bonding of side mounting blocks 416 to lens module 400, however this need not necessarily be the case.

Figure 4C:
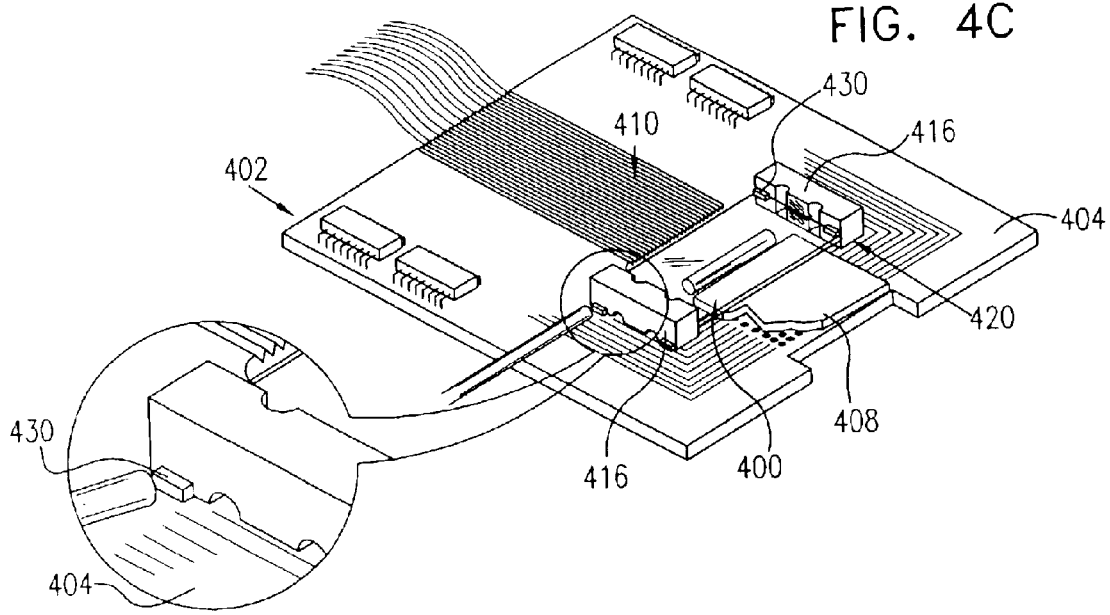
Figure 4D:
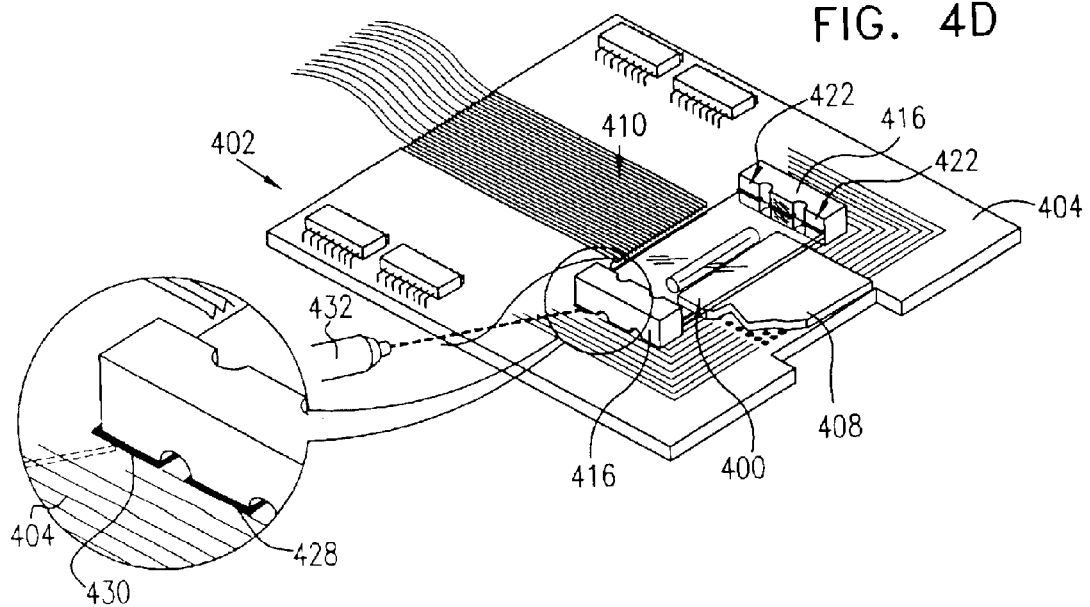

Preferably thereafter, as seen in FIG. 4C, a small quantity 430 of metallic adhesive is deposited alongside the junction of engagement areas 422 of surfaces 420 and substrate 404 and the junction of engagement areas 422 of surfaces 418 and an edge of the lens module 400. The metallic adhesive is then cured, as shown in FIG. 4D, preferably by application of energy thereto, preferably by means of a laser 432, which causes melting and reflow of the metallic adhesive. Alternatively, instead of using a laser, induced RF energy or heating may be employed to produce melting and reflow of the metallic adhesive.

Figure 5A:
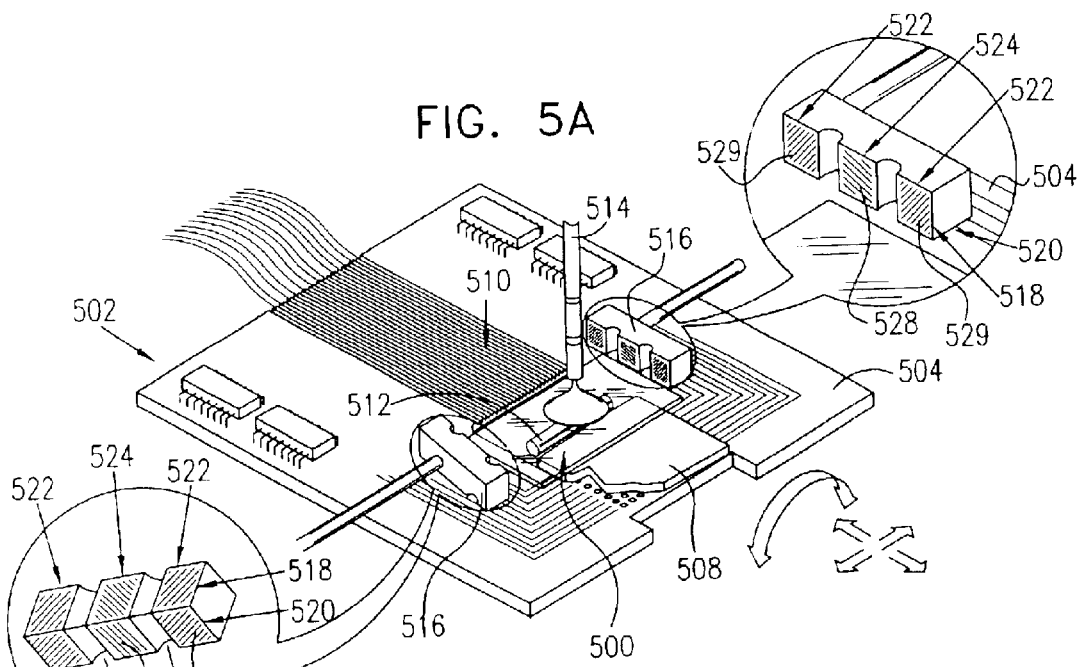
FIGS. 5A, 5B and 5C illustrate a method and system for accurately mounting an optical element in an optical assembly in accordance with a preferred embodiment of the present invention.
Figure 5B:
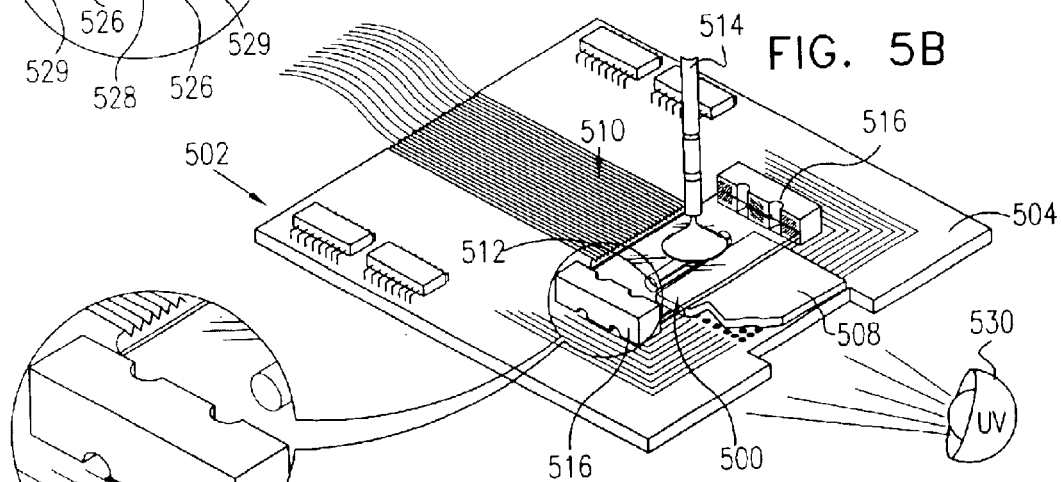
Figure 5C:
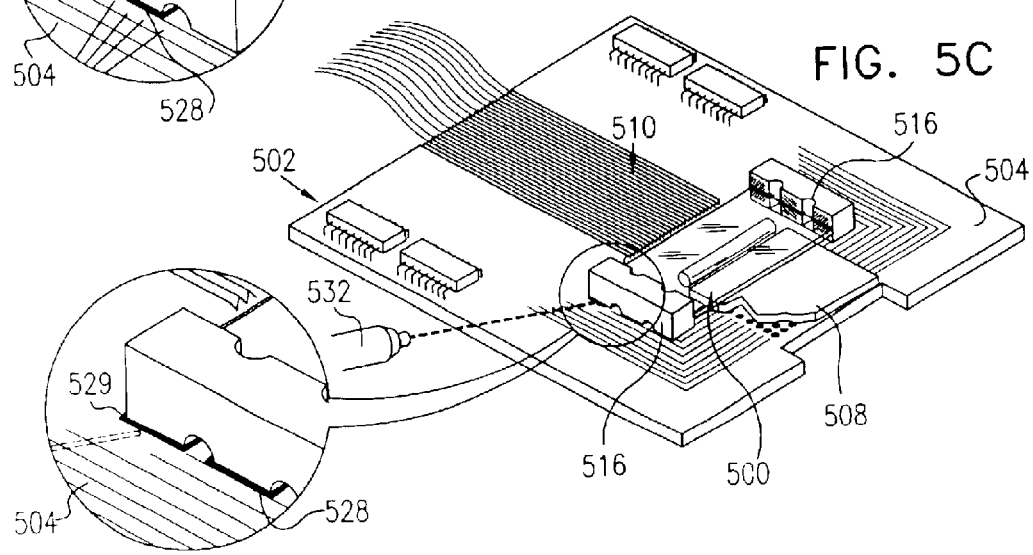

Reference is now made to FIGS. 5A, 5B and 5C, which illustrate a method and system for accurately mounting an optical element in an optical assembly in accordance with a preferred embodiment of the present invention. As seen in FIGS. 5A–5C, a lens module 500 is precisely positioned in an optical assembly, here a multiple beam deflecting subassembly 502 of an optical switch. The lens module 500 is precisely positioned with respect to multiple reference surfaces, here including a substrate 504 and a facing edge 506 of an active integrated optics waveguide device 508.

The precise positioning of lens module 500 is carried out preferably with six degrees of freedom so as to achieve a high degree of accuracy in order to realize optimal optical coupling efficiency between fibers 510 fixed to substrate 504 and the waveguides formed in active integrated optics waveguide device 508. This degree of accuracy preferably reaches one tenth of a micron. A cylindrical lens 512, forming part of lens module 500, ensures that images of the centers of the ends of fibers 510 lie in the same plane as the centers of the waveguides of waveguide device 508.

This precise mounting is preferably achieved by using a positioner (not shown) and a vacuum engagement assembly 514 to manipulate the lens module 500 relative to substrate 504 such that the mode of each optical fiber 510 matches the mode of at least one corresponding waveguide of waveguide device 508 with relatively low light loss.

The lens module 500 is mounted in a desired relative position on the substrate 504 independently of the positioner by employing side mounting blocks 516 to fix the module 500 in position on substrate 504 upon precise mutual alignment of the lens module 500 and the waveguide device 508.

Preferably side mounting blocks 516 are carefully positioned alongside lens module 500 and are bonded thereto and to substrate 504.

In accordance with a preferred embodiment of the present invention side mounting blocks 516 are bonded to lens module 500 and to substrate 504 by employing a non-metallic adhesive for initially fixing the side mounting blocks to lens module 500 and to substrate 504 in a desired position and thereafter employing a metallic adhesive for permanently fixing the side mounting blocks 516 to the lens module 500 and to the substrate 504 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, each of the side mounting blocks 516 is formed with adjacent bonding surfaces 518 and 520 which are configured to define separate metallic adhesive engagement areas 522 and non-metallic adhesive engagement areas 524. Preferably engagement areas 522 and 524 are separated by grooves 526. In the illustrated embodiment a suitable non-metallic adhesive 528 is preferably applied to non-metallic adhesive engagement areas 524 and a suitable metallic adhesive 529 is preferably applied to metallic adhesive engagement areas 522, but metallic and non-metallic adhesives can be applied to each or any of engagement areas 522 & 524, lens module 500 and substrate 504. A thin layer, preferably of thickness less than 10 microns, of the non-metallic adhesive 528, such as a UV curable adhesive, is preferably employed.

It may be appreciated that preferably, side mounting blocks 516 are identical. Notwithstanding the fact that the drawings typically show operations involving only one of the side mounting blocks 516, it is to be understood that typically similar or identical operations take place with both side mounting blocks 516.

Preferably, as seen in FIG. 5B, side mounting blocks 516 are carefully positioned alongside lens module 500 and the non-metallic adhesive 528 is then cured, as by UV curing, employing a UV source 530, for initial bonding of the side mounting blocks 516 to substrate 504 and to lens module 500. Bonding of side mounting blocks 516 to substrate 504 preferably takes place prior to bonding of side mounting blocks 516 to lens module 500, however this need not necessarily be the case.

Preferably thereafter, as seen in FIG. 5C, the metallic adhesive 529 is then cured, preferably by application of energy thereto, preferably by means of a laser 532, which causes melting and reflow of the metallic adhesive. Alternatively, instead of using a laser, induced RF energy or heating may be employed to produce melting and reflow of the metallic adhesive.

Reference is now made to FIGS. 6A, 6B, 6C and 6D, which illustrate a method and system for accurately mounting an optical element in an optical assembly in accordance with a preferred embodiment of the present invention. As seen in FIGS. 6A, 6B, 6C and 6D, there is provided a method for accurately mounting an optical element in an optical assembly including precisely positioning an optical element in a desired position with respect to a reference surface, employing a non-metallic adhesive for initially fixing said optical element in said desired position and thereafter employing a metallic adhesive for permanently fixing said optical element in said desired position.

Figure 6A:
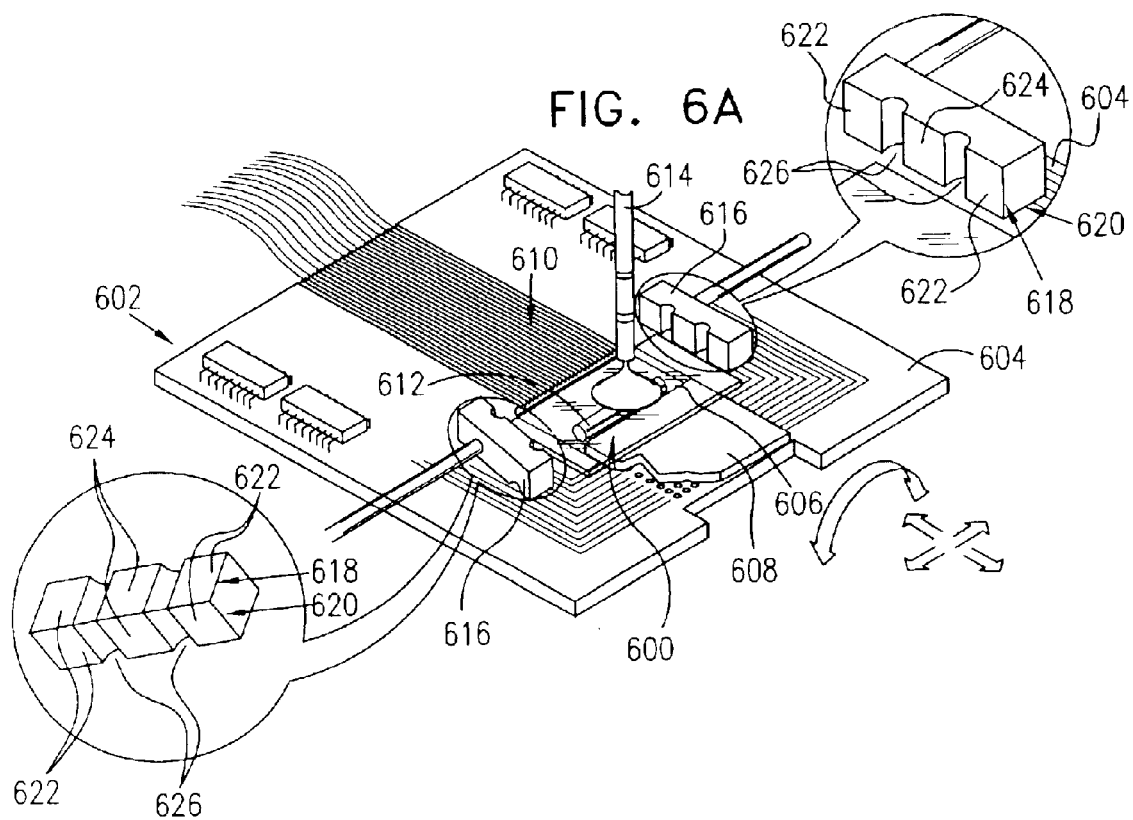
FIGS. 6A, 6B, 6C and 6D illustrate a method and system for accurately mounting an optical element in an optical assembly in accordance with a preferred embodiment of the present invention.

Turning to FIG. 6A, an optical element in the form of a lens module 600 is precisely positioned in an optical assembly, here a multiple beam deflecting subassembly 602 of an optical switch. The lens module 600 is precisely positioned with respect to multiple reference surfaces, here including a substrate 604 and a facing edge 606 of an active integrated optics waveguide device 608.

The precise positioning of lens module 600 is carried out preferably with six degrees of freedom so as to achieve a high degree of accuracy in order to realize optimal optical coupling efficiency between fibers 610 fixed to substrate 604 and the waveguides formed in active integrated optics waveguide device 608. This degree of accuracy preferably reaches one tenth of a micron. A cylindrical lens 612, forming part of lens module 600, ensures that images of the centers of the ends of fibers 610 lie in the same plane as the centers of the waveguides of waveguide device 608.

This precise mounting is preferably achieved by using a positioner (not shown) and a vacuum engagement assembly 614 to manipulate the lens module 600 relative to substrate 604 such that the mode of each optical fiber 610 matches the mode of at least one corresponding waveguide of waveguide device 608 with relatively low light loss.

The lens module 600 is mounted in a desired relative position on the substrate 604 independently of the positioner by employing side mounting blocks 616 to fix the module 600 in position on substrate 604 upon precise mutual alignment of the lens module 600 and the waveguide device 608.

Preferably side mounting blocks 616 are carefully positioned alongside lens module 600 and are bonded thereto and to substrate 604.

In accordance with a preferred embodiment of the present invention side mounting blocks 616 are bonded to lens module 600 and to substrate 604 by employing a non-metallic adhesive for initially fixing the side mounting blocks to lens module 600 and to substrate 604 in a desired position and thereafter employing a metallic adhesive for permanently fixing the side mounting blocks 616 to the lens module 600 and to the substrate 604 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, each of the side mounting blocks 616 is formed with adjacent bonding surfaces 618 and 620 which are configured to define separate metallic adhesive engagement areas 622 and non-metallic adhesive engagement areas 624. Preferably engagement areas 622 and 624 are separated by grooves 626.

It may be appreciated that preferably, side mounting blocks 616 are identical. Notwithstanding the fact that the drawings typically show operations involving only one of the side mounting blocks 616, it is to be understood that typically similar or identical operations take place with both side mounting blocks 616.

Figure 6B:
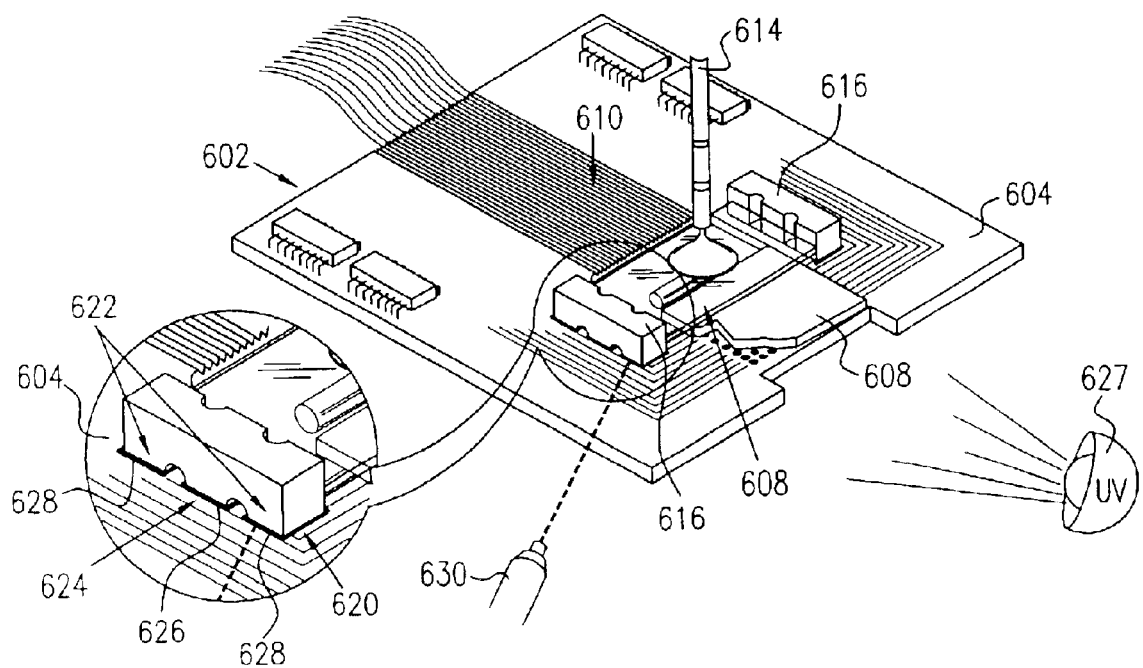

Preferably, as seen in FIG. 6B, side mounting blocks 616 are carefully positioned alongside lens module 600 and are initially bonded to substrate 604 using a thin layer, preferably of thickness less than 10 microns, of a non-metallic adhesive 626, such as a UV curable adhesive, which engages engagement areas 624 on bonding surfaces 620 and is then cured, as by UV curing employing a UV source 627, for initial bonding of the side mounting blocks 616 to substrate 604. Side mounting blocks 616 are thereafter permanently bonded to substrate 604 using a metallic adhesive 628, preferably tin-gold which is preferably thin but need not be as thin as the layer of non-metallic adhesive 626. The metallic adhesive 628 engages engagement areas 622 on bonding surfaces 620 and is adhered preferably by application of energy thereto, preferably by means of a laser 630, which causes melting and reflow of the metallic adhesive 628. Alternatively instead of using a laser, induced RF energy or heating may be employed to produce melting and reflow of the metallic adhesive.

Figure 6C:
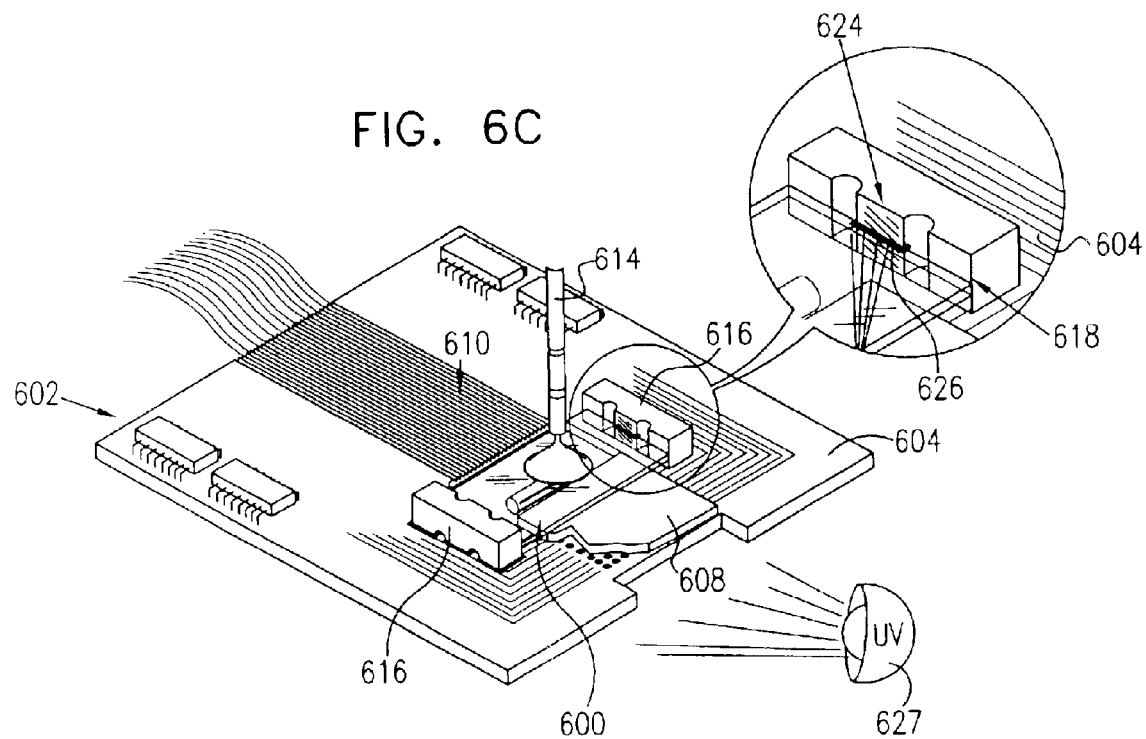

Preferably thereafter, as seen in FIG. 6C, side mounting blocks 616 are initially bonded to lens module 600 using a thin layer, preferably of thickness less than 10 microns, of a non-metallic adhesive 626, such as a UV curable adhesive, which engages engagement areas 624 on bonding surfaces 618. Non-metallic adhesive 626 is then cured, as by UV curing employing a UV source 627, for initial bonding of the side mounting blocks 616 to lens module 600.

Figure 6D:
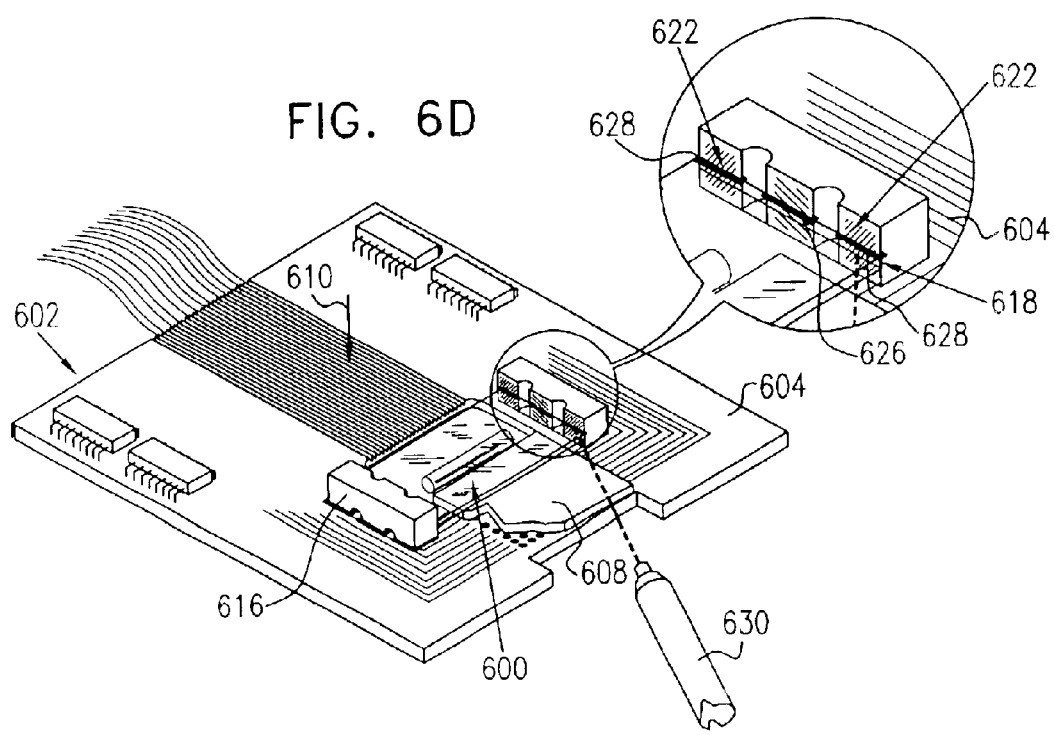

Thereafter, as shown in FIG. 6D, side mounting blocks 616 are permanently bonded to lens module 600 using a metallic adhesive 628, preferably tin-gold, which is preferably thin but need not be as thin as the layer of non-metallic adhesive 626. The metallic adhesive 628 engages engagement areas 622 on bonding surfaces 618 and is adhered preferably by application of energy thereto, preferably by means of a laser 626, which causes melting and reflow of the metallic adhesive. Alternatively, instead of using a laser, induced RF energy or heating may be employed to produce melting and reflow of the metallic adhesive.

It is a particular feature of the present invention that the precise positioning of the lens module 600 in a desired position with respect to substrate 604, and fixing lens module 600 in the desired position is preferably achieved by employing side mounting blocks 616 and fixing bonding surface 620 to substrate 604 prior to fixing bonding surface 618 to lens module 600.

This fixing of side mounting blocks 616 to substrate 604 prior to fixing the lens module 600 to the side mounting blocks 616 provides for a high degree of accuracy in the spacing between the lens module 600 and the substrate 604, inasmuch as it avoids displacement of the lens module 600 toward or away from the substrate as the result of the curing of the adhesive used in fixing the bonding surface 620 to substrate 604, thereby realizing optimal optical coupling efficiency between fibers 610 fixed to substrate 604 and the waveguides formed in active integrated optics waveguide device 608.

Reference is now made to FIGS. 7A, 7B, 7C, 7D, 7E, 7F, 7G, 7H and 7I, which illustrate a method and system for accurately mounting an optical element in an optical assembly in accordance with a preferred embodiment of the present invention. As seen in FIGS. 7A–7I, a lens module 700 is precisely positioned in an optical assembly, here a multiple beam deflecting subassembly 702 of an optical switch. The lens module 700 is precisely positioned with respect to multiple reference surfaces, here including a substrate 704 and a facing edge 706 of an active integrated optics waveguide device 708.

The precise positioning of lens module 700 is carried out preferably with six degrees of freedom so as to achieve a high degree of accuracy in order to realize optimal optical coupling efficiency between fibers 710 fixed to substrate 704 and the waveguides formed in active integrated optics waveguide device 708. This degree of accuracy preferably reaches one tenth of a micron. A cylindrical lens 712, forming part of lens module 700, ensures that images of the centers of the ends of fibers 710 lie in the same plane as the centers of the waveguides of waveguide device 708.

This precise mounting is preferably achieved by using a positioner (not shown) and a vacuum engagement assembly 714 to manipulate the lens module 700 relative to substrate 704 such that the mode of each optical fiber 710 matches the mode of at least one corresponding waveguide of waveguide device 708 with relatively low light loss.

The lens module 700 is mounted in a desired relative position on the substrate 704 independently of the positioner by employing side mounting blocks 716 to fix the module 700 in position on substrate 704 upon precise mutual alignment of the lens module 700 and the waveguide device 708.

Preferably side mounting blocks 716 are carefully positioned alongside lens module 700 and are bonded thereto and to substrate 704.

In accordance with a preferred embodiment of the present invention side mounting blocks 716 are bonded to lens module 700 and to substrate 704 by employing a non-metallic adhesive for initially fixing the side mounting blocks to lens module 700 and to substrate 704 in a desired position and thereafter employing a metallic adhesive for permanently fixing the side mounting blocks 716 to the lens module 700 and to the substrate 704 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, each of the side mounting blocks 716 is formed with adjacent bonding surfaces 718 and 720 which are configured to define separate metallic adhesive engagement areas 722 and non-metallic adhesive engagement areas 724. Preferably engagement areas 722 and 724 are separated by grooves 726.

It may be appreciated that preferably, side mounting blocks 716 are identical. Notwithstanding the fact that the drawings typically show operations involving only one of the side mounting blocks 716, it is to be understood that typically similar or identical operations take place with both side mounting blocks 716.

Figure 7A:
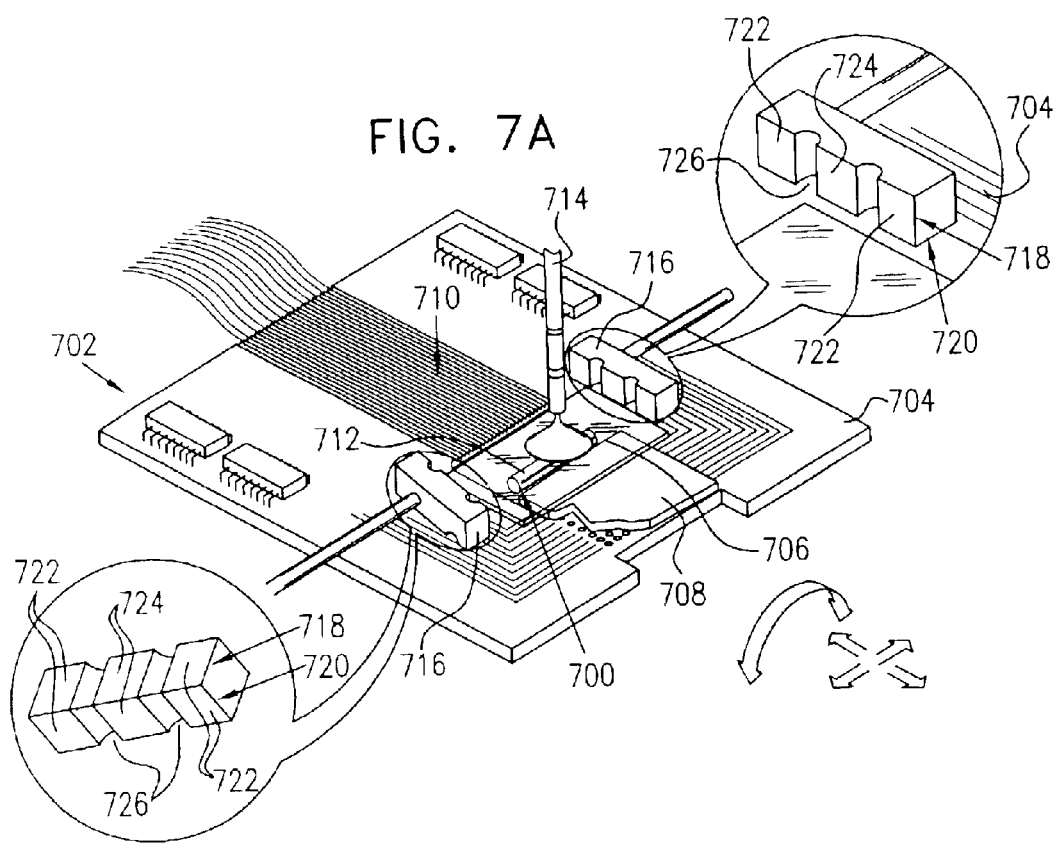
FIGS. 7A, 7B, 7C, 7D, 7E, 7F, 7G, 7H & 7I illustrate a method and system for accurately mounting an optical element in an optical assembly in accordance with a preferred embodiment of the present invention.
Figure 7B:
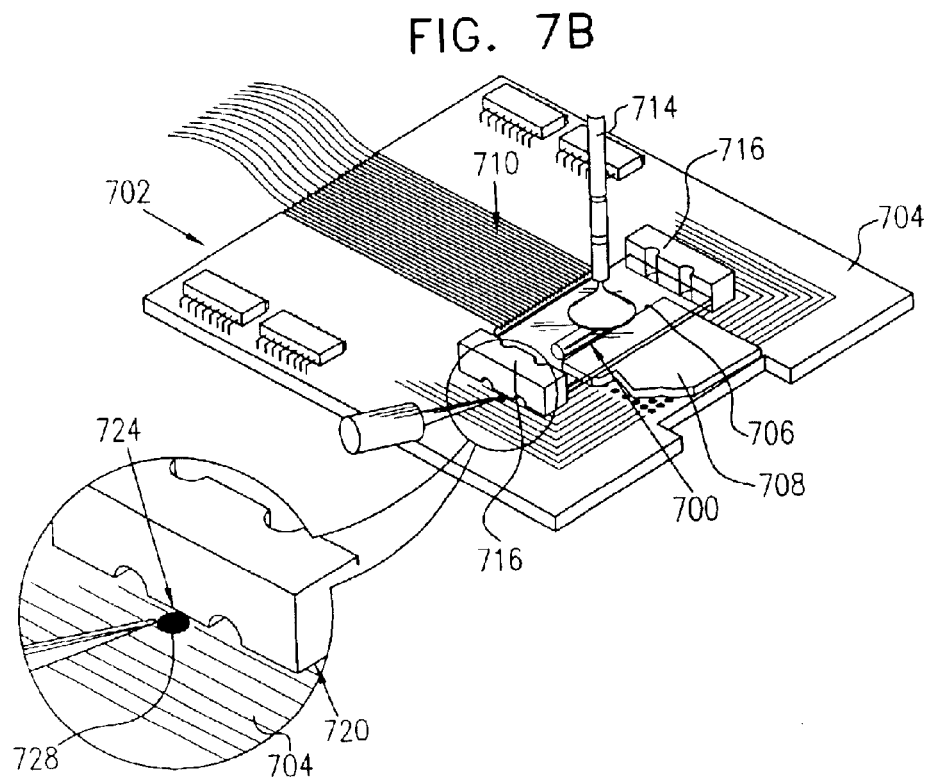
Figure 7C:
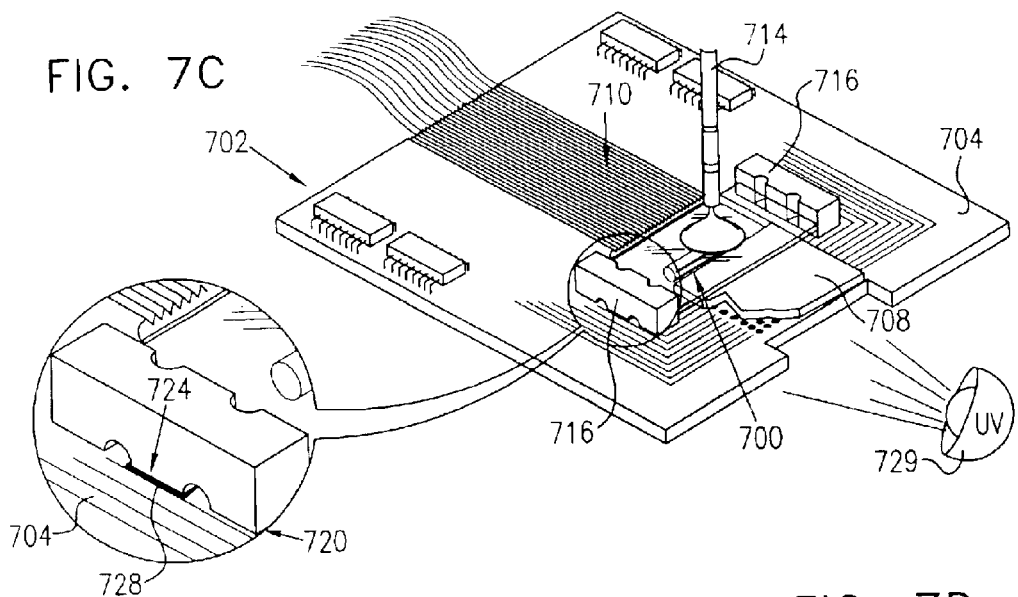

Preferably, as seen in FIG. 7B, side mounting blocks 716 are carefully positioned alongside lens module 700 and a small quantity 728 of non-metallic adhesive is deposited alongside the junction of engagement areas 724 of surfaces 720 and substrate 704. The non-metallic adhesive is then cured, as shown in FIG. 7C, as by UV curing employing a UV source 729, for initial bonding of the side mounting blocks 716 to substrate 704. A thin layer, preferably of thickness less than 10 microns, of the non-metallic adhesive, such as a UV curable adhesive, is preferably employed.

Figure 7D:
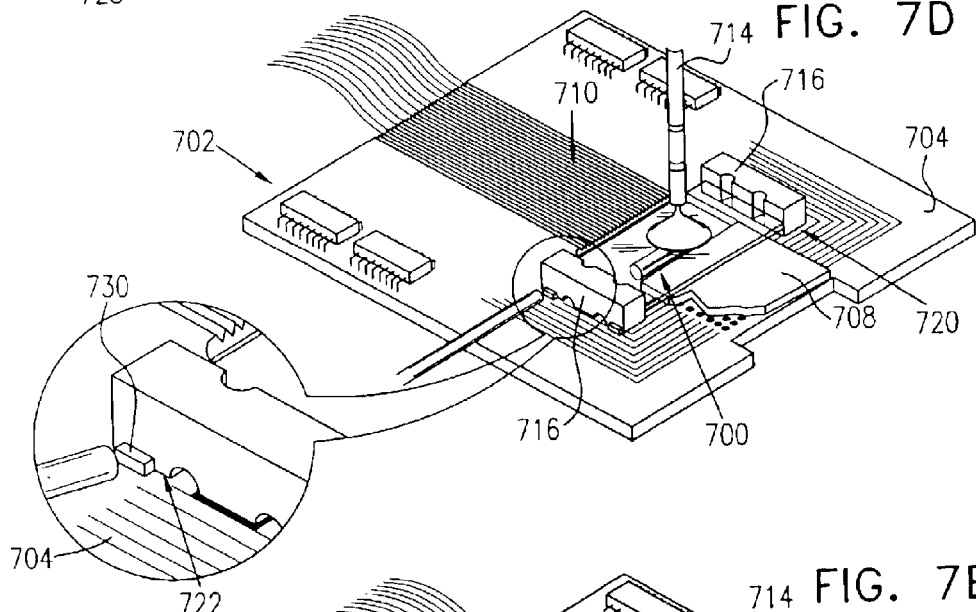
Figure 7E:
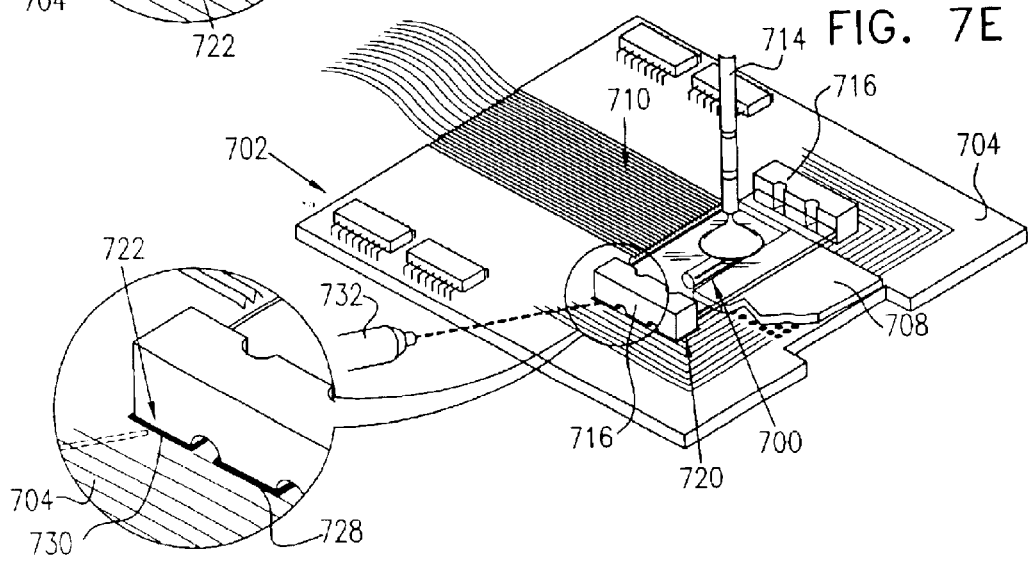

Preferably thereafter, as seen in FIG. 7D, a small quantity 730 of metallic adhesive is deposited alongside the junction of engagement areas 722 of surfaces 720 and substrate 704. The metallic adhesive is then cured, as shown in FIG. 7E, preferably by application of energy thereto, preferably by means of a laser 732, which causes melting and reflow of the metallic adhesive. Alternatively, instead of using a laser, induced RF energy or heating may be employed to produce melting and reflow of the metallic adhesive.

Figure 7F:
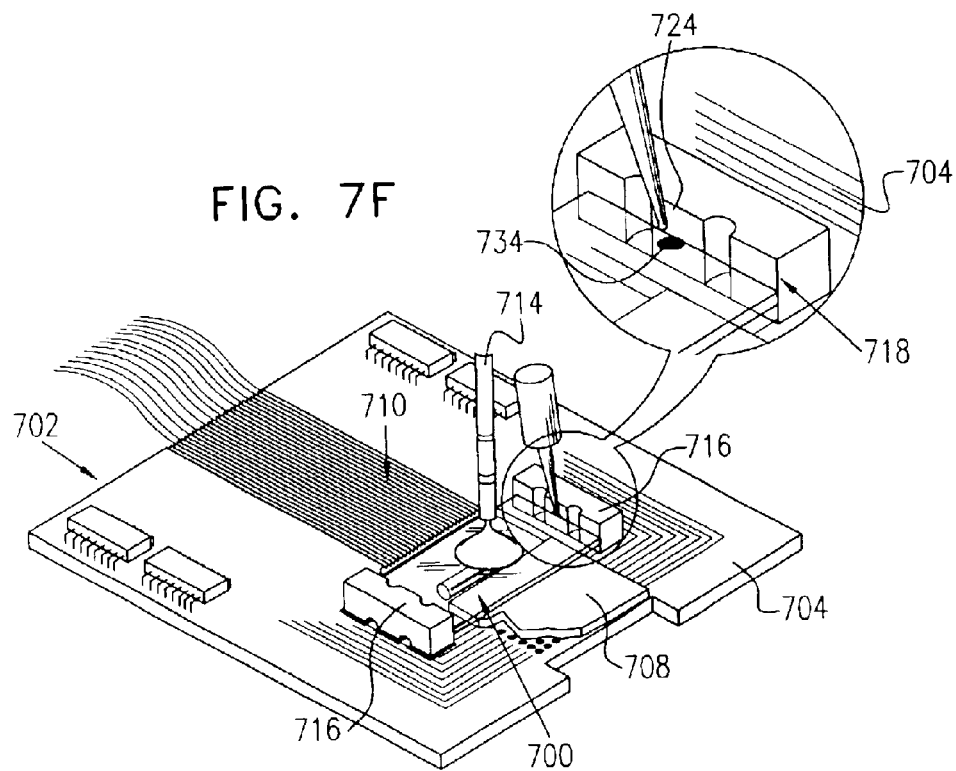
Figure 7G:
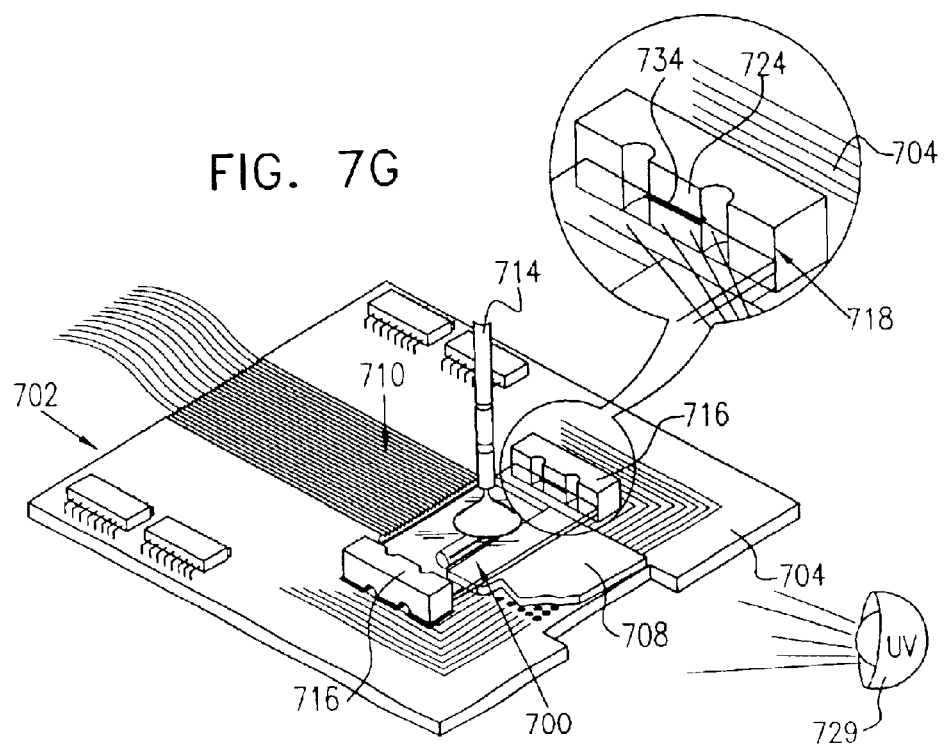

As seen in FIG. 7F a small quantity 734 of non-metallic adhesive is deposited alongside the junction of engagement areas 724 of surfaces 718 and an edge of the lens module 700. The non-metallic adhesive is then cured, as shown in FIG. 7G, as by UV curing, employing UV source 729, for initial bonding of the side mounting blocks 716 to lens module 700. A thin layer, preferably of thickness less than 10 microns, of the non-metallic adhesive, such as a UV curable adhesive, is preferably employed.

Figure 7H:
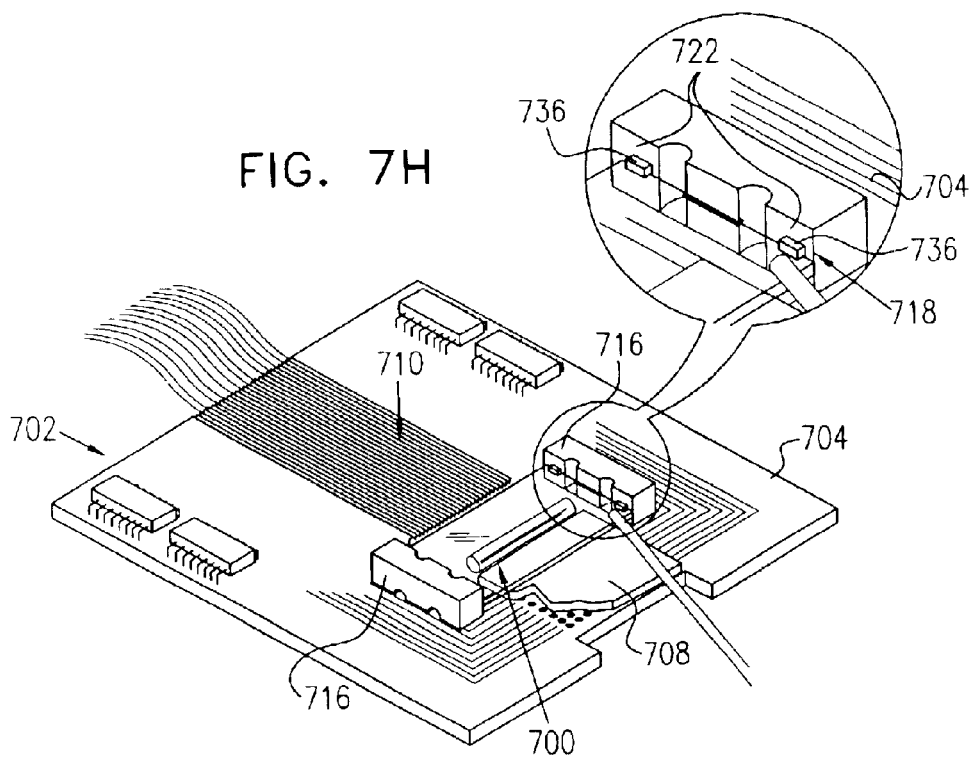
Figure 7I:
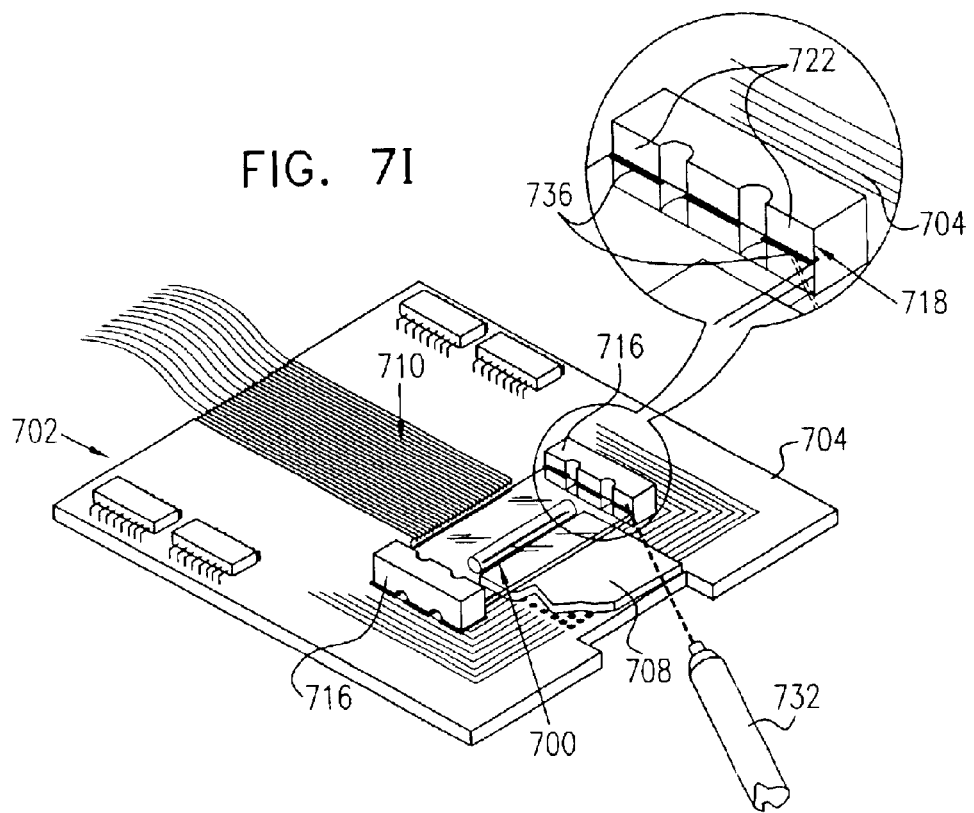

Preferably thereafter, as seen in FIG. 7H, a small quantity 736 of metallic adhesive is deposited alongside the junction of engagement areas 722 of surfaces 718 and lens module 700. The metallic adhesive is then cured, as shown in FIG. 7I, preferably by application of energy thereto, preferably by means of laser 732, which causes melting and reflow of the metallic adhesive. Alternatively, instead of using a laser, induced RF energy or heating may be employed to produce melting and reflow of the metallic adhesive.

Reference is now made to FIGS. 8A, 8B, 8C, 8D, 8E, 8F and 8G, which illustrate a method and system for accurately mounting an optical element in an optical assembly in accordance with a preferred embodiment of the present invention. As seen in FIGS. 8A–8G, a lens module 800 is precisely positioned in an optical assembly, here a multiple beam deflecting subassembly 802 of an optical switch. The lens module 800 is precisely positioned with respect to multiple reference surfaces, here including a substrate 804 and a facing edge 806 of an active integrated optics waveguide device 808.

The precise positioning of lens module 800 is carried out preferably with six degrees of freedom so as to achieve a high degree of accuracy in order to realize optimal optical coupling efficiency between fibers 810 fixed to substrate 804 and the waveguides formed in active integrated optics waveguide device 808. This degree of accuracy preferably reaches one tenth of a micron. A cylindrical lens 812, forming part of lens module 800, ensures that images of the centers of the ends of fibers 810 lie in the same plane as the centers of the waveguides of waveguide device 808.

This precise mounting is preferably achieved by using a positioner (not shown) and a vacuum engagement assembly 814 to manipulate the lens module 800 relative to substrate 804 such that the mode of each optical fiber 810 matches the mode of at least one corresponding waveguide of waveguide device 808 with relatively low light loss.

The lens module 800 is mounted in a desired relative position on the substrate 804 independently of the positioner by employing side mounting blocks 816 to fix the module 800 in position on substrate 804 upon precise mutual alignment of the lens module 800 and the waveguide device 808.

Preferably side mounting blocks 816 are carefully positioned alongside lens module 800 and are bonded thereto and to substrate 804.

In accordance with a preferred embodiment of the present invention side mounting blocks 816 are bonded to lens module 800 and to substrate 804 by employing a non-metallic adhesive for initially fixing the side mounting blocks to lens module 800 and to substrate 804 in a desired position and thereafter employing a metallic adhesive for permanently fixing the side mounting blocks 816 to the lens module 800 and to the substrate 804 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, each of the side mounting blocks 816 is formed with adjacent bonding surfaces 818 and 820 which are configured to define separate metallic adhesive engagement areas 822 and non-metallic adhesive engagement areas 824. Preferably engagement areas 822 and 824 are separated by grooves 826. In the illustrated embodiment a suitable metallic adhesive 828 is preferably applied to metallic adhesive engagement areas 822, but can be applied to each or any of engagement areas 822, lens module 800 and substrate 804.

It may be appreciated that preferably, side mounting blocks 816 are identical. Notwithstanding the fact that the drawings typically show operations involving only one of the side mounting blocks 816, it is to be understood that typically similar or identical operations take place with both side mounting blocks 816.

Figure 8A:
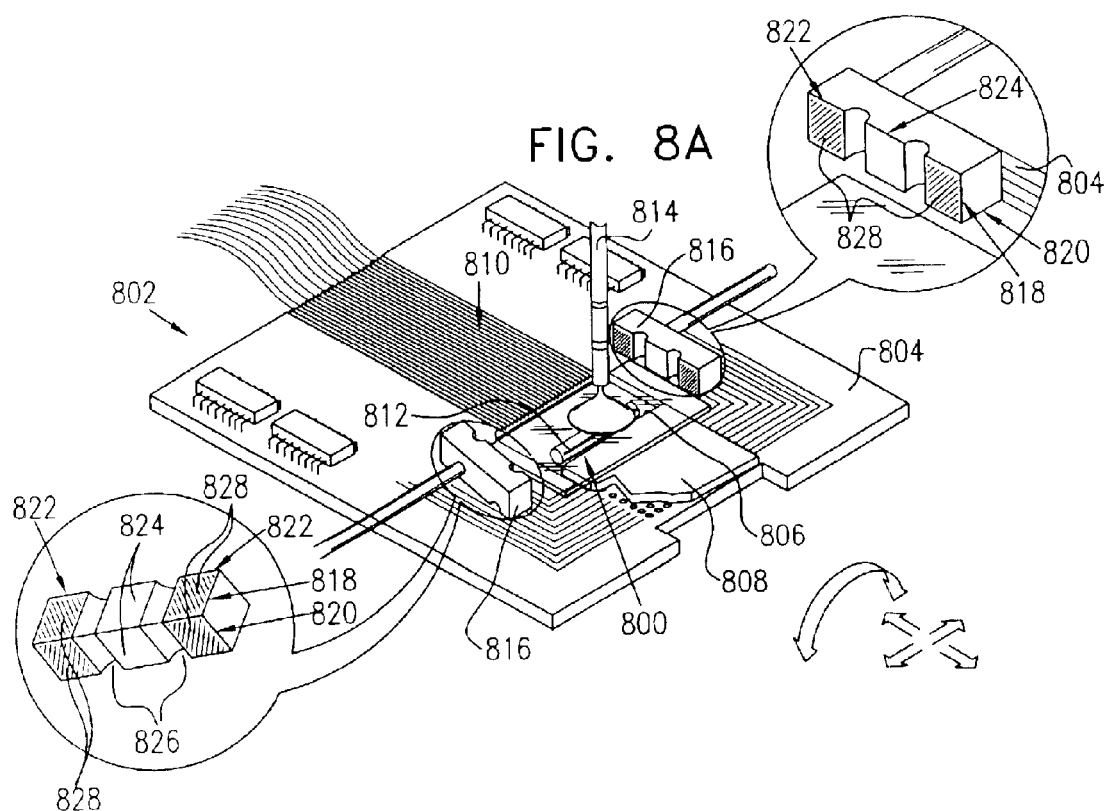
FIGS. 8A, 8B, 8C, 8D, 8E, 8F and 8G illustrate a method and system for accurately mounting an optical element in an optical assembly in accordance with a preferred embodiment of the present invention.
Figure 8B:
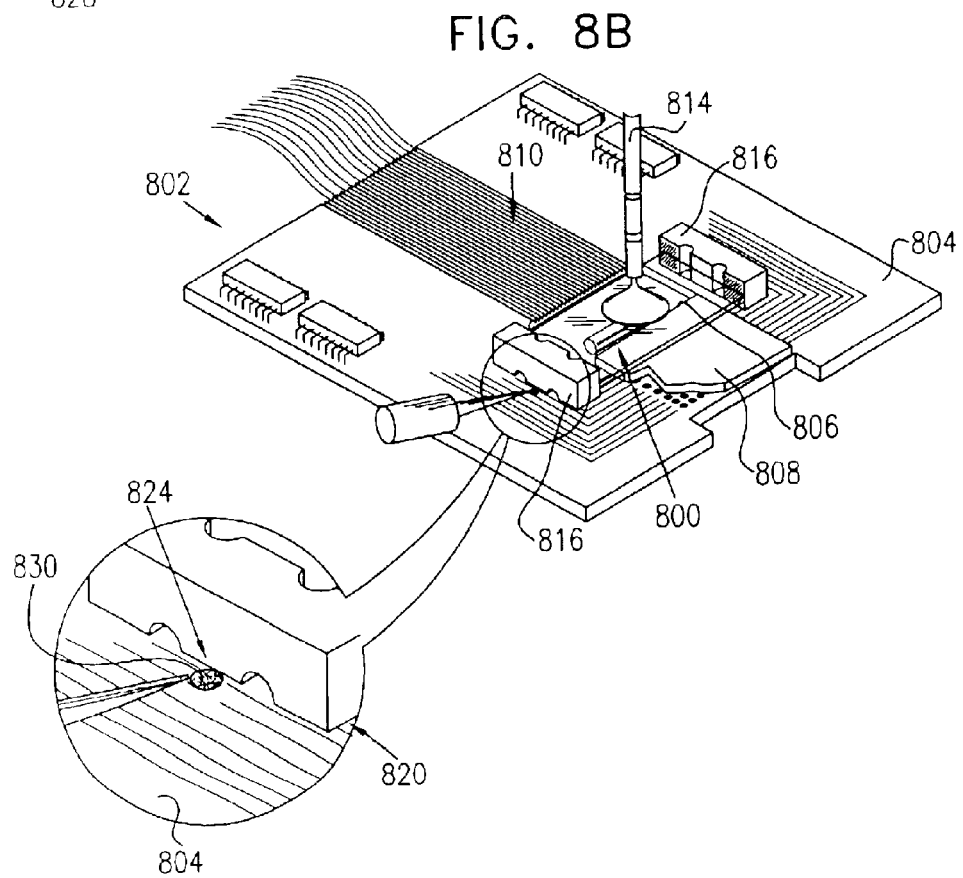
Figure 8C:
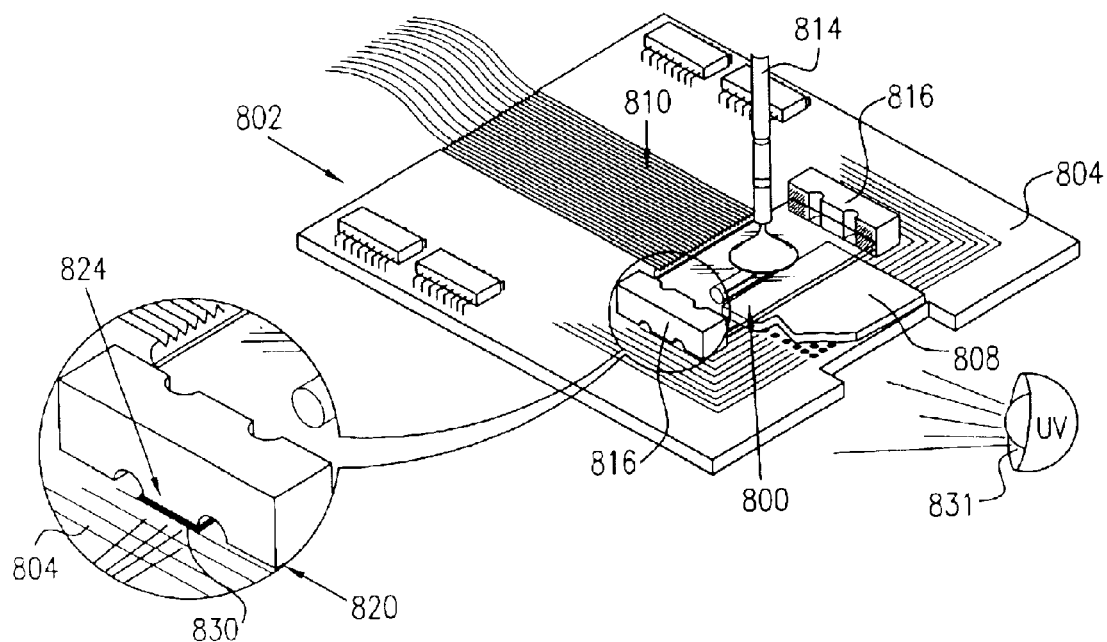

Preferably, as seen in FIG. 8B, side mounting blocks 816 are carefully positioned alongside lens module 800 and a small quantity 830 of non-metallic adhesive is deposited alongside the junction of engagement areas 824 of surfaces 820 and substrate 804. The non-metallic adhesive is then cured, as shown in FIG. 8C, as by UV curing employing a UV source 831, for initial bonding of the side mounting blocks 816 to substrate 804. A thin layer, preferably of thickness less than 10 microns, of the non-metallic adhesive such as a UV curable adhesive, is preferably employed.

Figure 8D:
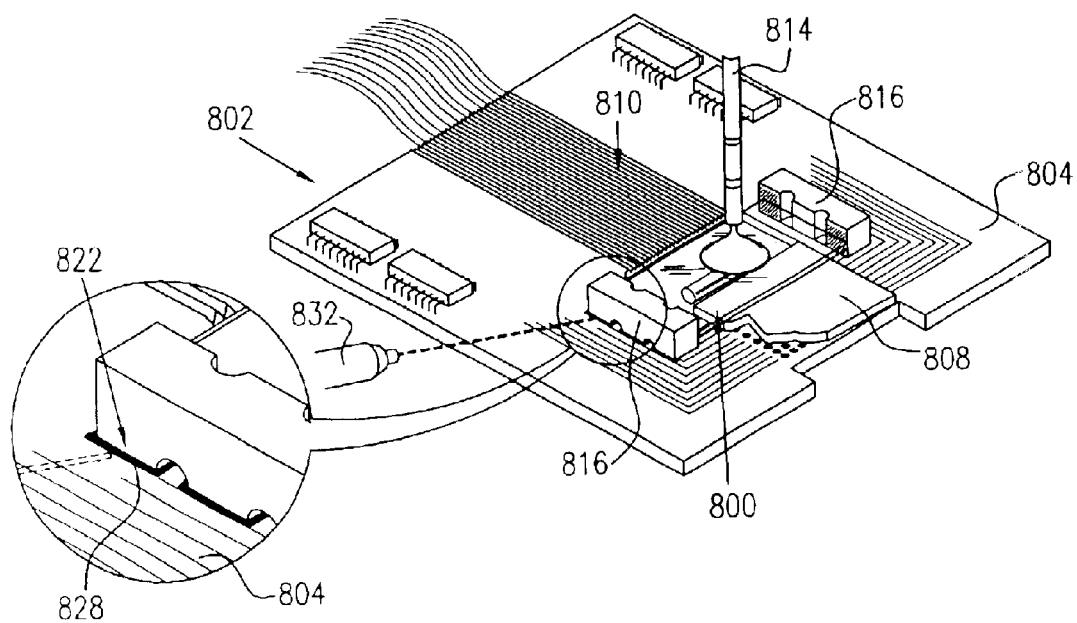

Preferably thereafter, as seen in FIG. 8D, the metallic adhesive 828 applied to engagement areas 822 of surfaces 820, is then cured, preferably by application of energy thereto, preferably by means of a laser 832, which causes melting and reflow of the metallic adhesive. Alternatively, instead of using a laser, induced RF energy or heating may be employed to produce melting and reflow of the metallic adhesive. Preferably, the metallic adhesive 828 applied to engagement areas 822 of surfaces 818 is not cured at this stage.

Figure 8E:
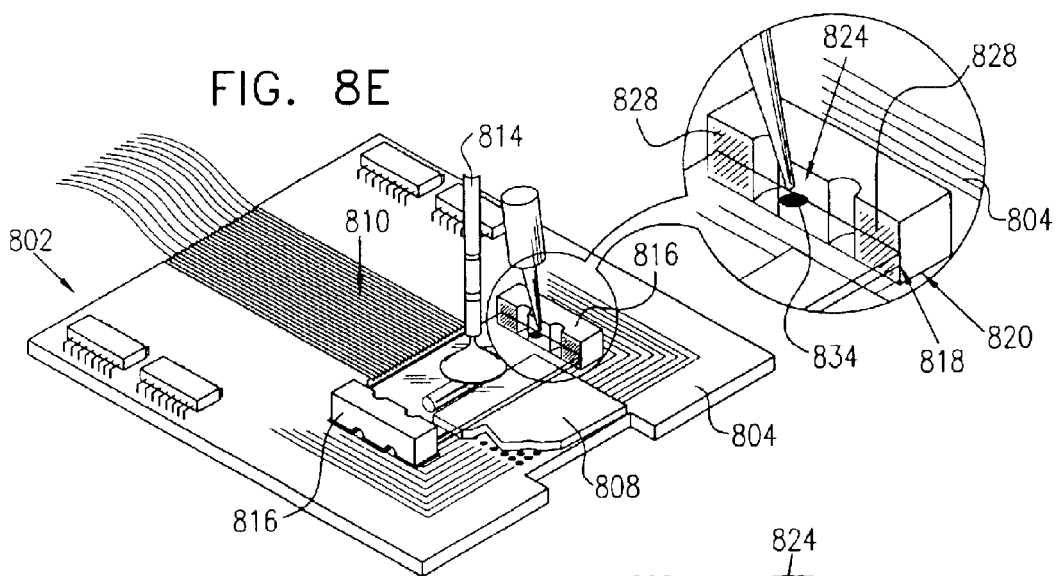
Figure 8F:
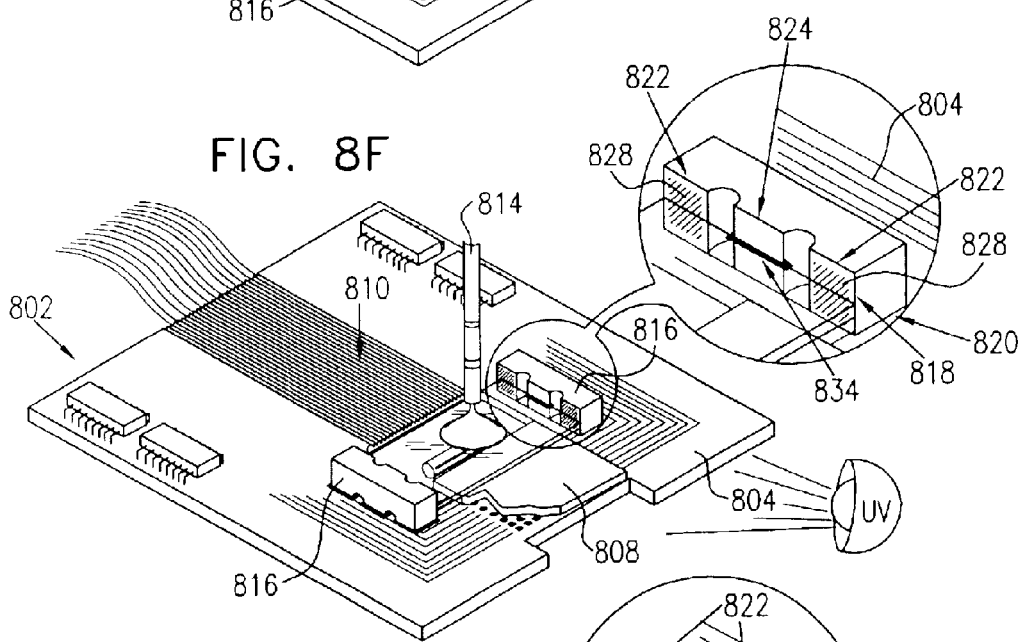

As seen in FIG. 8E a small quantity 834 of non-metallic adhesive is deposited alongside the junction of engagement areas 824 of surfaces 818 and an edge of the lens module 800. The non-metallic adhesive is then cured, as shown in FIG. 8F, as by UV curing, employing UV source 831, for bonding of the side mounting blocks 816 to lens module 800. A thin layer, preferably of thickness less than 10 microns, of the non-metallic adhesive, such as a UV curable adhesive, is preferably employed.

Figure 8G:
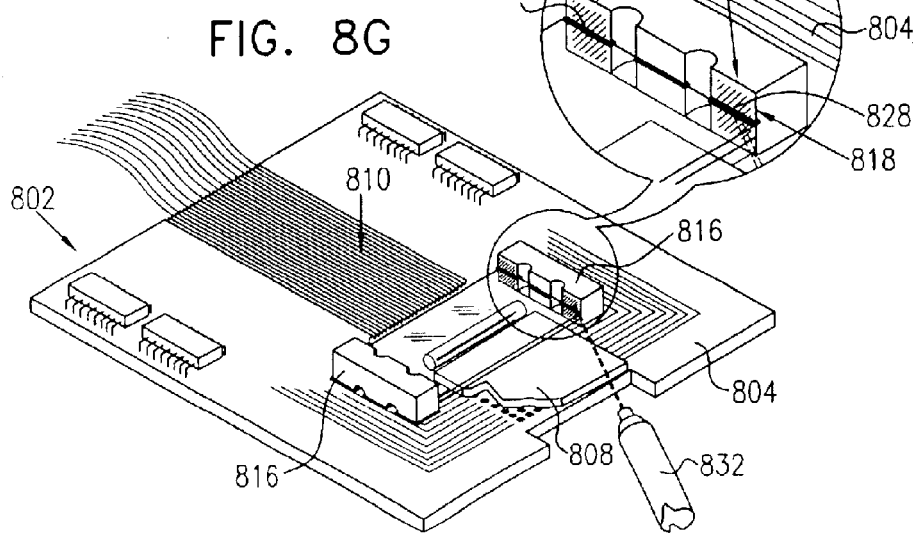

Preferably thereafter, as seen in FIG. 8G, the metallic adhesive 828 applied to engagement surfaces 822 of surfaces 818 is then cured, preferably by application of energy thereto, preferably by means of laser 832, which causes melting and reflow of the metallic adhesive. Alternatively, instead of using a laser, induced RF energy or heating may be employed to produce melting and reflow of the metallic adhesive.

Reference is now made to FIGS. 9A, 9B, 9C, 9D, 9E, 9F and 9G, which illustrate a method and system for accurately mounting an optical element in an optical assembly in accordance with a preferred embodiment of the present invention. As seen in FIGS. 9A–9G, a lens module 900 is precisely positioned in an optical assembly, here a multiple beam deflecting subassembly 902 of an optical switch. The lens module 900 is precisely positioned with respect to multiple reference surfaces, here including a substrate 904 and a facing edge 906 of an active integrated optics waveguide device 908.

The precise positioning of lens module 900 is carried out preferably with six degrees of freedom so as to achieve a high degree of accuracy in order to realize optimal optical coupling efficiency between fibers 910 fixed to substrate 904 and the waveguides formed in active integrated optics waveguide device 908. This degree of accuracy preferably reaches one tenth of a micron. A cylindrical lens 912, forming part of lens module 900, ensures that images of the centers of the ends of fibers 910 lie in the same plane as the centers of the waveguides of waveguide device 908.

This precise mounting is preferably achieved by using a positioner (not shown) and a vacuum engagement assembly 914 to manipulate the lens module 900 relative to substrate 904 such that the mode of each optical fiber 910 matches the mode of at least one corresponding waveguide of waveguide device 908 with relatively low light loss.

The lens module 900 is mounted in a desired relative position on the substrate 904 independently of the positioner by employing side mounting blocks 916 to fix the module 900 in position on substrate 904 upon precise mutual alignment of the lens module 900 and the waveguide device 908.

Preferably side mounting blocks 916 are carefully positioned alongside lens module 900 and are bonded thereto and to substrate 904.

In accordance with a preferred embodiment of the present invention side mounting blocks 916 are bonded to lens module 900 and to substrate 904 by employing a non-metallic adhesive for initially fixing the side mounting blocks to lens module 900 and to substrate 904 in a desired position and thereafter employing a metallic adhesive for permanently fixing the side mounting blocks 916 to the lens module 900 and to the substrate 904 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include. UV curable organic adhesives and various types of epoxies. Other suitable non-metallic adhesives may be employed.

In accordance with a preferred embodiment of the present invention, each of the side mounting blocks 916 is formed with adjacent bonding surfaces 918 and 920 which are configured to define separate metallic adhesive engagement areas 922 and non-metallic adhesive engagement areas 924. Preferably engagement areas 922 and 924 are separated by grooves 926. In the illustrated embodiment a suitable non-metallic adhesive 928 is preferably applied to non-metallic adhesive engagement areas 924, but can be applied to each or any of engagement areas 924, lens module 900 and substrate 904. In the illustrated embodiment a suitable non-metallic adhesive 428 is preferably applied to non-metallic adhesive engagement areas 424, but can be applied to each or any of engagement areas 424, lens module 400 and substrate 404.

It may be appreciated that preferably, side mounting blocks 916 are identical. Notwithstanding the fact that the drawings typically show operations involving only one of the side mounting blocks 916, it is to be understood that typically similar or identical operations take place with both side mounting blocks 916.

Figure 9A:
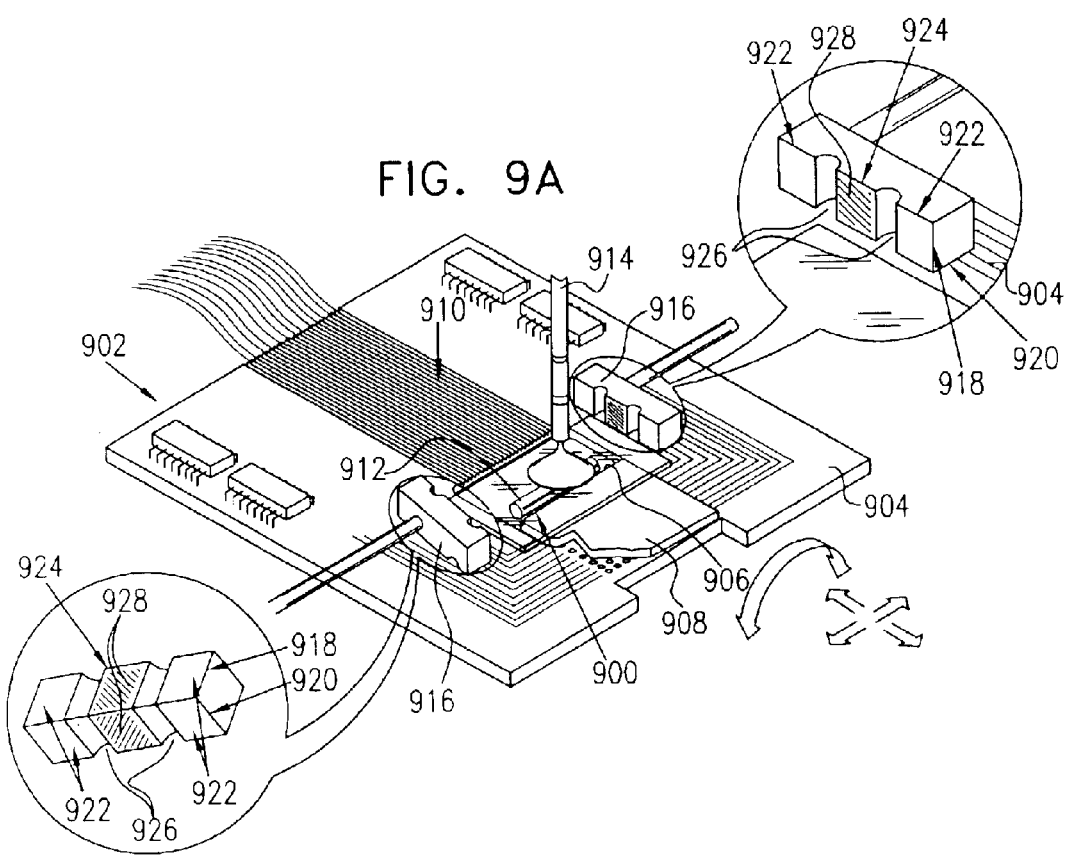
Figure 9B:
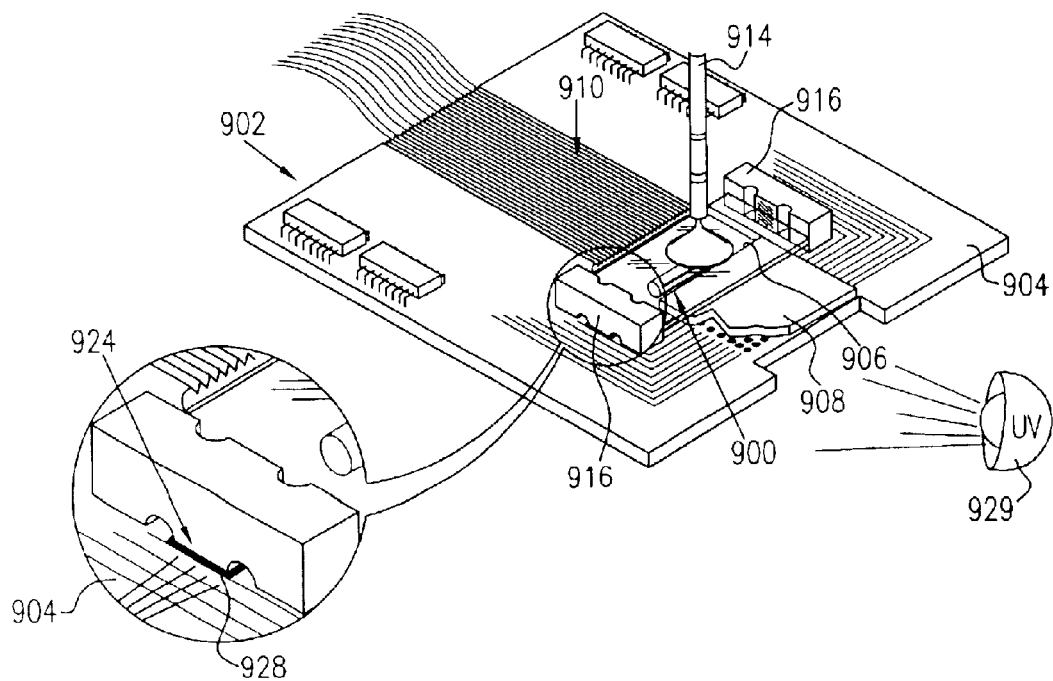

Preferably, as seen in FIG. 9B, side mounting blocks 916 are carefully positioned alongside lens module 900 and the non-metallic adhesive 928 applied to engagement areas 924 of surfaces 920, is then cured, as by UV curing employing a UV source 929, for bonding of the side mounting blocks 916 to substrate 904. Preferably, the non-metallic adhesive 928 applied to engagement areas 924 of surfaces 918 is not cured at this stage. A thin layer, preferably of thickness less than 10 microns, of the non-metallic adhesive, such as a UV curable adhesive, is preferably employed.

Preferably thereafter, as seen in FIG. 9C, a small quantity 930 of metallic adhesive is deposited alongside the junction of engagement areas 922 of surfaces 920 and substrate 904. The metallic adhesive is then cured, as shown in FIG. 9D, preferably by application of energy thereto, preferably by means of a laser 932, which causes melting and reflow of the metallic adhesive. Alternatively, instead of using a laser, induced RF energy or heating may be employed to produce melting and reflow of the metallic adhesive.

As seen in FIG. 9E the non-metallic adhesive 928 applied to engagement surfaces 924 of surfaces 918, is then cured, as by UV curing employing UV source 929 for bonding of the side mounting blocks 916 to lens module 900. A thin layer, preferably of thickness less than 10 microns, of the non-metallic adhesive, such as a UV curable adhesive, is preferably employed.

Figure 9F:
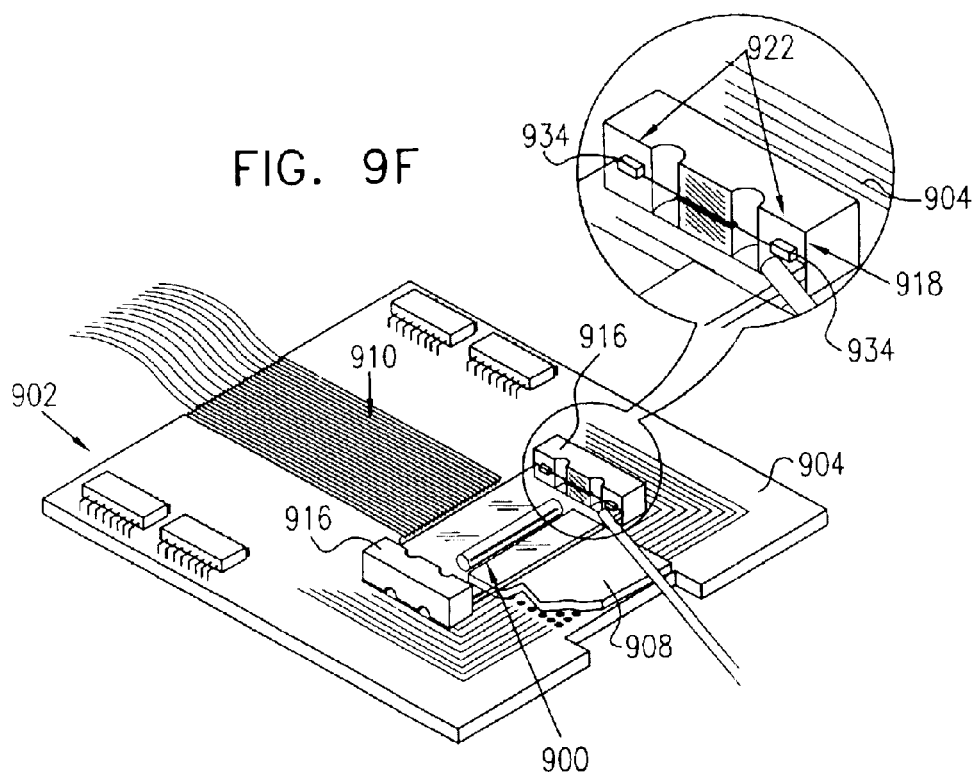
Figure 9G:
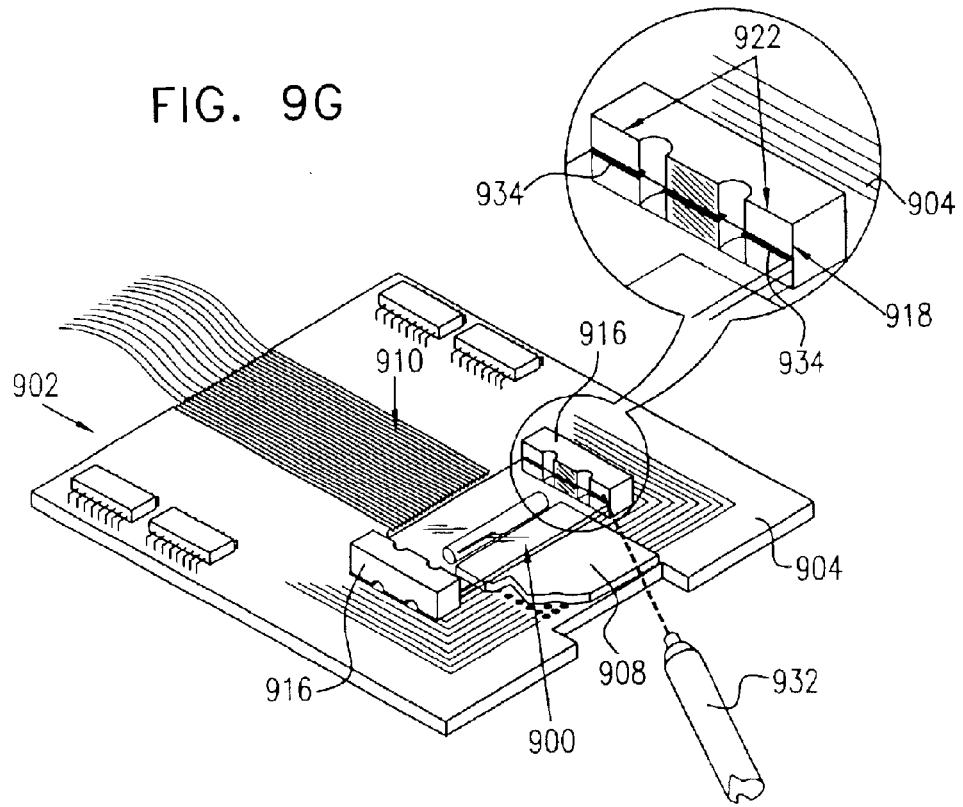

Preferably thereafter, as seen in FIG. 9F, a small quantity 934 of metallic adhesive is deposited alongside the junction of engagement areas 922 of surfaces 918 and lens module 900. The metallic adhesive is then cured, as shown in FIG. 9G, preferably by application of energy thereto, preferably by means of laser 932, which causes melting and reflow of the metallic adhesive. Alternatively, instead of using a laser, induced RF energy or heating may be employed to produce melting and reflow of the metallic adhesive.

Reference is now made to FIGS. 10A, 10B, 10C, 10D and 10E, which illustrate a method and system for accurately mounting an optical element in an optical assembly in accordance with a preferred embodiment of the present invention. As seen in FIGS. 10A–10E, a lens module 1000 is precisely positioned in an optical assembly, here a multiple beam deflecting subassembly 1002 of an optical switch. The lens module 1000 is precisely positioned with respect to multiple reference surfaces, here including a substrate 1004 and a facing edge 1006 of an active integrated optics waveguide device 1008.

The precise positioning of lens module 1000 is carried out preferably with six degrees of freedom so as to achieve a high degree of accuracy in order to realize optimal optical coupling efficiency between fibers 1010 fixed to substrate 1004 and the waveguides formed in active integrated optics waveguide device 1008. This degree of accuracy preferably reaches one tenth of a micron. A cylindrical lens 1012, forming part of lens module 1000, ensures that images of the centers of the ends of fibers 1010 lie in the same plane as the centers of the waveguides of waveguide device 1008.

This precise mounting is preferably achieved by using a positioner (not shown) and a vacuum engagement assembly 1014 to manipulate the lens module 1000 relative to substrate 1004 such that the mode of each optical fiber 1010 matches the mode of at least one corresponding waveguide of waveguide device 1008 with relatively low light loss.

The lens module 1000 is mounted in a desired relative position on the substrate 1004 independently of the positioner by employing side mounting blocks 1016 to fix the module 1000 in position on substrate 1004 upon precise mutual alignment of the lens module 1000 and the waveguide device 1008.

Preferably side mounting blocks 1016 are carefully positioned alongside lens module 1000 and are bonded thereto and to substrate 1004.

In accordance with a preferred embodiment of the present invention side mounting blocks 1016 are bonded to lens module 1000 and to substrate 1004 by employing a non-metallic adhesive for initially fixing the side mounting blocks to lens module 1000 and to substrate 1004 in a desired position and thereafter employing a metallic adhesive for permanently fixing the side mounting blocks 1016 to the lens module 1000 and to the substrate 1004 in the desired position.

Normally, the metallic adhesive cures at a temperature substantially higher than the curing temperature of the non-metallic adhesive. Examples of a suitable metallic adhesive include: tin, gold, indium and various combinations thereof. Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, each of the side mounting blocks 1016 is formed with adjacent bonding surfaces 1018 and 1020 which are configured to define separate metallic adhesive engagement areas 1022 and non-metallic adhesive engagement areas 1024. Preferably engagement areas 1022 and 1024 are separated by grooves 1026. In the illustrated embodiment a suitable metallic adhesive 1028 is preferably applied to metallic adhesive engagement areas 1022 and a suitable non-metallic adhesive 1030 is preferably applied to non-metallic adhesive engagement areas 1024, but metallic and non-metallic adhesives can be applied to each or any of engagement areas 1022 & 1024, lens module 1000 and substrate 1004.

It may be appreciated that preferably, side mounting blocks 1016 are identical. Notwithstanding the fact that the drawings typically show operations involving only one of the side mounting blocks 1016, it is to be understood that typically similar or identical operations take place with both side mounting blocks 1016.

Figure 10A:
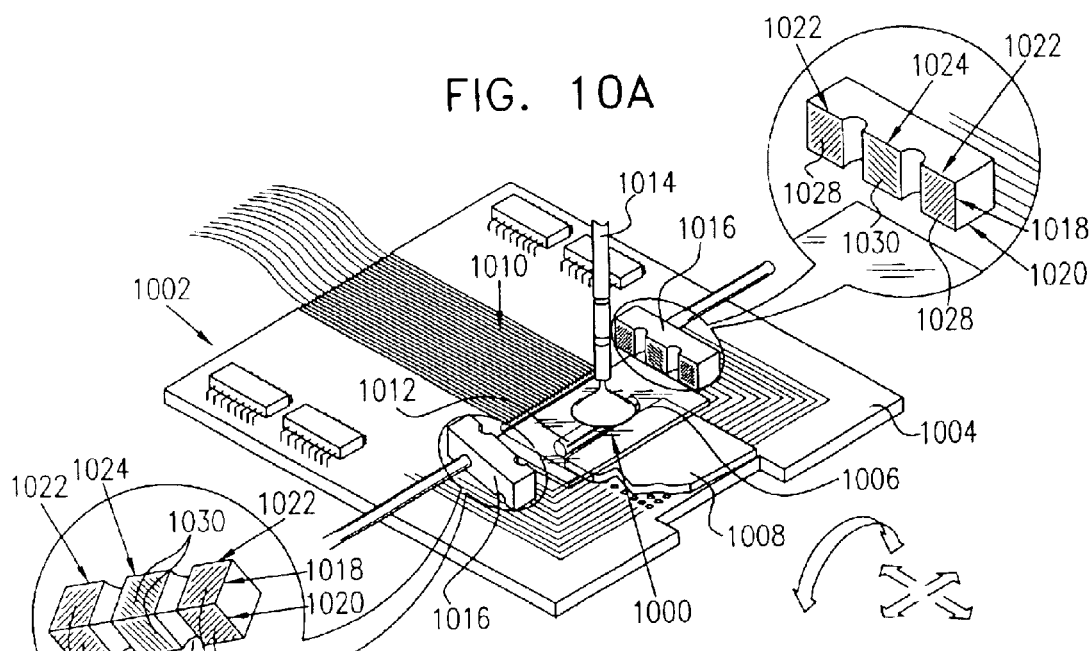
FIGS. 10A, 10B, 10C, 10D and 10E illustrate a method and system for accurately mounting an optical element in an optical assembly in accordance with a preferred embodiment of the present invention.
Figure 10B:
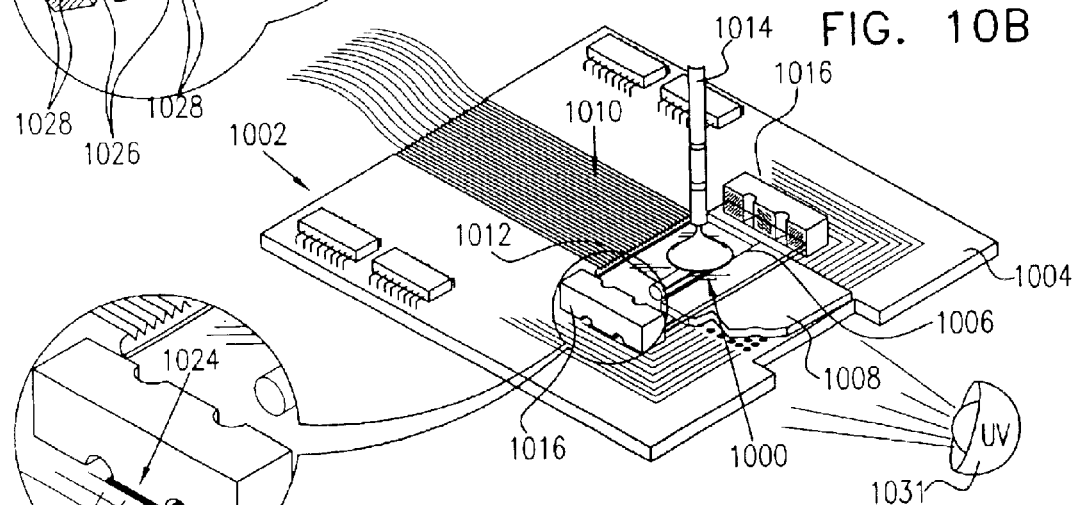

Preferably, as seen in FIG. 10B, side mounting blocks 1016 are carefully positioned alongside lens module 1000 and the non-metallic adhesive 1030 applied to enlargement area 1024 of surfaces 1020, is then cured, as by UV curing employing a UV source 1031, for initial bonding of the side mounting blocks 1016 to substrate 1004. Preferably, the non-metallic adhesive 1030 applied to engagement areas 1024 of surfaces 1018 is not cured at this stage. A thin layer, preferably of thickness less than 10 microns, of the non-metallic adhesive, such as a UV curable adhesive, is preferably employed.

Figure 10C:
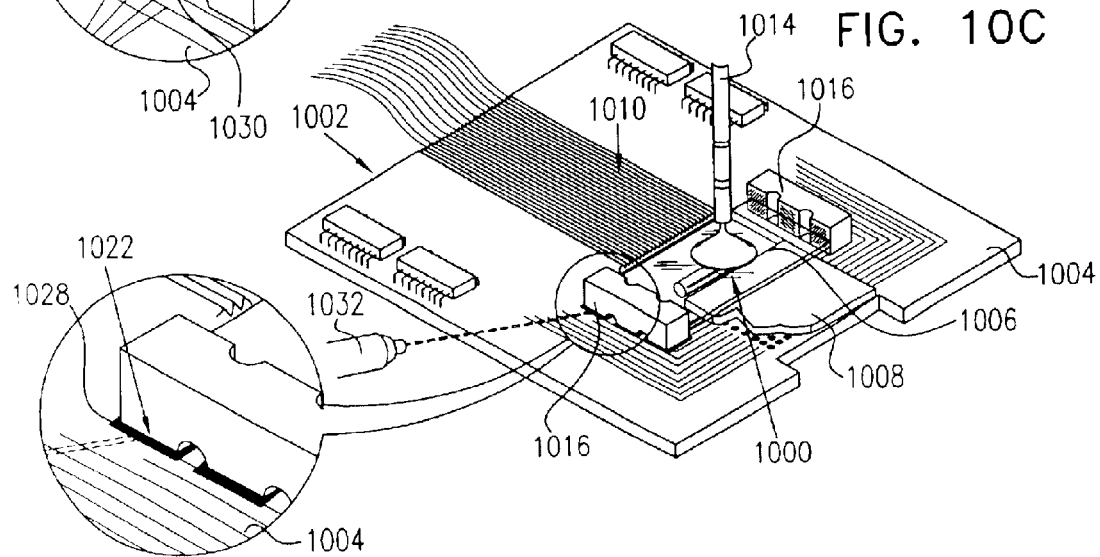

Preferably thereafter, as seen in FIG. 10C, the metallic adhesive 1028 applied to engagement surfaces 1022 of surfaces 1020, is then cured, preferably by application of energy thereto, preferably by means of a laser 1032, which causes melting and reflow of the metallic adhesive.

Alternatively, instead of using a laser, induced RF energy or heating may be employed to produce melting and reflow of the metallic adhesive. Preferably, the metallic adhesive 1028 applied to engagement areas 1022 of surfaces 1018 is not cured at this stage.

Figure 10D:
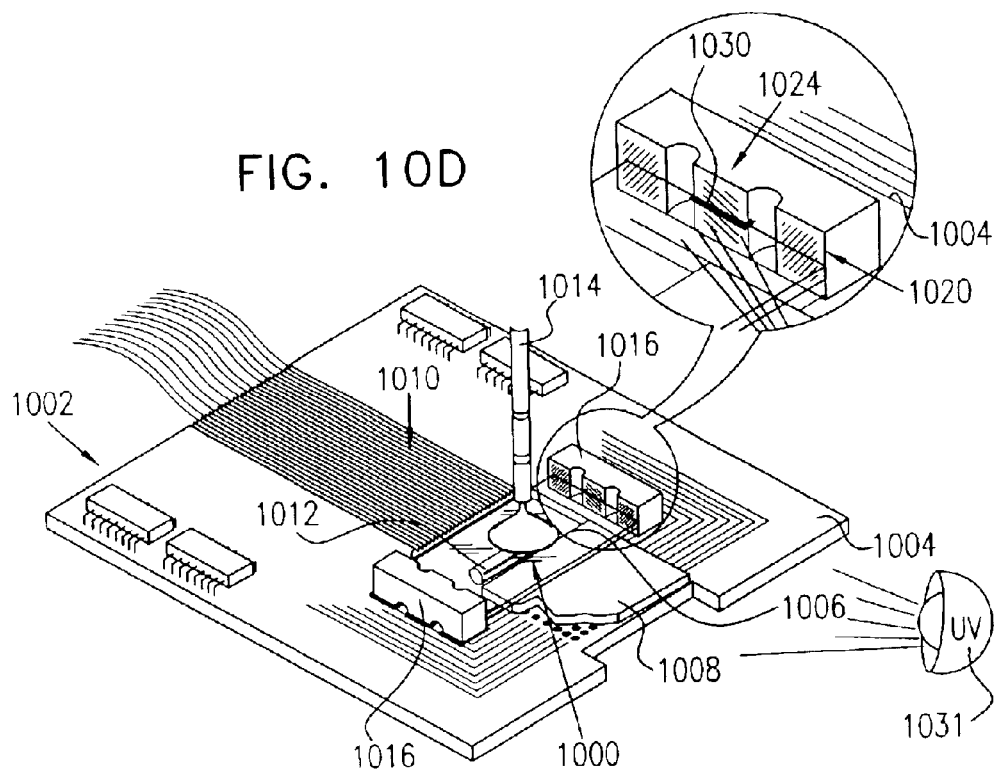

As seen in FIG. 10D, the non-metallic adhesive 1030 applied to engagement surfaces 1024 of surfaces 1018 is then cured, as by UV curing, employing UV source 1031, for initial bonding of the side mounting blocks 1016 to lens module 1000. A thin layer, preferably of thickness less than 10 microns, of the non-metallic adhesive, such as a UV curable adhesive, is preferably employed.

Figure 10E:
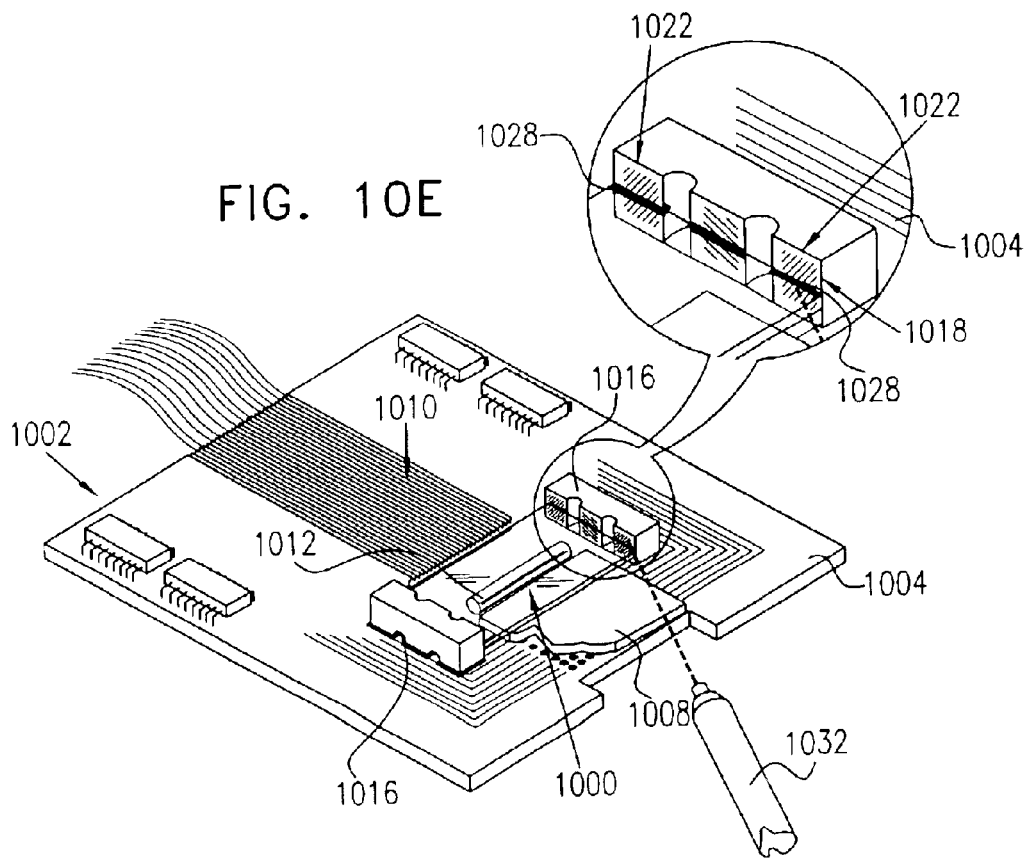

Preferably thereafter, as seen in FIG. 10E, the metallic adhesive 1028 applied to engagement areas 1022 of surfaces 1018, is then cured, preferably by application of energy thereto, preferably by means of a laser 1032, which causes melting and reflow of the metallic adhesive. Alternatively, instead of using a laser, induced RF energy or heating may be employed to produce melting and reflow of the metallic adhesive.

Figure 11A:
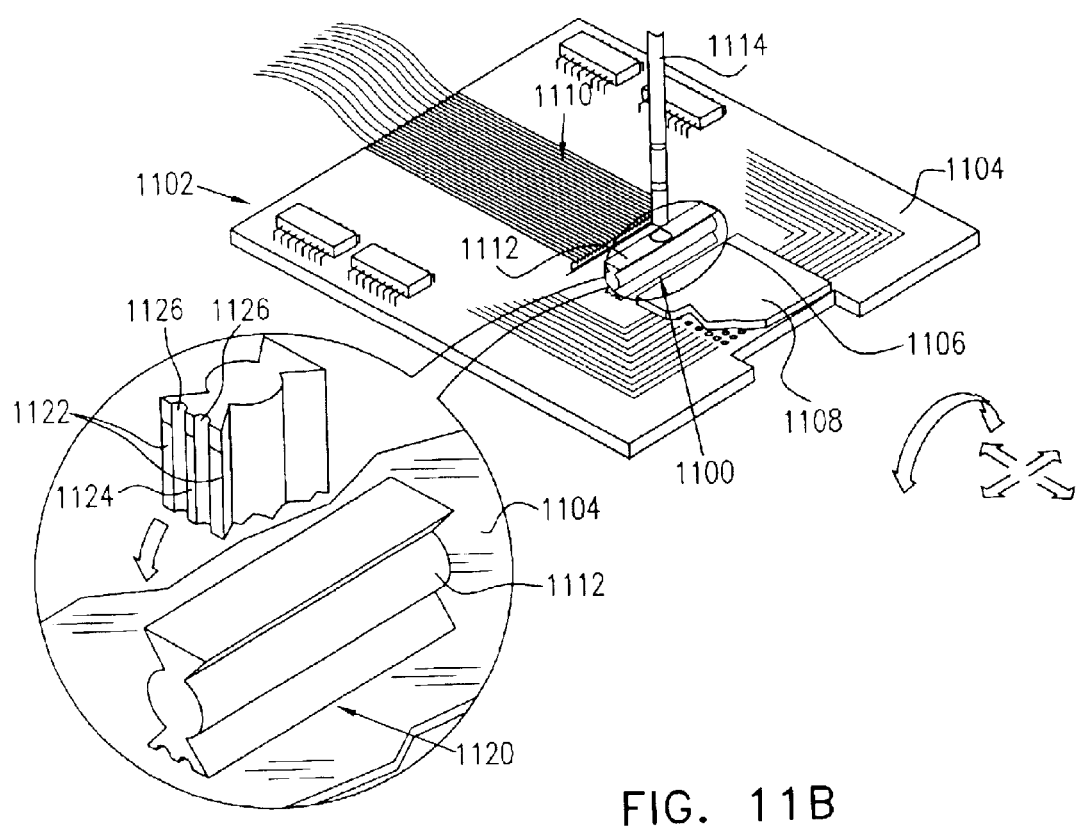
FIGS. 11A, 11B and 11C illustrate a method and system for accurately mounting an optical element in an optical assembly in accordance with a preferred embodiment of the present invention.
Figure 11B:
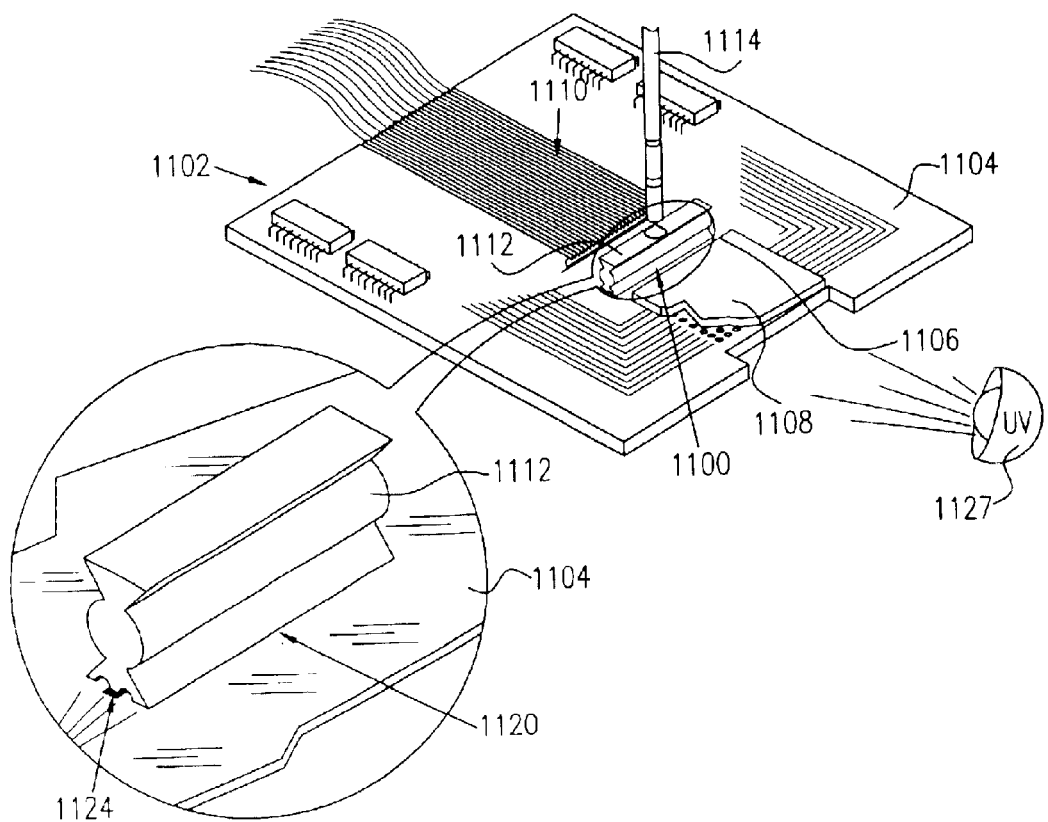
Figure 11C:
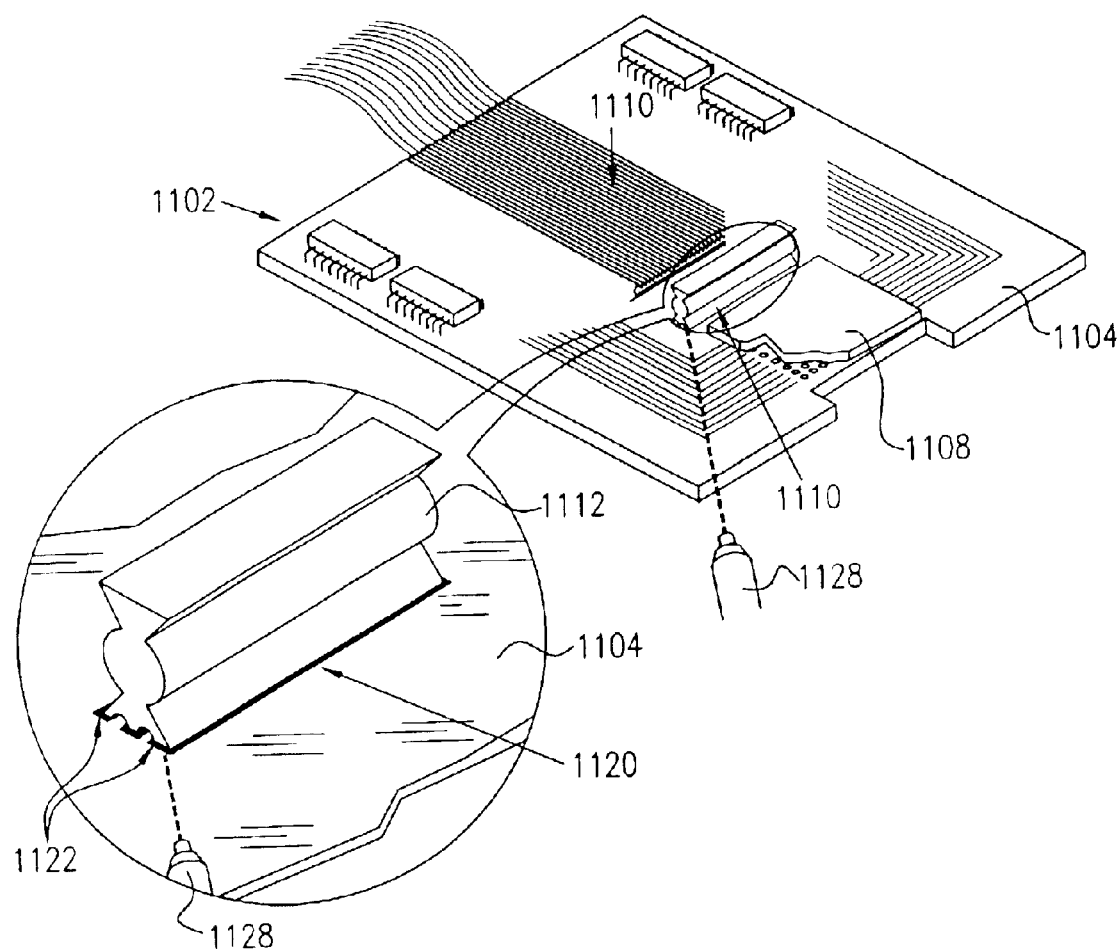

Reference is now made to FIGS. 11A, 11B and 11C, which illustrate a method and system for accurately mounting an optical element in an optical assembly in accordance with another preferred embodiment of the present invention. As seen in FIGS. 11A, 11B and 11C, there is provided a method for accurately mounting an optical element in an optical assembly including precisely positioning an optical element in a desired position with respect to a reference surface, employing a non-metallic adhesive for initially fixing said optical element in said desired position and thereafter employing a metallic adhesive for permanently fixing said optical element in said desired position.

Turning to FIG. 11A, an optical element in the form of a lens element 1100 is precisely positioned in an optical assembly, here a multiple beam deflecting subassembly 1102 of an optical switch. The lens element 1100 is precisely positioned with respect to multiple reference surfaces, here including a substrate 1104 and a facing edge 1106 of an active integrated optics waveguide device 1108.

The precise positioning of lens element 1100 is carried out preferably with multiple degrees of freedom so as to achieve a high degree of accuracy in order to realize optimal optical coupling efficiency between fibers 1110 fixed to substrate 1104 and the waveguides formed in active integrated optics waveguide device 1108. Accuracies reaching one tenth of a micron may be achieved. A cylindrical lens 1112, forming part of lens element 1100, ensures that images of the centers of the ends of fibers 1110 lie in the same plane as the centers of the waveguides of waveguide device 1108.

This precise mounting is preferably achieved by using a positioner (not shown) and a vacuum engagement assembly 1114 to manipulate the lens element 1100 relative to substrate 1104 such that the mode of each optical fiber 1110 matches the mode of at least one corresponding waveguide of waveguide device 1108 with relatively low light loss.

The lens element 1100 is mounted in a desired relative position on the substrate 1104 by employing a non-metallic adhesive for initially fixing the lens element to substrate 1104 in a desired position and thereafter employing a metallic adhesive for permanently fixing the lens element 1100 to the substrate 1104 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, the lens element 1100 is formed with a bonding surface 1120 which is configured to define separate metallic adhesive engagement areas 1122 and a non-metallic adhesive engagement area 1124. Preferably engagement areas 1122 and 1124 are separated by grooves 1126.

Preferably, as seen in FIG. 11B, lens element 1100 is initially bonded to substrate 1104 using a thin layer, preferably of thickness less than 10 microns, of a non-metallic adhesive, such as a UV curable adhesive, which engages engagement area 1124 on bonding surface 1120 and is cured typically by use of a UV source 1127.

Preferably thereafter, as seen in FIG. 11C, the lens element 1100 is permanently bonded to substrate 1104 using a metallic adhesive, preferably tin-gold, which is preferably thin but need not be as thin as the layer of non-metallic adhesive. The metallic adhesive engages engagement areas 1122 on bonding surface 1120 and is adhered preferably by application of energy thereto, preferably by means of a laser 1128, which causes melting and reflow of the metallic adhesive. Alternatively, instead of using a laser, induced RF energy or heating may be employed to produce melting and reflow of the metallic adhesive.

Reference is now made to FIGS. 12A, 12B, 12C, 12D and 12E, which illustrate a method and system for accurately mounting an optical element in an optical assembly in accordance with a preferred embodiment of the present invention. As seen in FIGS. 12A–12E, a lens element 1200 is precisely positioned in an optical assembly, here a multiple beam deflecting subassembly 1202 of an optical switch. The lens element 1200 is precisely positioned with respect to multiple reference surfaces, here including a substrate 1204 and a facing edge 1206 of an active integrated optics waveguide device 1208.

The precise positioning of lens element 1200 is carried out preferably with multiple degrees of freedom so as to achieve a high degree of accuracy in order to realize optimal optical coupling efficiency between fibers 1210 fixed to substrate 1204 and the waveguides formed in active integrated optics waveguide device 1208. This degree of accuracy may reach one tenth of a micron. A cylindrical lens 1212, forming part of lens element 1200, ensures that images of the centers of the ends of fibers 1210 lie in the same plane as the centers of the waveguides of waveguide device 1208.

This precise mounting is preferably achieved by using a positioner (not shown) and a vacuum engagement assembly 1214 to manipulate the lens element 1200 relative to substrate 1204 such that the mode of each optical fiber 1210 matches the mode of at least one corresponding waveguide of waveguide devise 1208 with relatively low light loss.

The lens element 1200 is mounted in a desired relative position on the substrate 1204 by employing a non-metallic adhesive for initially fixing the lens element 1200 to substrate 1204 in a desired position and thereafter employing a metallic adhesive for permanently fixing the lens element 1200 to the substrate 1204 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include, UV curable organic adhesives and various types of epoxies. Other suitable non-metallic adhesives may be employed.

In accordance with a preferred embodiment of the present invention, the lens element 1200 is formed with a bonding surface 1220 which is configured to define separate metallic adhesive engagement areas 1222 and a non-metallic adhesive engagement area 1224. Preferably engagement areas 1222 and 1224 are separated by grooves 1226.

Figure 12A:
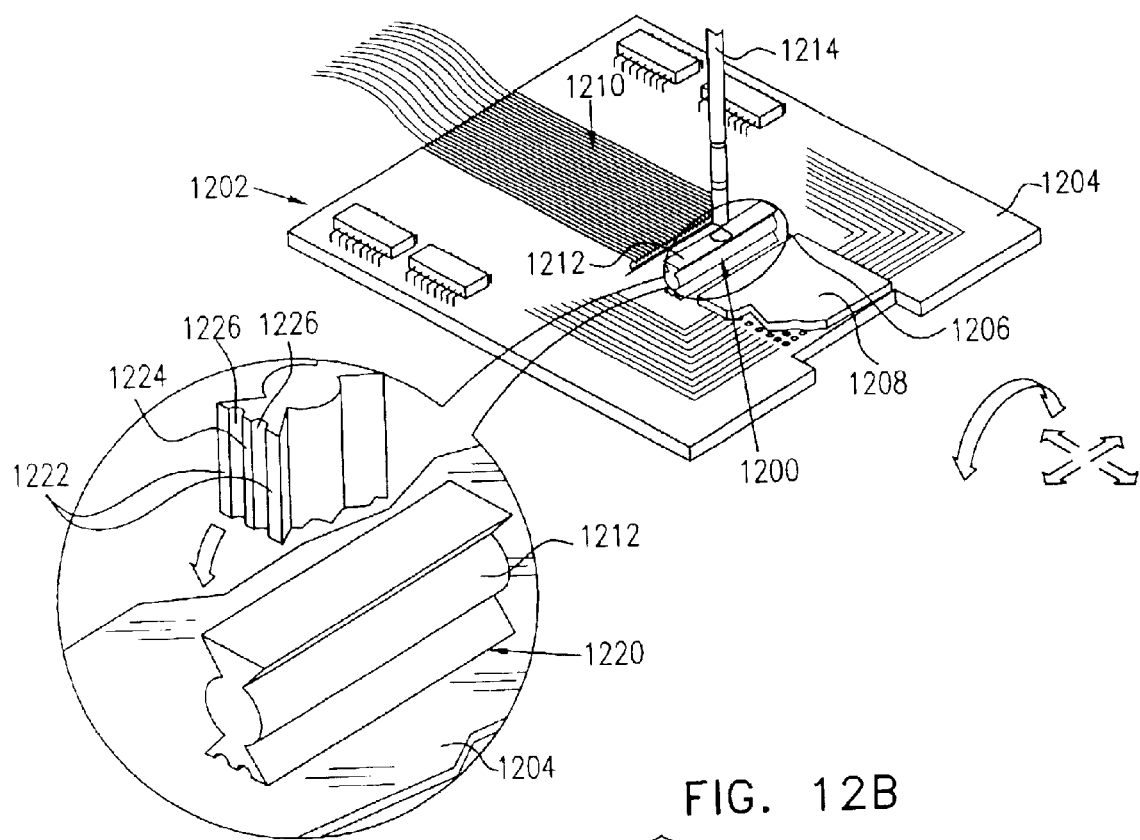
FIGS. 12A, 12B, 12C, 12D and 12E illustrate a method and system for accurately mounting an optical element in an optical assembly in accordance with a preferred embodiment of the present invention.
Figure 12B:
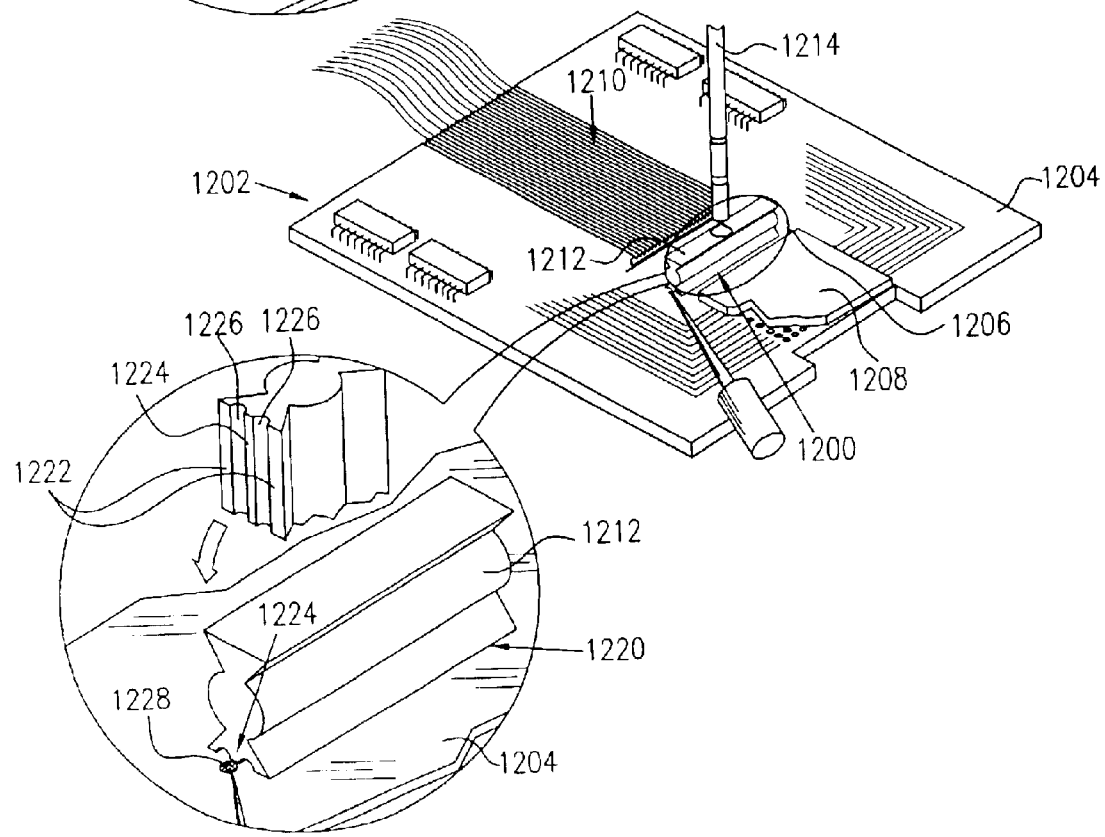
Figure 12C:
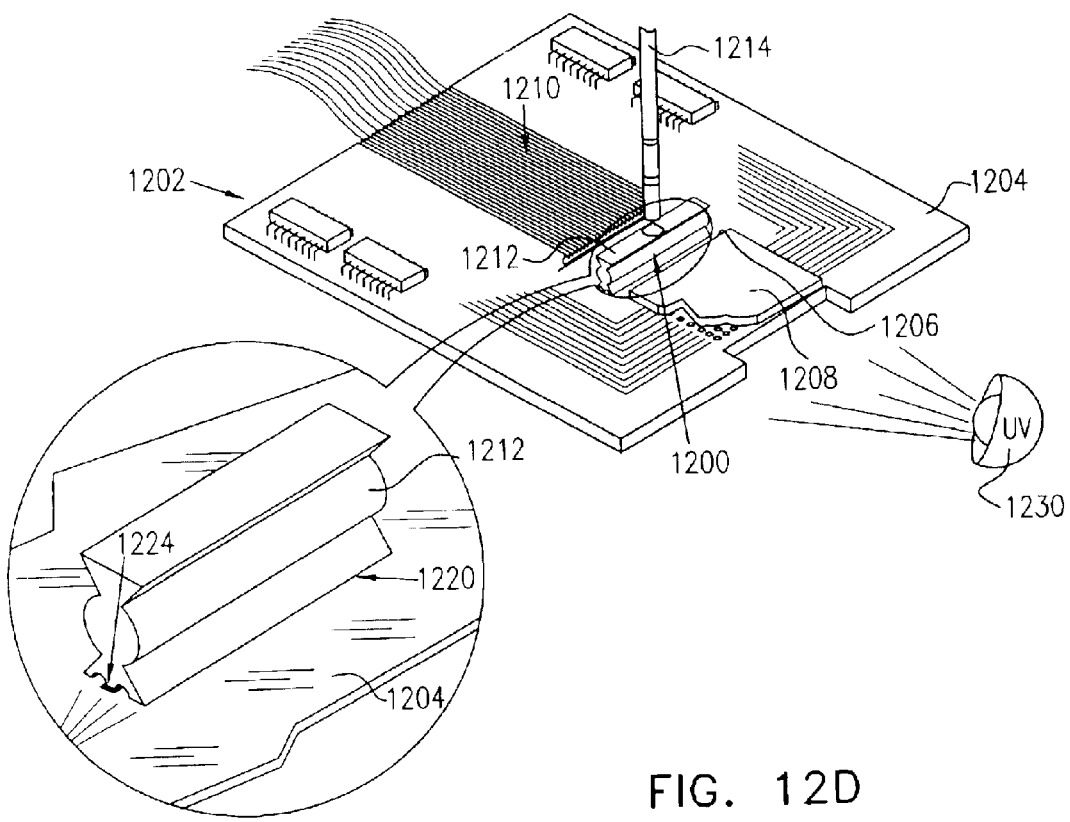

Preferably, as seen in FIG. 12B, a small quantity 1228 of non-metallic adhesive is deposited alongside the junction of engagement area 1224 of surface 1220 and substrate 1204. The non-metallic adhesive is then cured, as shown in FIG. 12C, as by UV curing employing a UV source 1230, for initial bonding of the lens element 1200 to substrate 1204. A thin layer, preferably of thickness less than 10 microns, of the non-metallic adhesive, such as a UV curable adhesive, is preferably employed.

Figure 12D:
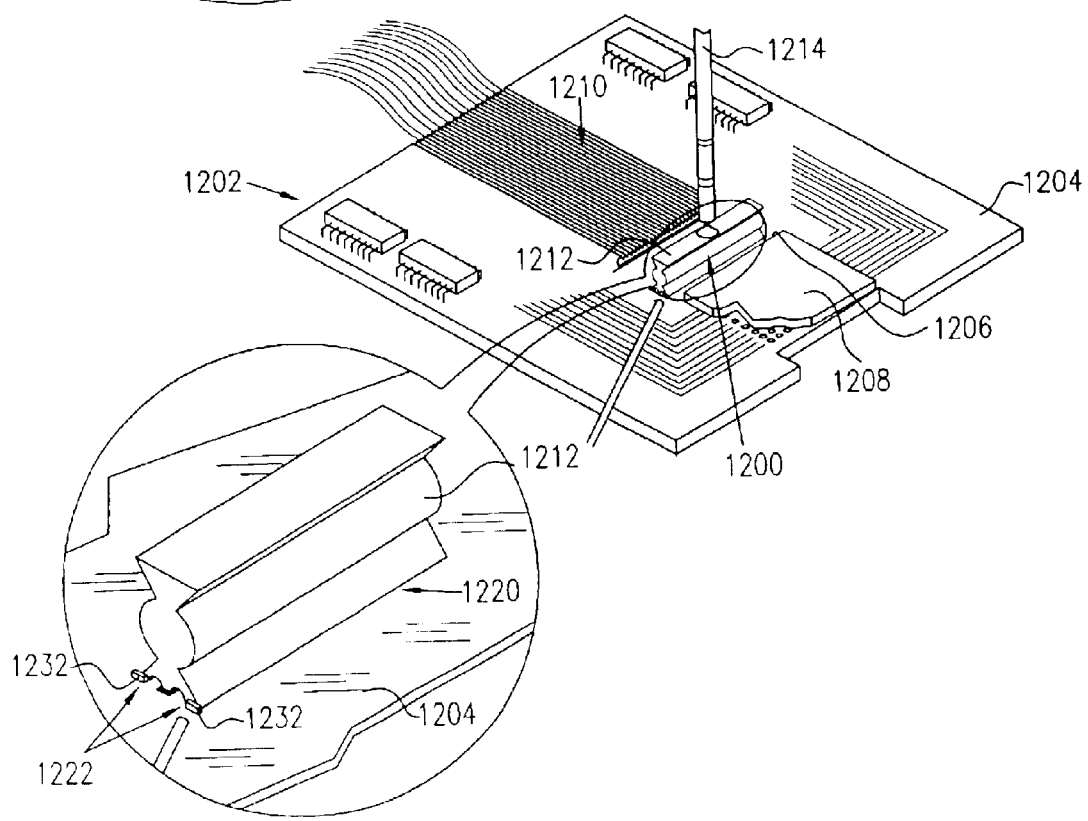
Figure 12E:
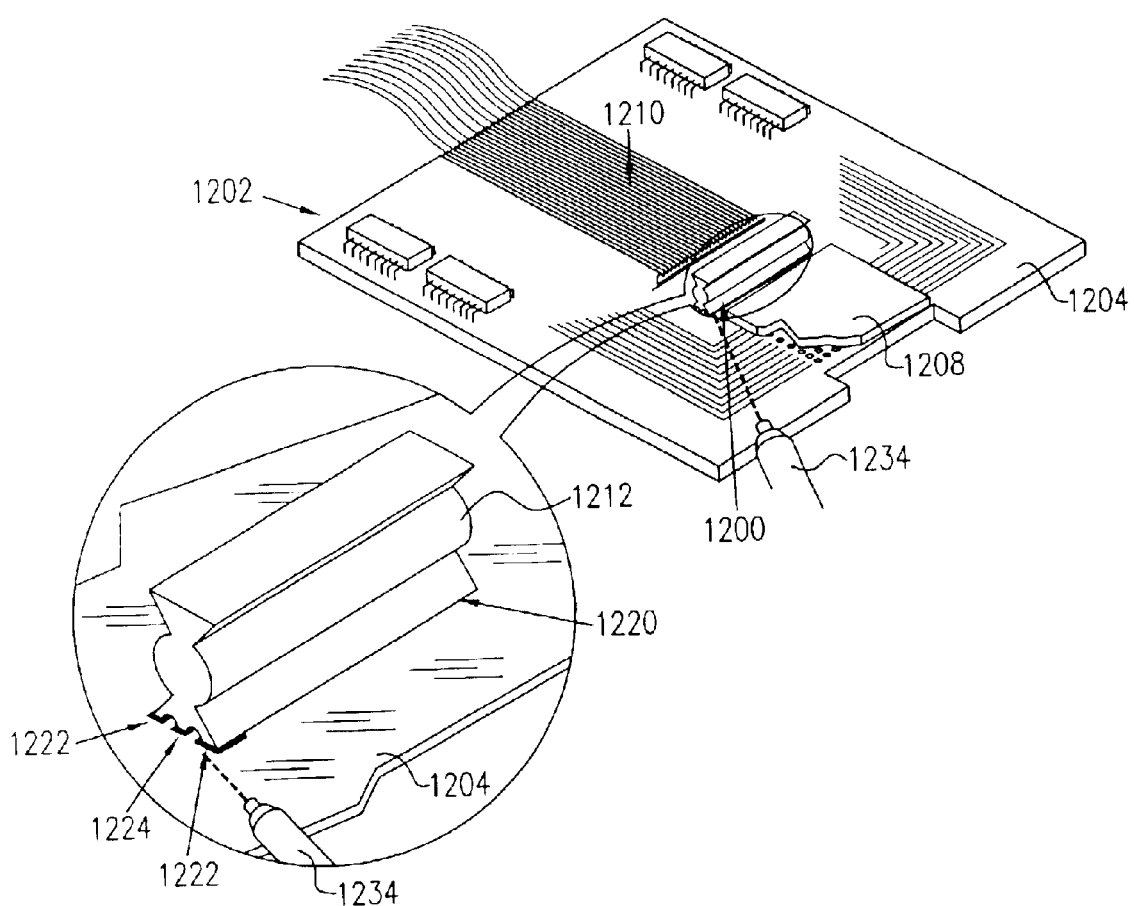

Preferably thereafter, as seen in FIG. 12D, a small quantity 1232 of metallic adhesive is deposited alongside the junction of engagement areas 1222 of surface 1220 and substrate 1204. The metallic adhesive is then cured, as shown in FIG. 12E, preferably by application of energy thereto, preferably by means of a laser 1234, which causes melting and reflow of the metallic adhesive. Alternatively, instead of using a laser induced RF energy or heating may be employed to produce melting and reflow of the metallic adhesive.

Reference is now made to FIGS. 13A, 13B, 13C and 13D, which illustrate a method and system for accurately mounting an optical element in an optical assembly in accordance with a preferred embodiment of the present invention. As seen in FIGS. 13A–13D, a lens element 1300 is precisely positioned in an optical assembly, here a multiple beam deflecting subassembly 1302 of an optical switch. The lens element 1300 is precisely positioned with respect to multiple reference surfaces, here including a substrate 1304 and a facing edge 1306 of an active integrated optics waveguide device 1308.

The precise positioning of lens element 1300 is carried out preferably with multiple degrees of freedom so as to achieve a high degree of accuracy in order to realize optimal optical coupling efficiency between fibers 1310 fixed to substrate 1304 and the waveguides formed in active integrated optics waveguide device 1308. This degree of accuracy may reach one tenth of a micron. A cylindrical lens 1312, forming part of lens element 1300, ensures that images of the centers of the ends of fibers 1310 lie in the same plane as the centers of the waveguides of waveguide device 1308.

This precise mounting is preferably achieved by using a positioner (not shown) and a vacuum engagement assembly 1314 to manipulate the lens element 1300 relative to substrate 1304 such that the mode of each optical fiber 1310 matches the mode of at least one corresponding waveguide of waveguide device 1308 with relatively low light loss.

The lens element 1300 is mounted in a desired relative position on the substrate 1304 by employing a non-metallic adhesive for initially fixing the lens element 1300 to substrate 1304 in a desired position and thereafter employing a metallic adhesive for permanently fixing the lens element 1300 to the substrate 1304 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, the lens element 1300 is formed with a bonding surface 1320 which is configured to define separate metallic adhesive engagement areas 1322 and a non-metallic adhesive engagement area 1324. Preferably engagement areas 1322 and 1324 are separated by grooves 1326. In the illustrated embodiment a suitable metallic adhesive 1328 is preferably applied to metallic adhesive engagement areas 1322, but can be applied to each or any of engagement areas 1322 and substrate 1304.

Figure 13A:
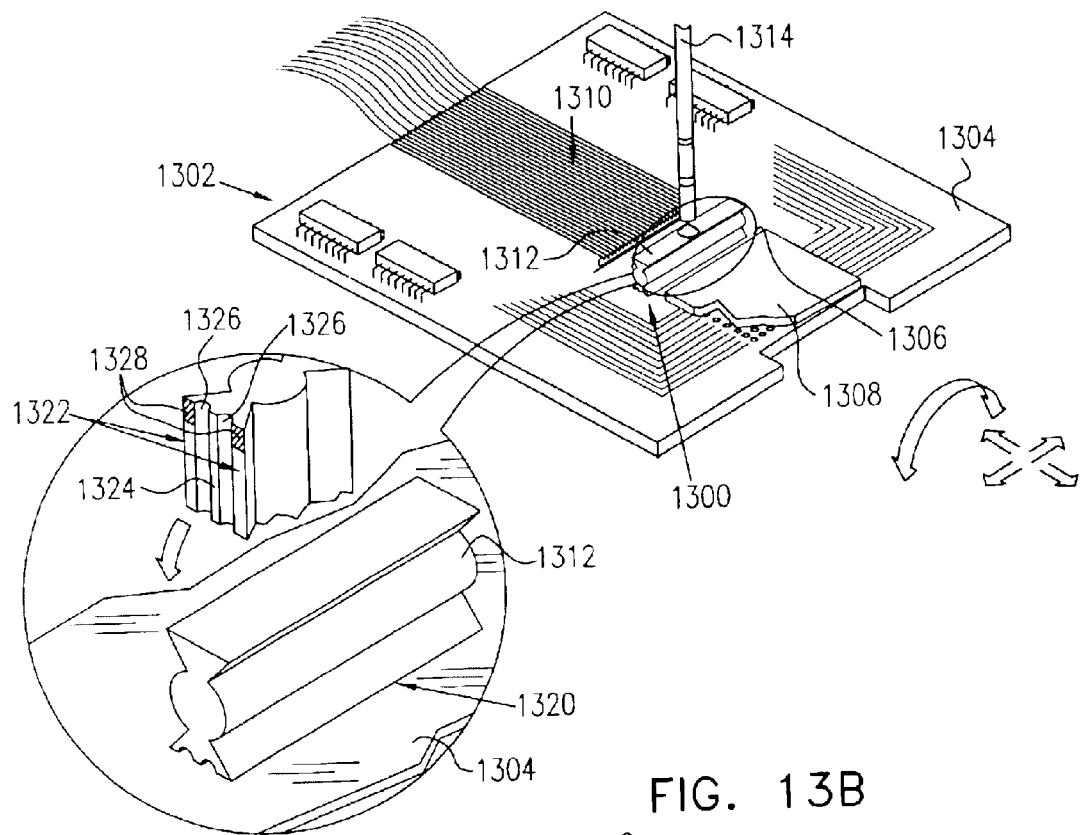
FIGS. 13A, 13B, 13C and 13D illustrate a method and system for accurately mounting an optical element in an optical assembly in accordance with a preferred embodiment of the present invention.
Figure 13B:
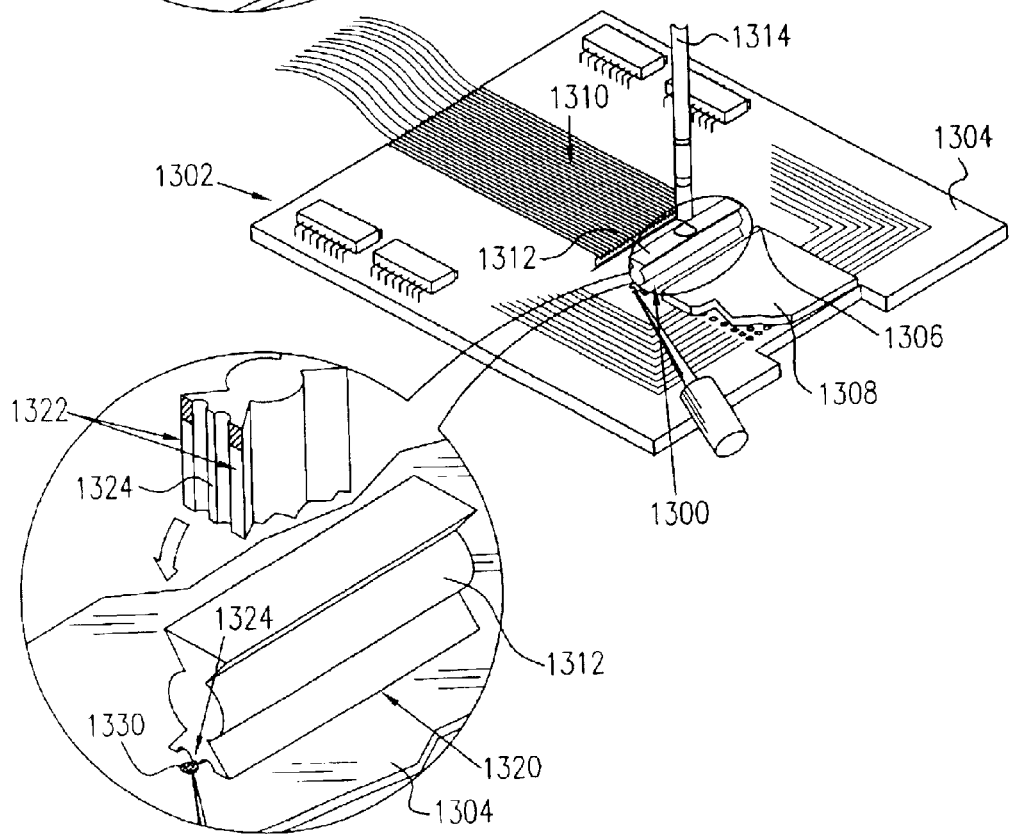
Figure 13C:
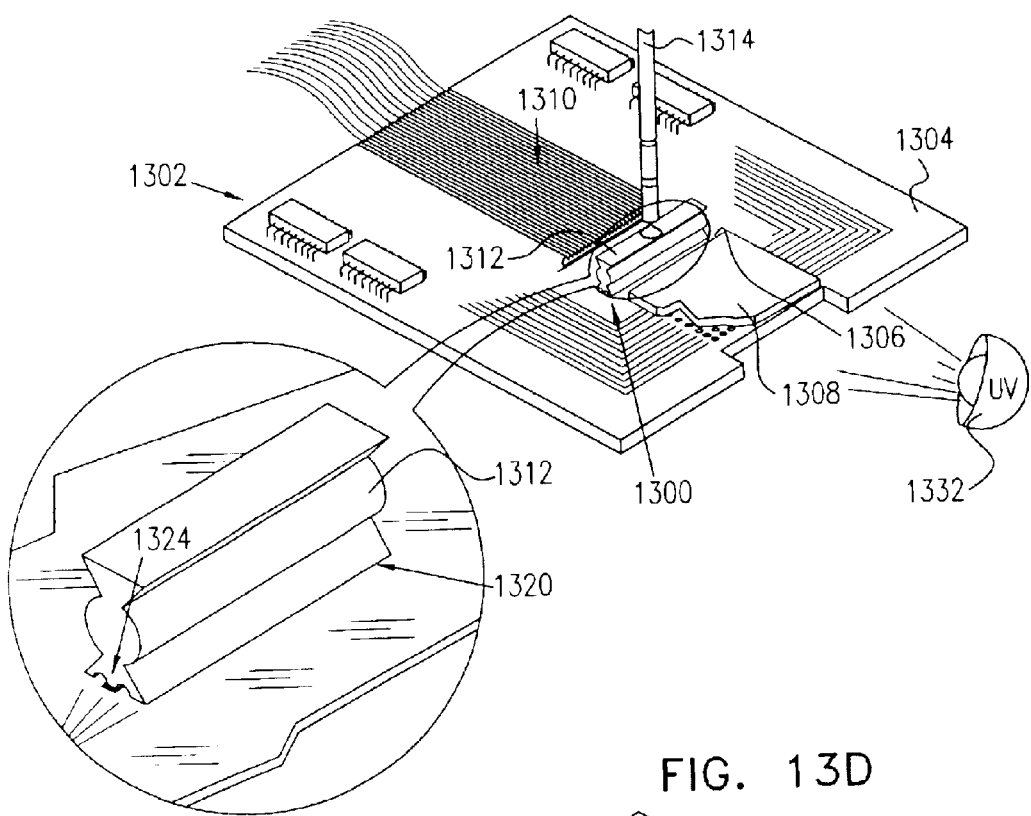

Preferably, as seen in FIG. 13B, a small quantity 1330 of non-metallic adhesive is deposited alongside the junction of engagement area 1324 of surface 1320 and substrate 1304. The non-metallic adhesive is then cured, as shown in FIG. 13C, as by UV curing employing a UV source 1332, for initial bonding of the lens element 1300 to substrate 1304. A thin layer, preferably of thickness less than 10 microns, of the non-metallic adhesive, such as a UV curable adhesive, is preferably employed.

Figure 13D:
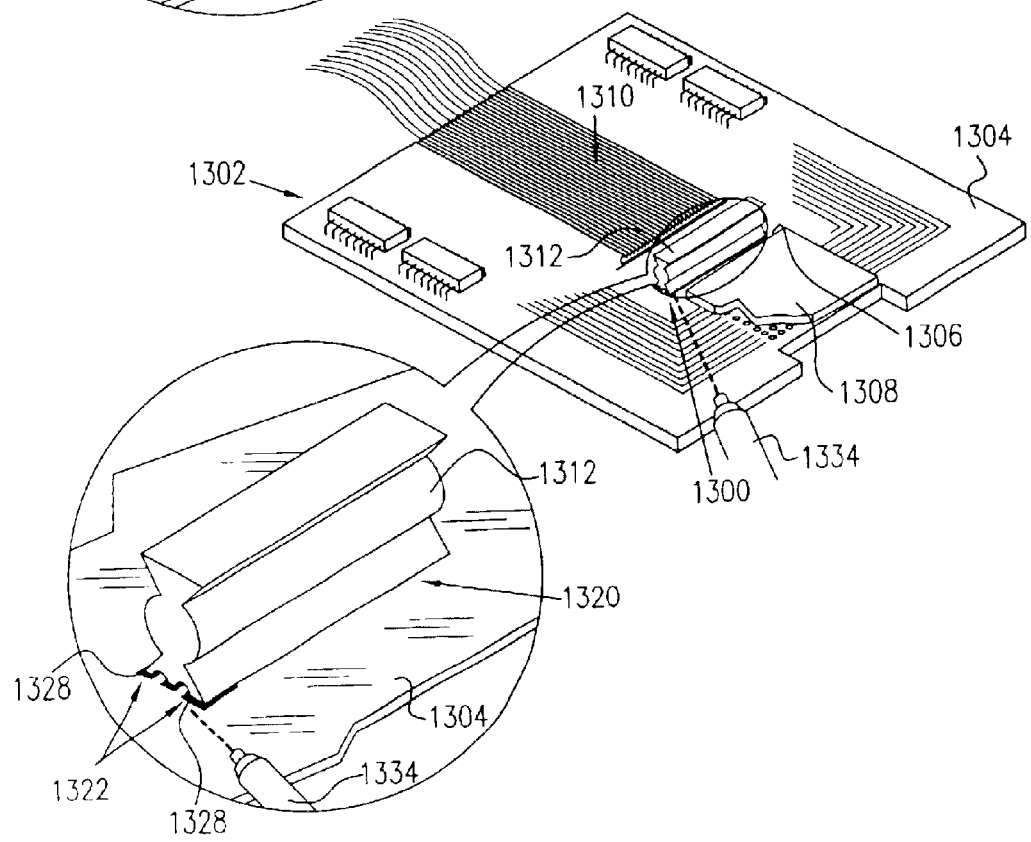

Preferably thereafter, as seen in FIG. 13D, the metallic adhesive 1328 is then cured, preferably by application of energy thereto, preferably by means of a laser 1334, which causes melting and reflow of the metallic adhesive. Alternatively, instead of using a laser, induced RF energy or heating may be employed to produce melting and reflow of the metallic adhesive.

Reference is now made to FIGS. 14A, 14B, 14C and 14D, which illustrate a method and system for accurately mounting an optical element in an optical assembly in accordance with a preferred embodiment of the present invention. As seen in FIGS. 14A–14D, a lens element 1400 is precisely positioned in an optical assembly, here a multiple beam deflecting subassembly 1402 of an optical switch. The lens element 1400 is precisely positioned with respect to multiple reference surfaces, here including a substrate 1404 and a facing edge 1406 of an active integrated optics waveguide device 1408.

The precise positioning of lens element 1400 is carried out preferably with multiple degrees of freedom so as to achieve a high degree of accuracy in order to realize optimal optical coupling efficiency between fibers 1410 fixed to substrate 1404 and the waveguides formed in active integrated optics waveguide device 1408. This degree of accuracy may reach one tenth of a micron. A cylindrical lens 1412, forming part of lens element 1400, ensures that images of the centers of the ends of fibers 1410 lie in the same plane as the centers of the waveguides of waveguide device 1408.

This precise mounting is preferably achieved by using a positioner (not shown) and a vacuum engagement assembly 1414 to manipulate the lens element 1400 relative to substrate 1404 such that the mode of each optical fiber 1410 matches the mode of at least one corresponding waveguide of waveguide device 1408 with relatively low light loss.

The lens element 1400 is mounted in a desired relative position on the substrate 1404 by employing a non-metallic adhesive for initially fixing the lens element 1400 to substrate 1404 in a desired position and thereafter employing a metallic adhesive for permanently fixing the lens element 1400 to the substrate 1404 in the desired position.

Normally, the metallic adhesive cures at a temperature substantially higher than the curing temperature of the non-metallic adhesive. Examples of a suitable metallic adhesive include tin, gold, indium and various combinations thereof. Other suitable metallic adhesives may be employed. Examples of a suitable non-metallic adhesive include. UV curable organic adhesives and various types of epoxies. Other suitable non-metallic adhesives may be employed.

In accordance with a preferred embodiment of the present invention, the lens element 1400 is formed with a bonding surface 1420 which is configured to define separate metallic adhesive engagement areas 1422 and a non-metallic adhesive engagement area 1424. Preferably engagement areas 1422 and 1424 are separated by grooves 1426. In the illustrated embodiment a suitable non-metallic adhesive 1428 is preferably applied to non-metallic adhesive engagement area 1424, but can be applied to each or any of engagement areas 1424, and substrate 1404.

Figure 14A:
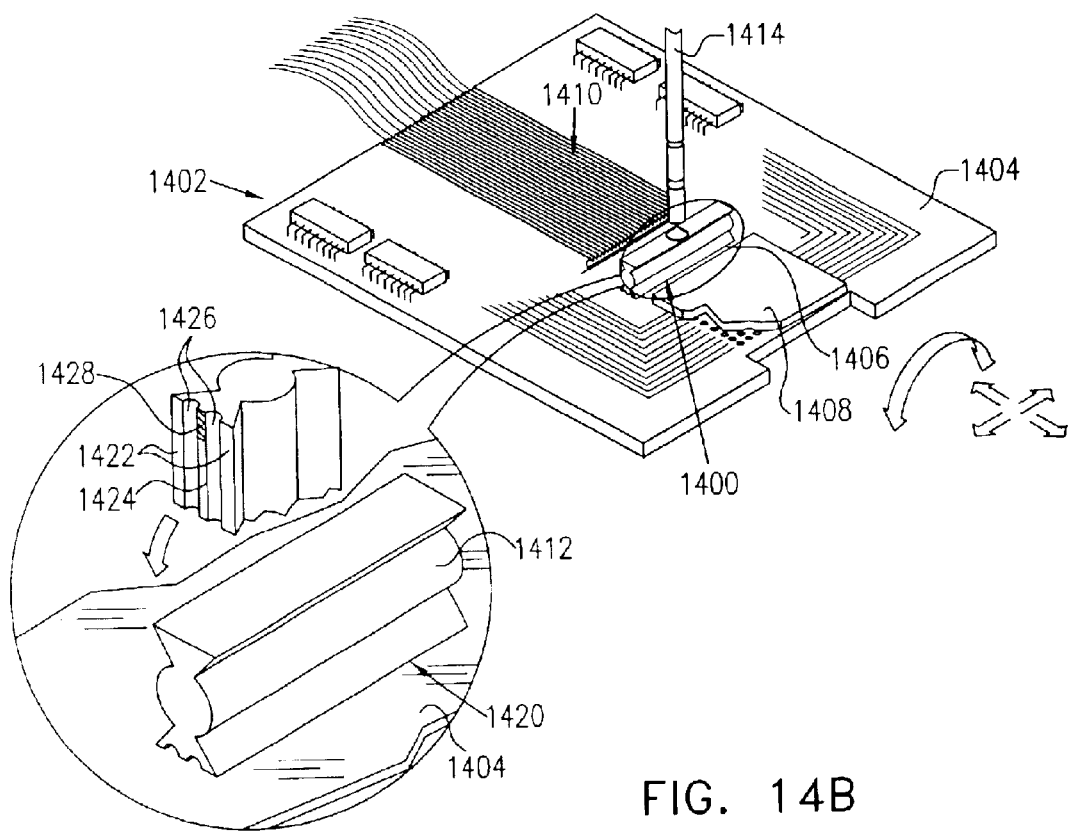
FIGS. 14A, 14B, 14C and 14D illustrate a method and system for accurately mounting an optical element in an optical assembly in accordance with a preferred embodiment of the present invention.
Figure 14B:
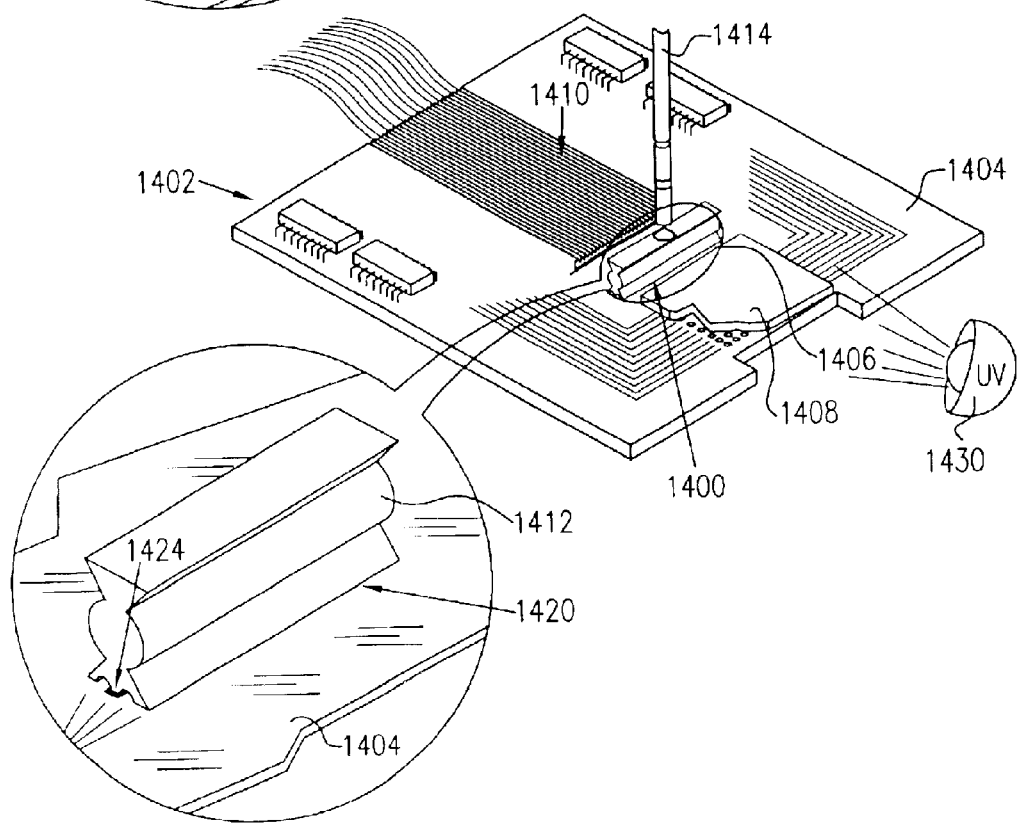

Preferably, as seen in FIG. 14B, the non-metallic adhesive 1428 is then cured, as by UV curing employing a UV source 1430, for initial bonding of the lens element 1400 to substrate 1404. A thin layer, preferably of thickness less than 10 microns, of the non-metallic adhesive, such as a UV curable adhesive, is preferably employed.

Figure 14C:
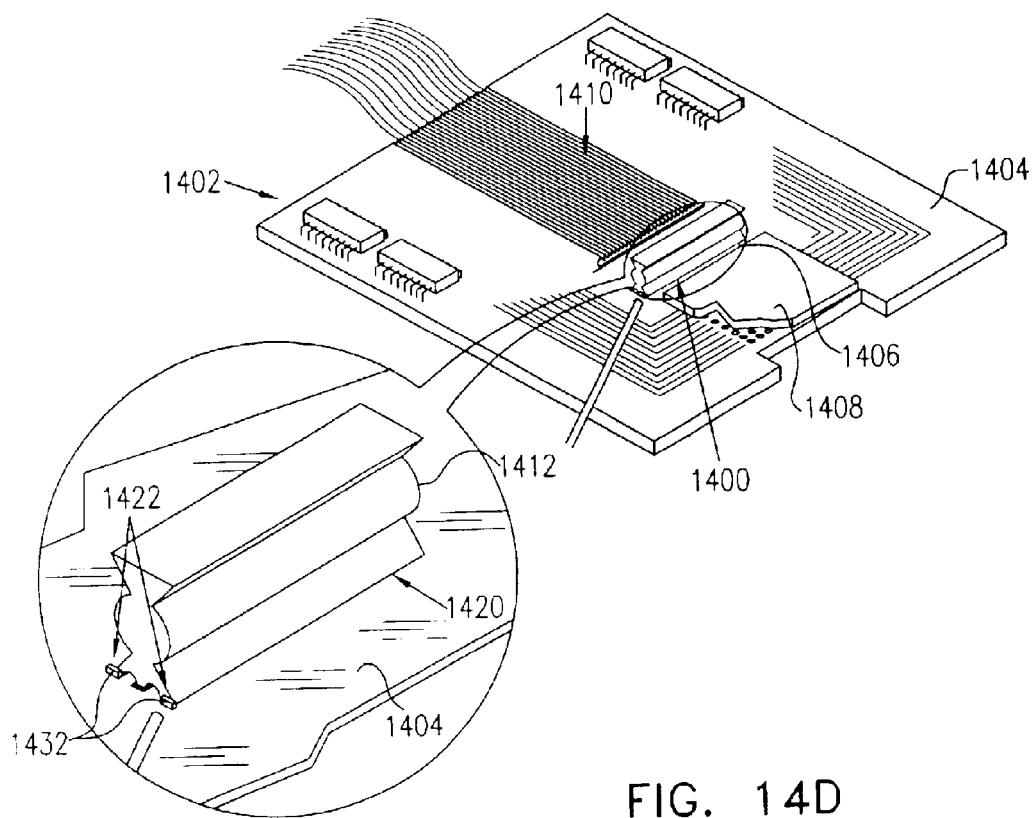
Figure 14D:
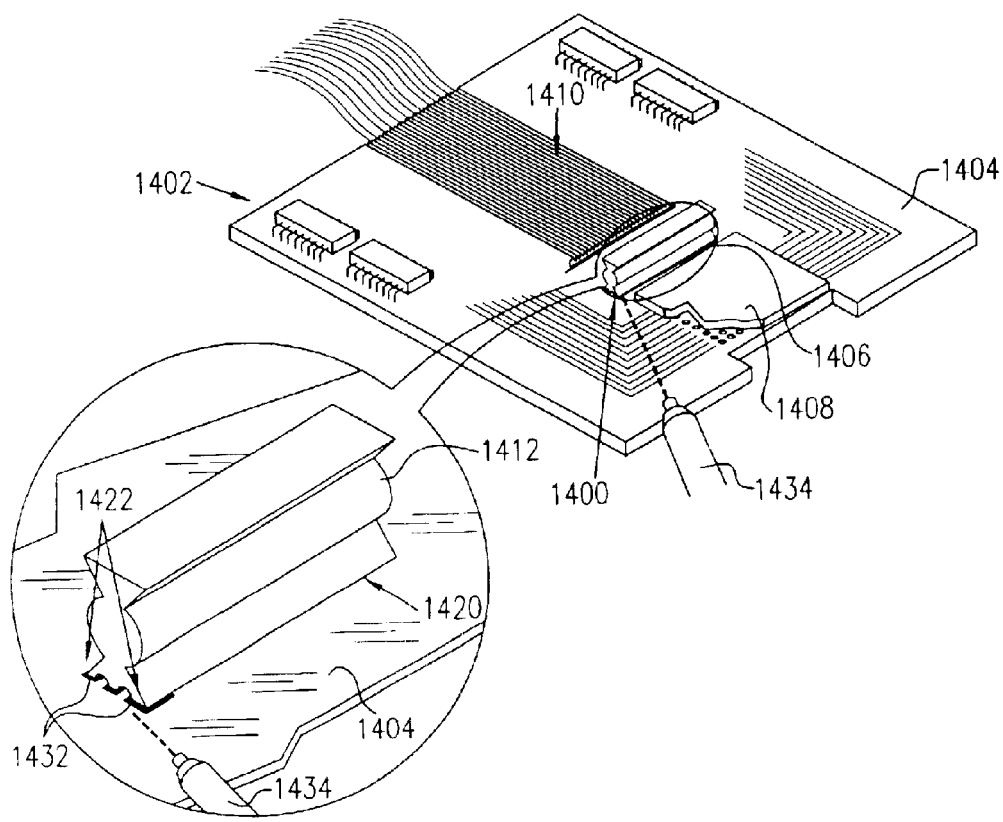

Preferably thereafter, as seen in FIG. 14C, a small quantity 1432 of metallic adhesive is deposited alongside the junction of engagement areas 1422 of surface 1420 and substrate 1404. The metallic adhesive is then cured, as shown in FIG. 14D, preferably by application of energy thereto, preferably by means of a laser 1434, which causes melting and reflow of the metallic adhesive. Alternatively, instead of using a laser, induced RF energy or heating may be employed to produce melting and reflow of the metallic adhesive.

Figure 15A:
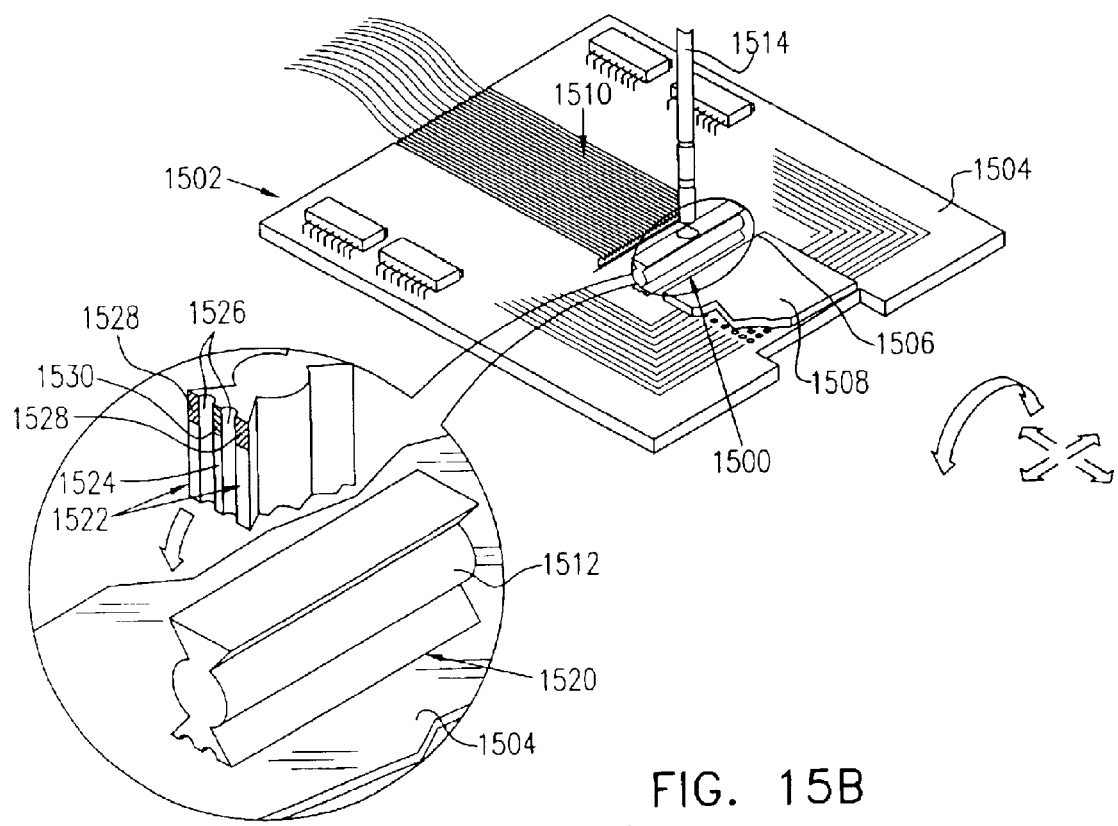
FIGS. 15A, 15B and 15C illustrate a method and system for accurately mounting an optical element in an optical assembly in accordance with a preferred embodiment of the present invention.
Figure 15B:
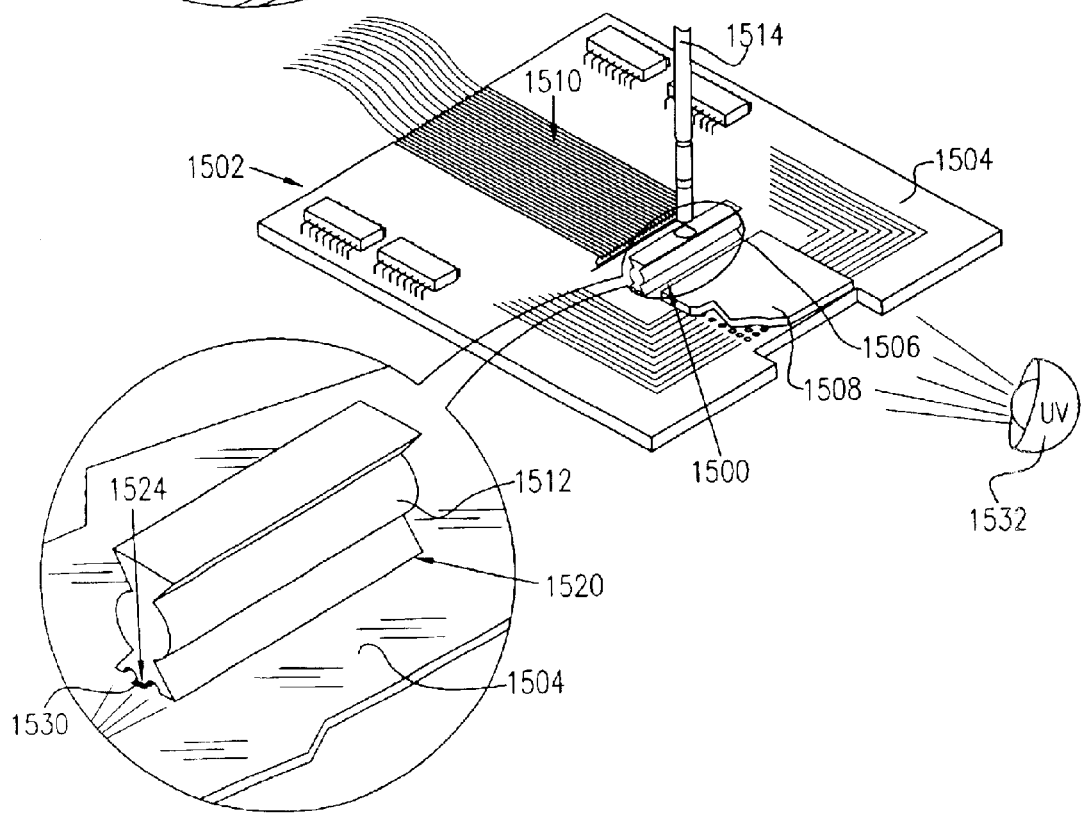
Figure 15C:
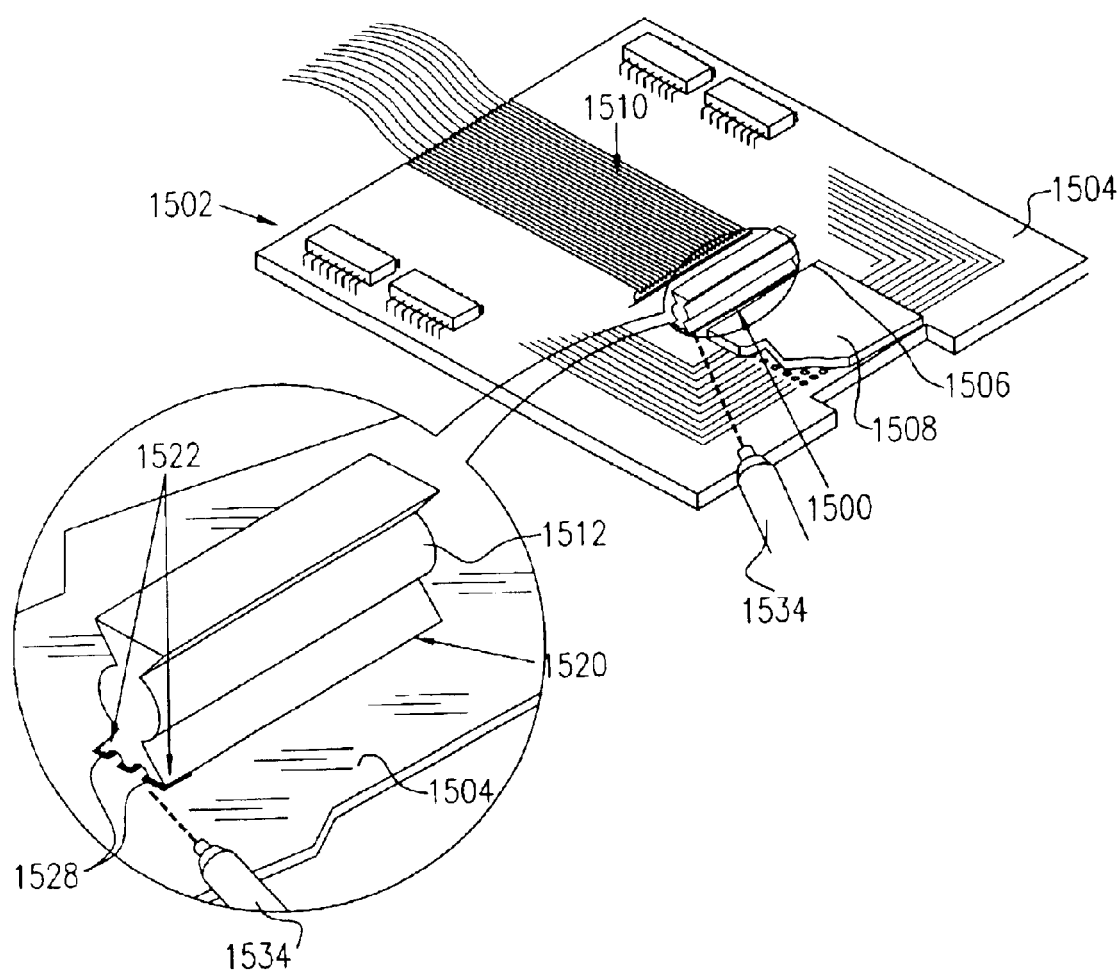

Reference is now made to FIGS. 15A, 15B and 15C, which illustrate a method and system for accurately mounting an optical element in an optical assembly in accordance with a preferred embodiment of the present invention. As seen in FIGS. 15A–15C, a lens element 1500 is precisely positioned in an optical assembly, here a multiple beam deflecting subassembly 1502 of an optical switch. The lens element 1500 is precisely positioned with respect to multiple reference surfaces, here including a substrate 1504 and a facing edge 1506 of an active integrated optics waveguide device 1508.

The precise positioning of lens element 1500 is carried out preferably with multiple degrees of freedom so as to achieve a high degree of accuracy in order to realize optimal optical coupling efficiency between fibers 1510 fixed to substrate 1504 and the waveguides formed in active integrated optics waveguide device 1508. This degree of accuracy may reach one tenth of a micron. A cylindrical lens 1512, forming part of lens element 1500, ensures that images of the centers of the ends of fibers 1510 lie in the same plane as the centers of the waveguides of waveguide device 1508.

This precise mounting is preferably achieved by using a positioner (not shown) and a vacuum engagement assembly 1514 to manipulate the lens element 1500 relative to substrate 1504 such that the mode of each optical fiber 1510 matches the mode of at least one corresponding waveguide of waveguide device 1508 with relatively low light loss.

The lens element 1500 is mounted in a desired relative position on the substrate 1504 by employing a non-metallic adhesive for initially fixing the lens element 1500 to substrate 1504 in a desired position and thereafter employing a metallic adhesive for permanently fixing the lens element 1500 to the substrate 1504 in the desired position.

Normally, the metallic adhesive cures at a temperature substantially higher than the curing temperature of the non-metallic adhesive. Examples of a suitable metallic adhesive include tin, gold, indium and various combinations thereof Other suitable metallic adhesives may be employed. Examples of a suitable non-metallic adhesive include UV curable organic adhesives and various types of epoxies. Other suitable non-metallic adhesives may be employed.

In accordance with a preferred embodiment of the present invention, the lens element 1500 is formed with a bonding surface 1520 which is configured to define separate metallic adhesive engagement areas 1522 and a non-metallic adhesive engagement area 1524. Preferably engagement areas 1522 and 1524 are separated by grooves 1526. In the illustrated embodiment a suitable metallic adhesive 1528 is preferably applied to metallic adhesive engagement areas 1522 and non-metallic adhesive 1530 is preferably applied to non-metallic adhesive engagement area 1524, but metallic and non-metallic adhesives can be applied to each or any of engagement areas 1522 & 1524 and substrate 1504.

Preferably, as seen in FIG. 15B, the non-metallic adhesive 1530 is then cured, as by UV curing employing a UV source 1532, for initial bonding of the lens element 1500 to substrate 1504. A thin layer, preferably of thickness less than 10 microns, of the non-metallic adhesive, such as a UV curable adhesive, is preferably employed.

Preferably thereafter, as seen in FIG. 15C, the metallic adhesive 1528 is then cured, preferably by application of energy thereto, preferably by means of a laser 1534, which causes melting and reflow of the metallic adhesive. Alternatively, instead of using a laser, induced RF energy or heating may be employed to produce melting and reflow of the metallic adhesive.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A method for accurately mounting an optical element in an optical assembly comprising:

precisely positioning an optical element in a desired position in precise spaced relationship with respect to a reference surface;

employing a non-metallic adhesive for initially fixing said optical element in said desired position; and thereafter employing a metallic adhesive for permanently fixing said optical element in said desired position, said employing a non-metallic adhesive and thereafter employing a metallic adhesive comprising employing at least one side mounting element including at least one first surface which engages an edge of said optical element and at least one second surface which engages said reference surface.

2. A method for accurately mounting an optical element according to claim 1 and wherein at least one of said at least one first surface, said at least one second surface, said edge of said optical element and said reference surface includes separate metallic adhesive engagement and non-metallic adhesive engagement areas.

3. A method for accurately mounting an optical element according to claim 2 and wherein said separate metallic adhesive engagement and non-metallic adhesive engagement areas are separated by a groove.

4. A method for accurately mounting an optical element according to claim 1 and wherein each of said at least one first surface and said at least one second surface includes separate metallic adhesive engagement and non-metallic adhesive engagement areas.

5. A method for accurately mounting an optical element according to claim 4 and wherein said separate metallic adhesive engagement and non-metallic adhesive engagement areas are separated by a groove.

6. A method for accurately mounting an optical element according to claim 1 and wherein said at least one first surface includes separate metallic adhesive engagement and non-metallic adhesive engagement areas.

7. A method for accurately mounting an optical element according to claim 6 and wherein said separate metallic adhesive engagement and non-metallic adhesive engagement areas are separated by a groove.

8. A method for accurately mounting an optical element according to claim 6 and wherein said at least one second surface is permanently fixed to said reference surface by employing said metallic adhesive prior to employing said non-metallic adhesive for initially fixing said at least one first surface to said edge of said optical element.

9. A method for accurately mounting an optical element according to claim 1 and wherein said non-metallic adhesive is applied to at least one of said at least one first surface and said at least one second surface, said edge of said optical element being fixed to said reference surface prior to said precisely positioning of said optical element in said desired position with respect to said reference surface.

10. A method for accurately mounting an optical element according to claim 1 and wherein said metallic adhesive is applied to at least one of said at least one first surface and said at least one second surface, said edge of said optical element being fixed to said reference surface prior to said precisely positioning of said optical element in said desired position with respect to said reference surface.

11. A method for accurately mounting an optical element according to claim 9 and wherein said metallic adhesive is applied to at least one of said at least one first surface and said at least one second surface, said edge of said optical element being fixed to said reference surface prior to said precisely positioning of said optical element in said desired position with respect to said reference surface.

12. A method for accurately mounting an optical element in an optical assembly comprising:
precisely positioning an optical element in a desired position in precise spaced relationship with respect to a reference surface;
employing a non-metallic adhesive for initially fixing said optical element in said desired position; and
thereafter employing a metallic adhesive for permanently fixing said optical element in said desired position,
said employing a non-metallic adhesive and thereafter employing a metallic adhesive comprising mounting an edge of said optical element directly onto said reference surface, and
at least one of said edge of said optical element and said reference surface including separate metallic adhesive engagement and non-metallic adhesive engagement areas.

13. A method for accurately mounting an optical element according to claim 12 and wherein said separate metallic adhesive engagement and non-metallic adhesive engagement areas are separated by a groove.

14. A method for accurately mounting an optical element in an optical assembly comprising:
precisely positioning an optical element in a desired position in precise spaced relationship with respect to a reference surface;
employing a non-metallic adhesive for initially fixing said optical element in said desired position; and
thereafter employing a metallic adhesive for permanently fixing said optical element in said desired position,
said employing a non-metallic adhesive and thereafter employing a metallic adhesive comprising mounting an edge of said optical element directly onto said reference surface, and
each of said edge of said optical element and said reference surface including separate metallic adhesive engagement and non-metallic adhesive engagement areas.

15. A method for accurately mounting an optical element according to claim 14 and wherein said separate metallic adhesive engagement and non-metallic adhesive engagement areas are separated by a groove.

16. A method for accurately mounting an optical element in an optical assembly comprising:
precisely positioning an optical element in a desired position in precise spaced relationship with respect to a reference surface;
employing a non-metallic adhesive for initially fixing said optical element in said desired position; and
thereafter employing a metallic adhesive for permanently fixing said optical element in said desired position,
said employing a non-metallic adhesive and thereafter employing a metallic adhesive comprising mounting an edge of said optical element directly onto said reference surface,
said reference surface including separate metallic adhesive engagement and non-metallic adhesive engagement areas, and
said separate metallic adhesive engagement and non-metallic adhesive engagement areas being separated by a groove.

17. A method for accurately mounting an optical element in an optical assembly comprising:
precisely positioning an optical element in a desired position in precise spaced relationship with respect to a reference surface;
employing a non-metallic adhesive for initially fixing said optical element in said desired position; and
thereafter employing a metallic adhesive for permanently fixing said optical element in said desired position,
said employing a non-metallic adhesive and thereafter employing a metallic adhesive comprising mounting an edge of said optical element directly onto said reference surface, and
said non-metallic adhesive being applied to at least one of said edge of said optical element and said reference surface prior to said precisely positioning of said optical element in said desired position with respect to said reference surface.

18. A method for accurately mounting an optical element according to claim 17 and wherein said metallic adhesive is applied to at least one of said edge of said optical element and said reference surface prior to said precisely positioning of said optical element in said desired position with respect to said reference surface.

19. A method for accurately mounting an optical element in an optical assembly comprising:
precisely positioning an optical element in a desired position in precise spaced relationship with respect to a reference surface;

employing a non-metallic adhesive for initially fixing said optical element in said desired position; and thereafter employing a metallic adhesive for permanently fixing said optical element in said desired position, said employing a non-metallic adhesive and thereafter employing a metallic adhesive comprising mounting an edge of said optical element directly onto said reference surface, and said metallic adhesive being applied to at least one of said edge of said optical element and said reference surface prior to said precisely positioning of said optical element in said desired position with respect to said reference surface.

20. A method for accurately mounting an optical element in an optical assembly comprising:

precisely positioning said optical element in a desired position in precise spaced relationship with respect to a reference surface;

employing a relatively low temperature curing adhesive for initially fixing said optical element in said desired position; and thereafter employing a relatively high temperature curing adhesive for permanently fixing said optical element in said desired position, said employing a low temperature adhesive and thereafter employing a high temperature adhesive comprising employing at least one side mounting element including at least one first surface which engages an edge of said optical element and at least one second surface which engages said reference surface.

21. A method for accurately mounting an optical element according to claim 20 and wherein at least one of said at least one first surface, said at least one second surface, said edge of said optical element and said reference surface includes separate high temperature adhesive engagement and low temperature adhesive engagement areas.

22. A method for accurately mounting an optical element according to claim 21 and wherein said separate high temperature adhesive engagement and low temperature adhesive engagement areas are separated by a groove.

23. A method for accurately mounting an optical element according to claim 20 and wherein each of said at least one first surface and said at least one second surface includes separate high temperature adhesive engagement and low temperature adhesive engagement areas.

24. A method for accurately mounting an optical element according to claim 23 and wherein said separate high temperature adhesive engagement and low temperature adhesive engagement areas are separated by a groove.

25. A method for accurately mounting an optical element according to claim 20 and wherein said at least one first surface includes separate high temperature adhesive engagement and low temperature adhesive engagement areas.

26. A method for accurately mounting an optical element according to claim 25 and wherein said separate high temperature adhesive engagement and low temperature adhesive engagement areas are separated by a groove.

27. A method for accurately mounting an optical element according to claim 25 and wherein said at least one second surface is permanently fixed to said reference surface by employing said high temperature adhesive prior to employing said low temperature adhesive for initially fixing said at least one first surface to said edge of said optical element.

28. A method for accurately mounting an optical element according to claim 20 and wherein said low temperature adhesive is applied to at least one of said at least one first surface and said at least one second surface, said edge of said optical element being fixed to said reference surface prior to said precisely positioning of said optical element in said desired position with respect to said reference surface.

29. A method for accurately mounting an optical element according to claim 20 and wherein said high temperature adhesive is applied to at least one of said at least one first surface and said at least one second surface, said edge of said optical element being fixed to said reference surface prior to said precisely positioning of said optical element in said desired position with respect to said reference surface.

30. A method for accurately mounting an optical element according to claim 28 and wherein said high temperature adhesive is applied to at least one of said at least one first surface and said at least one second surface, said edge of said optical element being fixed to said reference surface prior to said precisely positioning of said optical element in said desired position with respect to said reference surface.

31. A method for accurately mounting an optical element in an optical assembly comprising:

precisely positioning said optical element in a desired position in precise spaced relationship with respect to a reference surface;

employing a relatively low temperature curing adhesive for initially fixing said optical element in said desired position; and thereafter employing a relatively high temperature curing adhesive for permanently fixing said optical element in said desired position, said employing a low temperature adhesive and thereafter employing a high temperature adhesive comprising mounting an edge of said optical element directly onto said reference surface.

32. A method for accurately mounting an optical element according to claim 31 and wherein at least one of said edge of said optical element and said reference surface includes separate high temperature adhesive engagement and low temperature adhesive engagement areas.

33. A method for accurately mounting an optical element according to claim 32 and wherein said separate high temperature adhesive engagement and low temperature adhesive engagement areas are separated by a groove.

34. A method for accurately mounting an optical element according to claim 31 and wherein each of said edge of said optical element and said reference surface includes separate high temperature adhesive engagement and low temperature adhesive engagement areas.

35. A method for accurately mounting an optical element according to claim 34 and wherein said separate high temperature adhesive engagement and low temperature adhesive engagement areas are separated by a groove.

36. A method for accurately mounting an optical element according to claim 31 and wherein said reference surface includes separate high temperature adhesive engagement and low temperature adhesive engagement areas.

37. A method for accurately mounting an optical element according to claim 36 and wherein said separate high temperature adhesive engagement and low. temperature adhesive engagement areas are separated by a groove.

38. A method for accurately mounting an optical element according to claim 31 and wherein said low temperature adhesive is applied to at least one of said edge of said optical element and said reference surface prior to said precisely positioning of said optical element in said desired position with respect to said reference surface.

39. A method for accurately mounting an optical element according to claim 38 and wherein said high temperature adhesive is applied to at least one of said edge of said optical element and said reference surface prior to said precisely positioning of said optical element in said desired position with respect to said reference surface.

40. A method for accurately mounting an optical element according to claim 31 and wherein said high temperature adhesive is applied to at least one of said edge of said optical element and said reference surface prior to said precisely positioning of said optical element in said desired position with respect to said reference surface.

41. A method for accurately mounting an optical element in an optical assembly comprising:
   precisely positioning said optical element in a desired position in precise spaced relationship with respect to a reference surface;
   employing a first curable adhesive for initially fixing said optical element in said desired position; and
   thereafter employing a second curable adhesive for fixing said optical element in said desired position,
   said employing a first adhesive and thereafter employing a second adhesive comprising employing at least one side mounting element including at least one first surface which engages an edge of said optical element and at least one second surface which engages said reference surface.

42. A method for accurately mounting an optical element according to claim 41 and wherein at least one of said at least one first surface, said at least one second surface, said edge of said optical element and said reference surface includes separate first adhesive engagement and second adhesive engagement areas.

43. A method for accurately mounting and optical element according to claim 42 and wherein said separate first adhesive engagement and second adhesive engagement areas are separated by a groove.

44. A method for accurately mounting an optical element according to claim 41 and wherein each of said at least one first surface and said at least one second surface includes separate first adhesive engagement and second adhesive engagement areas.

45. A method for accurately mounting an optical element according to claim 44 and wherein said separate first adhesive engagement and second adhesive engagement areas are separated by a groove.

46. A method for accurately mounting an optical element according to claim 41 and wherein said at least one first surface includes separate first adhesive engagement and second adhesive engagement areas.

47. A method for accurately mounting an optical element according to claim 46 and wherein said separate first adhesive engagement and second adhesive engagement areas are separated by a groove.

48. A method for accurately mounting an optical element according to claim 46 and wherein said at least one second surface is permanently fixed to said reference surface by employing said second adhesive prior to employing said first adhesive for initially fixing said at least one first surface to said edge of said optical element.

49. A method for accurately mounting an optical element according to claim 41 and wherein said first adhesive is applied to at least one of said at least one first surface and said at least one second surface, said edge of said optical element being fixed to said reference surface prior to said precisely positioning of said optical element in said desired position with respect to said reference surface.

50. A method for accurately mounting an optical element according to claim 41 and wherein said second adhesive is applied to at least one of said at least one first surface and said at least one second surface, said edge of said optical element being fixed to said reference surface prior to said precisely positioning of said optical element in said desired position with respect to said reference surface.

51. A method for accurately mounting an optical element according to claim 49 and wherein said second adhesive is applied to at least one of said at least one first surface and said at least one second surface, said edge of said optical element being fixed to said reference surface prior to said precisely positioning of said optical element in said desired position with respect to said reference surface.

52. A method for accurately mounting an optical element in an optical assembly comprising:
   precisely positioning said optical element in a desired position in precise spaced relationship with respect to a reference surface;
   employing a first curable adhesive for initially fixing said optical element in said desired position; and
   thereafter employing a second curable adhesive for fixing said optical element in said desired position,
   said employing a first adhesive and thereafter employing a second adhesive comprising mounting an edge of said optical element directly onto said reference surface,
   at least one of said edge of said optical element and said reference surface including separate first adhesive engagement and second adhesive engagement areas, and
   said separate first adhesive engagement and second adhesive engagement areas being separated by a groove.

53. A method for accurately mounting an optical element in an optical assembly comprising:
   precisely positioning said optical element in a desired position in precise spaced relationship with respect to a reference surface;
   employing a first curable adhesive for initially fixing said optical element in said desired position; and
   thereafter employing a second curable adhesive for fixing said optical element in said desired position,
   said employing a first adhesive and thereafter employing a second adhesive comprising mounting an edge of said optical element directly onto said reference surface,
   each of said edge of said optical element and said reference surface including separate first adhesive engagement and second adhesive engagement areas, and
   said separate first adhesive engagement and second adhesive engagement areas being separated by a groove.

54. A method for accurately mounting an optical element in an optical assembly comprising:
   precisely positioning said optical element in a desired position in precise spaced relationship with respect to a reference surface;
   employing a first curable adhesive for initially fixing said optical element in said desired position; and
   thereafter employing a second curable adhesive for fixing said optical element in said desired position,
   said employing a first adhesive and thereafter employing a second adhesive comprising mounting an edge of said optical element directly onto said reference surface,
   said reference surface including separate first adhesive engagement and second adhesive engagement areas, and
   said separate first adhesive engagement and second adhesive engagement areas being separated by a groove.

55. A method for accurately mounting an optical element in an optical assembly comprising:

precisely positioning said optical element in a desired position in precise spaced relationship with respect to a reference surface;

employing a first curable adhesive for initially fixing said optical element in said desired position; and thereafter employing a second curable adhesive for fixing said optical element in said desired position, said employing a first adhesive and thereafter employing a second adhesive comprising mounting an edge of said optical element directly onto said reference surface, and said first adhesive being applied to at least one of said edge of said optical element and said reference surface prior to said precisely positioning of said optical element in said desired position with respect to said reference surface.

56. A method for accurately mounting an optical element according to claim 55 and wherein said second adhesive is applied to at least one of said edge of said optical element and said reference surface prior to said precisely positioning of said optical element in said desired position with respect to said reference surface.

57. A method for accurately mounting an optical element in an optical assembly comprising:

precisely positioning said optical element in a desired position in precise spaced relationship with respect to a reference surface;

employing a first curable adhesive for initially fixing said optical element in said desired position; and thereafter employing a second curable adhesive for fixing said optical element in said desired position, said employing a first adhesive and thereafter employing a second adhesive comprising mounting an edge of said optical element directly onto said reference surface, and said second adhesive being applied to at least one of said edge of said optical element and said reference surface prior to said precisely positioning of said optical element in said desired position with respect to said reference surface.

58. A method for accurately mounting an optical element in an optical assembly comprising:

precisely positioning said optical element in a desired position with respect to a reference surface;

employing an adhesive for fixing said optical element in said desired position including employing at least one side mounting element including at least one first surface which engages an edge of said optical element and at least one second surface which engages said reference surface, wherein said at least one second surface is fixed to said reference surface prior to fixing said at least one first surface to said edge of said optical element.

59. A method for accurately mounting an optical element according to claim 58 and wherein said adhesive is applied to at least one of said at least one first surface and said at least one second surface, said edge of said optical element and said reference surface prior to said precisely positioning of said optical element in said desired position with respect to said reference surface.

* * * * *

UNITED STATES PATENT AND TRADEMARK OFFICE
CERTIFICATE OF CORRECTION

PATENT NO. : 6,886,994 B2 Page 1 of 1
DATED : May 3, 2005
INVENTOR(S) : Eyal Shekel et al.

It is certified that error appears in the above-identified patent and that said Letters Patent is hereby corrected as shown below:

<u>Title page,</u>
Item [75], Inventors, please delete "Levy, Jeffrey, Tel Aviv (IL)" and substitute
-- Jeffrey Levy, Tel Aviv (IL) --; please delete "Michael Rodman, Jerusalem (IL)" and substitute -- Michael Rudman, Jerusalem (IL) --.

Signed and Sealed this

Sixteenth Day of August, 2005

JON W. DUDAS
*Director of the United States Patent and Trademark Office*